US008997141B2

(12) United States Patent
Mitsuya et al.

(10) Patent No.: US 8,997,141 B2
(45) Date of Patent: Mar. 31, 2015

(54) COOPERATIVE COMMUNICATION/BROADCASTING SYSTEM, APPLICATION MANAGEMENT SERVER, RECEIVER, RECEPTION METHOD FOR RECEIVER, AND APPLICATION MANAGEMENT METHOD FOR APPLICATION MANAGEMENT SERVER

(75) Inventors: Shigeaki Mitsuya, Tokyo (JP); Kinji Matsumura, Tokyo (JP); Akitsugu Baba, Tokyo (JP); Hiroshi Fujisawa, Tokyo (JP); Masaru Takechi, Tokyo (JP); Yasuaki Kanatsugu, Tokyo (JP); Hiroyuki Hamada, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 14/117,755

(22) PCT Filed: May 18, 2012

(86) PCT No.: PCT/JP2012/062836
§ 371 (c)(1),
(2), (4) Date: Nov. 14, 2013

(87) PCT Pub. No.: WO2012/161129
PCT Pub. Date: Nov. 29, 2012

(65) Prior Publication Data
US 2014/0075472 A1 Mar. 13, 2014

(30) Foreign Application Priority Data

May 20, 2011 (JP) ................................. 2011-113640

(51) Int. Cl.
*H04N 7/10* (2006.01)
(Continued)

(52) U.S. Cl.
CPC ............ *H04N 21/8126* (2013.01); *G06F 21/10* (2013.01); *H04H 60/13* (2013.01);
(Continued)

(58) Field of Classification Search
USPC ............. 725/32, 33, 34, 36, 67, 68, 131, 132, 725/133, 134; 709/203, 217, 218; 348/729, 348/725, 721, 720, 719; 375/240.01, 375/240.02
See application file for complete search history.

(56) References Cited

U.S. PATENT DOCUMENTS 7,904,921 B2 * 3/2011 Yun et al. ......................... 725/33
(Continued)

FOREIGN PATENT DOCUMENTS

JP    A 2000-115747    4/2000
(Continued)

OTHER PUBLICATIONS

Extensible Messaging and Presence Protocol (XMPP): Core, [online], XMPP Standards Foundation, URL:http://xmpp.org/rfcs/rfc6120.html, dated Mar. 2011.
(Continued)

*Primary Examiner* — Jefferey Harold
*Assistant Examiner* — Mustafizur Rahman
(74) *Attorney, Agent, or Firm* — Drinker Biddle & Reath LLP

(57) ABSTRACT

An application management server includes: a terminal management table storage unit configured to store terminal device identification data for identifying a terminal device and information indicating whether or not transmission of notification data is necessary while correlating the terminal device identification data with the information; a registration request reception unit configured to receive from the terminal device, a registration request for registering transmission of notification data, and update the terminal management table storage unit based on the registration request; a release request reception unit configured to receive from the terminal device, a release request for releasing transmission of notification data, and update the terminal management table storage unit based on the release request; a via-broadcasting notification transmission unit configured to perform a process of including notification data in a broadcasting signal and transmitting the notification data; and a via-communication notification transmission unit configured to perform a process of referring to the terminal management table storage unit and transmitting the notification data to the terminal device.

8 Claims, 28 Drawing Sheets

(51) Int. Cl.
*H04N 21/81* (2011.01)
*G06F 21/10* (2013.01)
*H04H 60/13* (2008.01)
*H04N 21/435* (2011.01)
*G05B 19/042* (2006.01)
*H04N 21/41* (2011.01)
*H04N 21/434* (2011.01)
*H04N 21/443* (2011.01)
*H04N 21/462* (2011.01)
*H04N 21/6543* (2011.01)
*H04H 60/76* (2008.01)

(52) U.S. Cl.
CPC ......... *H04N 21/435* (2013.01); *G05B 19/0428* (2013.01); *H04N 21/4126* (2013.01); *H04N 21/4345* (2013.01); *H04N 21/4433* (2013.01); *H04N 21/4622* (2013.01); *H04N 21/6543* (2013.01); *G06F 2221/0775* (2013.01); *G06F 2221/2101* (2013.01); *G05B 2219/23043* (2013.01); *G05B 2219/24159* (2013.01); *G05B 2219/24168* (2013.01); *G05B 2219/36163* (2013.01); *G05B 2219/36542* (2013.01); *G06F 2221/2117* (2013.01); *H04H 60/76* (2013.01)
USPC ................ 725/32; 725/33; 725/34; 725/36; 725/67; 725/68; 725/131; 725/132; 725/133; 725/134; 348/729; 348/725; 348/721; 348/720; 348/719; 709/203; 709/217; 709/218; 375/240.01; 375/240.02

(56) References Cited

U.S. PATENT DOCUMENTS

| | | | | |
|---|---|---|---|---|
| 8,001,208 | B2* | 8/2011 | Suzuki et al. | 709/217 |
| 2002/0166123 | A1* | 11/2002 | Schrader et al. | 725/58 |
| 2003/0018967 | A1 | 1/2003 | Gorbatov et al. | |
| 2004/0148348 | A1* | 7/2004 | Holt et al. | 709/204 |
| 2007/0204291 | A1* | 8/2007 | Ichihashi | 725/33 |
| 2008/0209467 | A1* | 8/2008 | Song | 725/34 |
| 2008/0216113 | A1* | 9/2008 | Yun et al. | 725/33 |
| 2008/0288993 | A1 | 11/2008 | Aghasaryan et al. | |
| 2010/0180294 | A1* | 7/2010 | Yun et al. | 725/33 |
| 2011/0182562 | A1* | 7/2011 | Iwakiri et al. | 386/248 |
| 2011/0307554 | A1* | 12/2011 | Konno et al. | 709/204 |

FOREIGN PATENT DOCUMENTS

| | | |
|---|---|---|
| JP | A 2000-209564 | 7/2000 |
| JP | A 2004-194259 | 7/2004 |
| JP | A 2005-333389 | 12/2005 |
| JP | A 2009-038774 | 2/2009 |
| WO | WO 2004-088986 A1 | 10/2004 |

OTHER PUBLICATIONS

DVB-GEM1.2 [ETSI TS 102 543 V1.1.1 Digital Video Broadcasting (DVB); Globally Executable MHP (GEM) Specification 1.2], dated Mar. 2008.
"Application Execution Engine Platform for Digital Broad Casting", ARIB STD-B23 V1.1, Feb. 2004.
"Digital Broadcasting System based on Home Server", ARIB TR-B27, V1.0, Fascicle 1, Chapter Zero, 2.7.1.4 (p. 16), Sep. 28, 2006.
DVB Bluebook A153 (GEM Media Synchronization API), Oct. 2010.
"Operational Guidelines for Digital Terrestrial Television Broadcasting", ARIB TR-B14 V3.8, Fascicle 2, vol. 4, Section 3, 31.3, Dec. 2008.
"Data Coding and Transmission Specification for Digital Broadcasting", ARIB STD-B24, V5.1, vol. 3, Chapter 6, Mar. 2007.
International Search Report for International Patent Application No. PCT/JP2012/062836, dated Aug. 21, 2012.
Calder et al, "Java TV API Technical Overview", Version 1.0, Doc. No. XP-002255146, Sun Microsystems internet citation, Nov. 14, 2000, http://www.oracle.com/technetwork/java/javame/jtv-1-0-spec-overview-150049.pdf, retrieved on Sep. 19, 2003.
Search report issued Sep. 11, 2014 in corresponding European Patent Application No. 12789207.3.

* cited by examiner

FIG. 6

```xml
<?xml version="1.0" encoding="utf-8"?>
<mhp:ServiceDiscovery xmlns:mhp="urn:dvb:mhp:2009"
              xmlns:ipi="urn:dvb:metadata:iptv:sdns:1008-1"
              xmlns:mpeg7="urn:tva:mpeg7:2005"
              xmlns:xsi="http://www.w3.org/2001/XMLSchema-instance">
  <mhp:ApplicationDiscovery>
    <mhp:ApplicationList>
      <mhp:Application>
        <mhp:appName ipi:Language="eng">SyncPlayerSample</mhp:appName>
        <mhp:applicationIdentifier>
          <mhp:orgId>100</mhp:orgId>
          <mhp:appId>200</mhp:appId>
        </mhp:applicationIdentifier>
        <mhp:applicationDescriptor>
          <mhp:controlCode mhp:type="ARIB-J">AUTOSTART</mhp:controlCode>
          <mhp:visibility>VISIBLE_ALL</mhp:visibility>
          <mhp:serviceBound>false</mhp:serviceBound>
          <mhp:priority>0</mhp:priority>
          <mhp:version>0</mhp:version>
          <mhp:mhpVersion>
            <mhp:profile>0</mhp:profile>
            <mhp:versionMajor>0</mhp:versionMajor>
            <mhp:versionMinor>0</mhp:versionMinor>
            <mhp:versionMicro>0</mhp:versionMicro>
          </mhp:mhpVersion>
        </mhp:applicationDescriptor>
        <mhp:applicationSpecificDescriptor>
          <mhp:dvbjDescriptor>
            <mhp:location>http://192.168.11.37/SyncDemo.jar</mhp:location>
            <mhp:applicationStructure>
              <mhp:classPathExtension/>
              <mhp:initialClass>demo.SyncPlayerDemo</mhp:initialClass>
            </mhp:applicationStructure>
          </mhp:dvbjDescriptor>
        </mhp:applicationSpecificDescriptor>
      </mhp:Application>
    </mhp:ApplicationList>
  </mhp:ApplicationDiscovery>
</mhp:ServiceDiscovery>
```

FIG. 23

| TERMINAL MANAGEMENT TABLE | | | | | | |
|---|---|---|---|---|---|---|
| APPLICATION ID | TERMINAL DEVICE ID | ADDRESS | NOTIFICATION TRANSMISSION FLAG | USER ATTRIBUTION | | |
| | | | | AGE | GENDER | |
| | | | | | | |
| | | | | | | |
| | | | | | | |
| | | | | | | |
| | | | | | | |

FIG. 25

| COOPERATIVE TERMINAL MANAGEMENT TABLE | | | |
|---|---|---|---|
| TERMINAL DEVICE ID | ADDRESS | APPLICATION ID | COOPERATION STATUS |
| | | | |
| | | | |
| | | | |
| | | | |

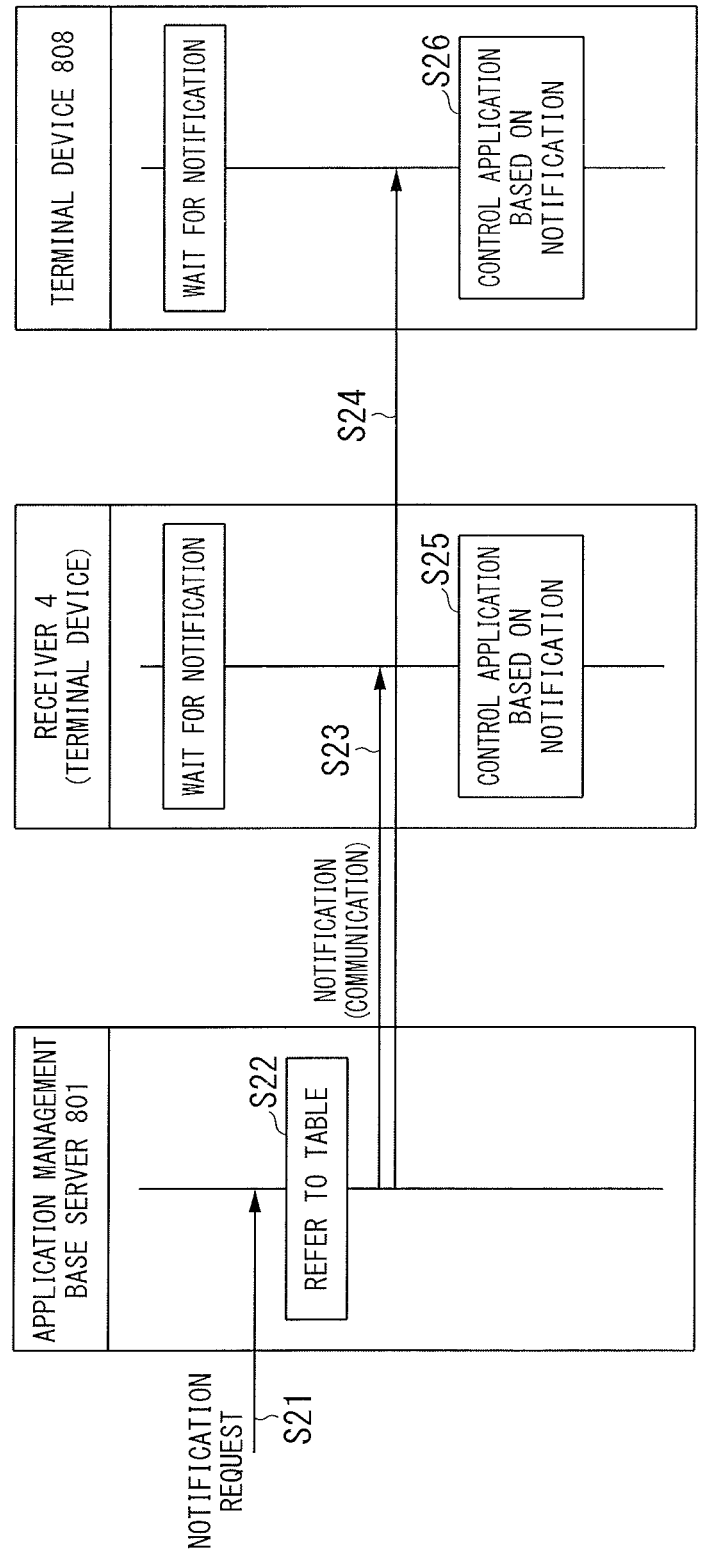

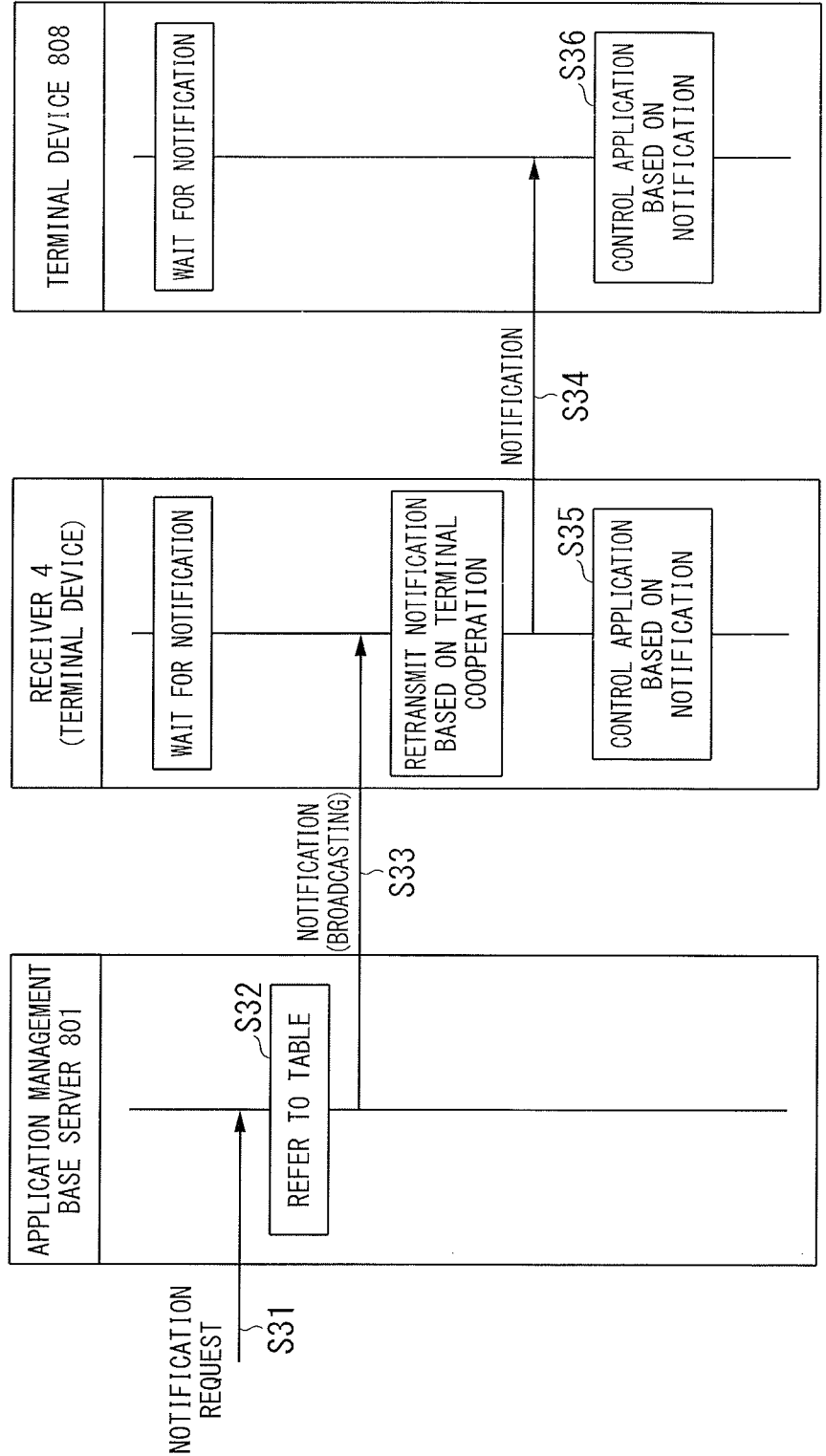

US 8,997,141 B2

COOPERATIVE COMMUNICATION/BROADCASTING SYSTEM, APPLICATION MANAGEMENT SERVER, RECEIVER, RECEPTION METHOD FOR RECEIVER, AND APPLICATION MANAGEMENT METHOD FOR APPLICATION MANAGEMENT SERVER

TECHNICAL FIELD

The present invention relates to a cooperative communication/broadcasting system that provides services by cooperating broadcasting and communication, an application management server and a receiver in that system, a reception method for a receiver, and an application management method for an application management server.

Priority is claimed on Japanese Patent Application No. 2011-113640, which was filed on May 20, 2011, the content of which is incorporated herein by reference.

BACKGROUND ART

It has been demanded to perform more versatile communication using communication terminals used by individuals. In such situations, transmission of information from a server device side of a service provider to those communication terminals while the transmission is controlled by a server device side, so called, means of a push notification, has been required. Regarding the push notification, instead of the server device sending a response to a request from the communication terminal side, information is transmitted from the server device side to the communication terminal without a trigger from the communication terminal side. One of protocols used for the above purpose is XMPP (extensible messaging and presence protocol). Non-Patent Document 1 discloses XMPP and also provision for applying XMPP to a push communication. The XMPP is protocol based on XML (extensible markup language), and is adopted as the standard for instant messaging.

CITATION LIST

Non-Patent Document

[Non-Patent Document 1] Peter Saint-Andre, "Extensible Messaging and Presence Protocol (XMPP): Core", [online], March 2011, XMPP Standards Foundation, [searched on May 5, 2011], the Internet <URL: http://xmpp.org/rfcs/rfc6120.html>

DISCLOSURE OF INVENTION

Problems to be Solved by the Invention

However, there is a limit to the push notification using the existing protocol, such as XMPP. To perform a push notification, it is necessary to previously establish connection between the server device side and the communication terminal side. In order to manage the connection, however, resources (such as memory) on the server side are necessary for each connection.

For example, in the case of cooperative communication/broadcasting services, the number of users simultaneously receiving services reaches the order of several hundred thousand to several ten million. There is a problem in that a large amount of resources on the server device side are necessary to previously establish connection with such a large number of communication terminals for a push notification.

The present invention has been made in view of the above problem, an object of which is to provide a mechanism that transmits a notification (especially, a push notification) for a server side to control an application on a terminal device (such as a receiver) without previously establishing connection with a large number of communication connections.

Means for Solving the Problems

[1] To solve the above problem, a receiver according to one aspect of the present invention includes: a broadcast reception unit configured to receive a broadcasting signal; a via-broadcasting notification reception unit configured to acquire notification data included in the broadcasting signal received by the broadcast reception unit; a communication input/output unit configured to perform input and output by communication; a via-communication notification reception unit configured to acquire the notification data received by the communication input/output unit; an application execution unit configured to execute an application program; a terminal cooperation processing unit configured to manage a state of a cooperation process with an external terminal device which is performed by the application program executed by the application execution unit, and transmit, when any one of the via-broadcasting notification reception unit and the via-communication notification reception unit acquires the notification data, the notification data acquired to the terminal device performing the cooperation process in association with the notification data; and an application control unit configured to, when any one of the via-broadcasting notification reception unit and the via-communication notification reception unit acquires the notification data, control the application program executed by the application execution program, in association with the notification data.

According to this, the receiver can wait for notification data both via broadcasting and via communication. Therefore, it is possible to transmit a notification via broadcasting or via communication whichever suits convenience of the side transmitting the notification, and control an application on the receiver side based on that notification. Additionally, when the receiver is performing a cooperative process with the terminal device, the received notification is transferred to the terminal device targeted for the cooperative process. Therefore, a notification can be transferred even to a terminal device not having a function of receiving a broadcasting signal.

[2] The above receiver may further include: a registration request transmission unit configured to transmit to an application management server, a registration request for registering reception of the notification data; and a release request transmission unit configured to transmit to the application management server, a release request for releasing reception of the notification data.

[3] Additionally, an application management server according to another aspect of the present invention includes: a terminal management table storage unit configured to store terminal device identification data for identifying a terminal device and information indicating whether or not transmission of notification data is necessary while correlating the terminal device identification data with the information; a registration request reception unit configured to receive from the terminal device, a registration request for registering transmission of notification data, and update the terminal management table storage unit based on the registration request; a release request reception unit configured to receive from the terminal device, a release request for releasing transmission of notification data, and update the terminal management table storage unit based on the release request; a via-broadcasting notification transmission unit configured to perform a process of including notification data in a broadcasting signal and transmitting the notification data; and a via-communication notification transmission unit configured to perform a process of referring to the terminal management table storage unit and transmitting the notification data to the terminal device.

[4] The above application management server may further include: a notification transmission control unit configured to control, in accordance with a number of communication terminals to which the notification data is to be transmitted, whether or not to transmit the notification data from the via-communication notification transmission unit or from the via-broadcasting notification transmission unit.

According to those configurations, it is possible to transmit notification data both via broadcasting and via communication. In a case where a large number of computational resources (such as memory) are previously required to transmit notification data via communication, it is possible to transmit the notification data not only via communication, but also via broadcasting.

[5] In the above application management server, the terminal management table storage unit may be configured to further store a user attribute data in association with the terminal device identification data, and the via-communication notification transmission unit may be configured to perform a process of transmitting the notification data only to the terminal device associated with a particular user attribute stored in the terminal management table storage unit.

According to this configuration, it is possible to transmit a notification only to the terminal device associated with a user having a particular attribute.

[6] Further, a cooperative communication/broadcasting system according to another aspect of the present invention includes: the above receiver; the above application management server; a broadcast sending device configured to transmit, based on the process performed by the via-broadcasting notification transmission unit, a broadcasting signal including the notification data; and a terminal device configured to perform a process cooperatively with the receiver, and in a case that the notification data is received from the terminal cooperation processing unit, control an application program to be executed by the terminal device, in association with the notification data.

[7] Moreover, a reception method for a receiver according to another aspect of the present invention includes: a step of receiving a broadcasting signal; a step of acquiring notification data included in the broadcasting signal received; a step of executing an application program; a step of managing a state of a cooperation process with an external terminal device which is performed by the application program, and transmitting, when the notification data is acquired, the notification data acquired to the terminal device performing the cooperation process in association with the notification data; and a step of controlling, when the notification data is acquired, the application program in association with the notification data.

[8] The above reception method for the receiver may further include: a step of transmitting to an application management server, a registration request for registering reception of the notification data; and a step of transmitting to the application management server, a release request for releasing reception of the notification data.

[9] Additionally, an application management method for an application management server according to another aspect of the present invention includes: a step of receiving a broadcasting signal; a step of acquiring notification data included in the broadcasting signal received; a step of executing an application program; a step of managing a state of a cooperation process with an external terminal device which is performed by the application program, and transmitting, when the notification data is acquired, the notification data acquired to the terminal device performing the cooperation process in association with the notification data; and a step of controlling, when the notification data is acquired, the application program in association with the notification data.

[10] Regarding the above application management method for the application management server, the step of transmitting the notification data may further include: a step of controlling, in accordance with a number of communication terminals to which the notification data is to be transmitted, whether transmitting the notification data by including the notification data in the broadcasting signal or transmitting the notification data to the terminal device by referring to the terminal management table.

[11] Regarding the above application management method for the application management server, the terminal management table may further store user attribute data in association with the terminal device identification data, and the step of transmitting the notification data may include a process of transmitting the notification data only to the terminal device associated with a particular user attribute stored in the terminal management table.

Effects of the Invention

According to the aspects of the present invention, it is possible to perform a notification (especially, a push notification) in a cooperative communication/broadcasting system, thereby controlling an application running on a terminal device (including so called a television receiver) without previously establishing a connection with a large number of terminal devices. Additionally, it is possible to control the application by performing the above notification while performing a cooperation process between the television receiver and the terminal device. Further, it is possible to perform a notification only to a terminal device selected in accordance with an attribute of the terminal side (such as an attribute of a user).

BRIEF DESCRIPTION OF THE DRAWINGS

FIG. 6 is a diagram illustrating an example of a text expression of an AIT used for the cooperative communication/broadcasting system.

FIG. 23 is a diagram illustrating a structure of data stored by a terminal management table storage unit which is managed by the application management base server according to the embodiment.

FIG. 25 is a schematic diagram illustrating a data configuration of a cooperative terminal management table stored by a terminal cooperation processing unit included in the receiver according to the embodiment.

FIG. 27 is a ladder chart illustrating a procedure for a process of transmitting a push notification from an application management base server via communication.

FIG. 28 is a ladder chart illustrating a procedure for a process of transmitting a push notification from an application management base server via broadcasting.

BEST MODE FOR CARRYING OUT THE INVENTION

First Embodiment

Next, a first embodiment of the present invention is explained.

Figure 1:
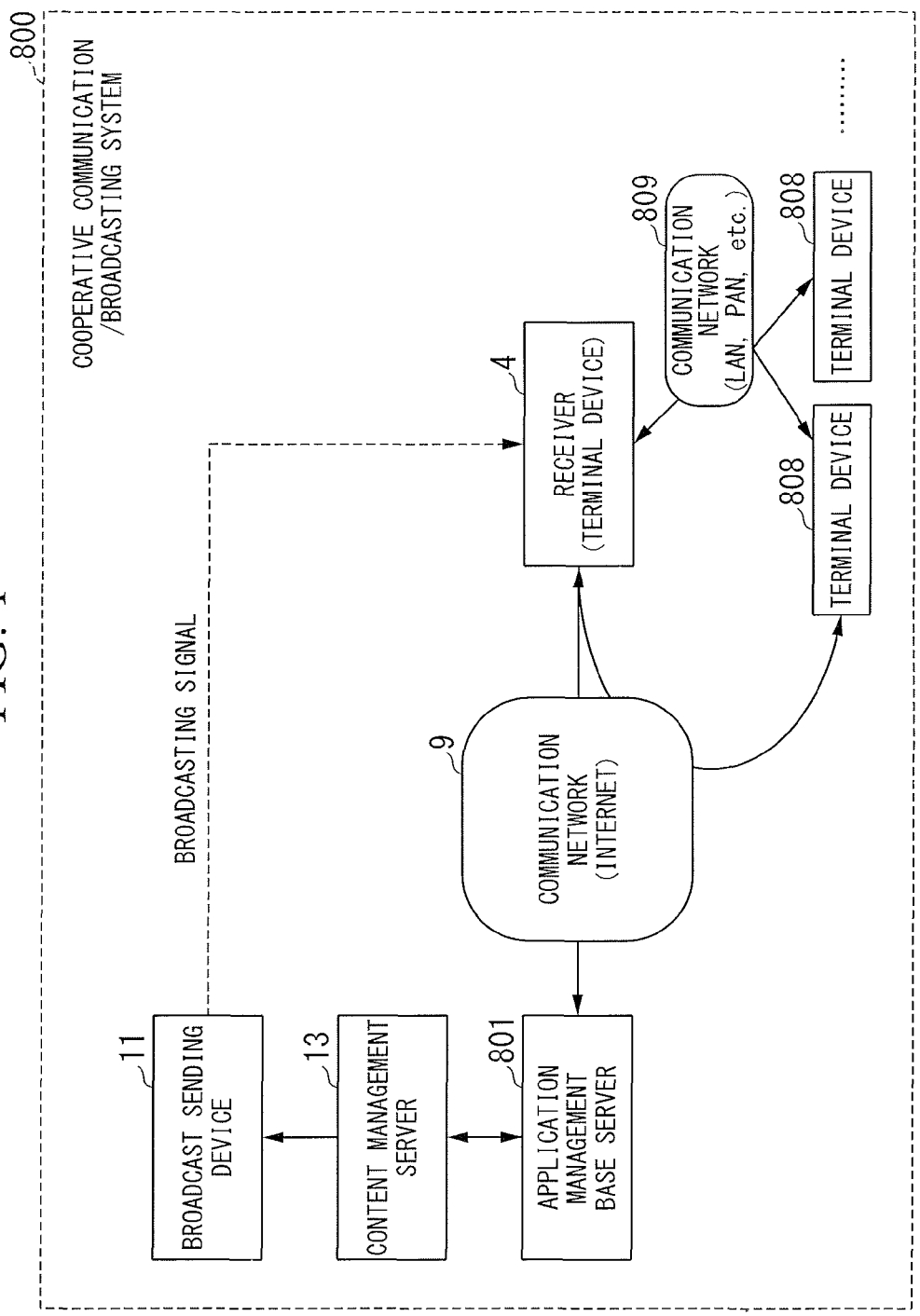
FIG. 1 is a block diagram illustrating a main configuration of a cooperative communication/broadcasting system according to an embodiment of the present invention.

FIG. 1 is a block diagram illustrating a main configuration of a cooperative communication/broadcasting system according to an embodiment. As shown in FIG. 1, a cooperative communication/broadcasting system 800 includes: an application management base server 801 (application management server); a content management server 13; a broadcast sending device 11; a receiver 4; a terminal device 808; and communication networks 9 and 809.

The broadcast sending device 11 and the content management server 13 are devices provided by a broadcasting organization. The application management base server 801 is a device provided by an organization (or a broadcasting organization in some cases) that manages an application program (hereinafter, simply called "application") running on the receiver 4 or the terminal device 808. The receiver 4 and the terminal device 808 are devices provided and used by general users (television viewers) or the like. The application management base server 801, the receiver 4, and the terminal device 808 can communicate with one another via a communication network (such as the Internet). Furthermore, a configuration may be made such that the receiver 4 and the terminal device 808 can communicate with each other via a LAN (local area network), a PAN (personal area network), or another local communication means.

Communication is also available between the application management base server 801 and the content management server 13. The content management server 13 gives a signal to the broadcast sending device 11. The broadcast sending device 11 sends this signal as a broadcasting signal. The broadcasting signal to be sent by the broadcast sending device 11 is sent from an antenna provided on the ground as an electric wave, or sent via a cable. Alternatively, the broadcasting signal sent by the broadcast sending device 11 may be sent via a satellite. The receiver 4 receives the above broadcasting signal sent from the broadcast sending device 11.

The receiver 4 is, so called, a television receiver, which retrieves an image signal from the received broadcasting signal and displays the image on a window, and retrieves a sound signal and outputs the sound from a speaker or the like. The terminal device 808 is, so called, a personal computer, a mobile communication terminal, or a tablet, which includes a CPU (central processing unit) and a display window. The receiver 4 and the terminal device 808 have platforms for acquiring applications and executing those applications. The receiver 4 and the terminal device 808 communicate with each other via the communication network 9 or 809, thereby performing an application cooperation process. Additionally, the above application cooperation process can be performed in cooperation with the content included in the broadcasting signal received by the receiver 4, that is, the signal included in the broadcasting signal. An example of the cooperation process is that operation of transmitting data (such as an answer on a quiz program on television) from a user side to a server is made performable by the communication terminal 808 using an application that runs in cooperation with the broadcasting content. More details of the cooperation process between the receiver 4 and the terminal device 808 are explained later. Here, there is no limit to the number of the receivers 4 and the terminal devices 808. Single or multiple receivers 4, and single or multiple terminal devices 808 are provided or present in a home, an office, or the like.

Next, a summary of a main process of the present embodiment is explained.

Acquisition and Installment of Application: Each of the receiver 4 and the terminal device 808 acquires an application code from an external server (not shown) or the like based on an application information table (AIT) acquired from the outside, and installs the application code in its own non-volatile storage device.

Registration of Notification Regarding Application: Each of the receiver 4 and the terminal device 808 registers to the application management base server 801, a setting that a notification (push notification) regarding the installed application is to be received. At this time, the receiver 4 and the terminal device 808 transmit registration requests to the application management base server 801. The timing of that registration is, for example, (1) at the time when that application is installed, (2) at the time when a user performs operation of the registration setting, (3) at the time when that application is activated, or the like.

Release of Notification Regarding Application: Each of the receiver 4 and the terminal device 808 requests the application management base server 801 that a notification (push notification) regarding an application is not to be received. At this time, the receiver 4 and the terminal device 808 transmit release requests to the application management base server 801. The timing of performing release of a notification is, for example, (1) at the time when that application is installed, (2) at the time when a user performs operation of the release setting, (3) at the time when that application is terminated, or the like.

Initiation of Cooperation of Application: A cooperation process between the receiver 4 and the terminal device 808 is initiated. An example of the procedure is as follows. First, the receiver 4 gives to the terminal device 808, information including a combination of data identifying the currently-received broadcasting service (such as data identifying a broadcasting station or data identifying a channel of a television), data identifying a receiver itself (such as the manufacture's serial number of the receiver or a CAS (conditional access system's) number), and data identifying an application. This information is given via the communication network 809 using IP (Internet protocol) packets, via communication means such as infrared communication or Bluetooth, or via means of the communication terminal 808 optically reading a two-dimensional code displayed on a screen of the receiver 4. Then, the terminal device 808 retrieves the data identifying the service, the data identifying the receiver, and the data identifying the application from the acquired information, and initiates a cooperation process. The terminal device 808 transmits to the receiver 4, via the communication network 9 or 809, a notification indicating initiation of the cooperation process (notification data). At this time, the terminal device 808 transmits to the receiver 4, data identifying the terminal device itself. Then, the receiver 4 receives the notification from the terminal device 808, thereby recognizing the terminal device 808 to be cooperated with. Additionally, the receiver 4 writes information concerning the terminal device 808 that has initiated the cooperation, in a cooperation terminal management table that manages all of the cooperating terminal devices 808. Thereafter, the receiver 4 and the terminal device 808 communicate with each other via the communication network to send data to be used by the application. Here, the cooperation terminal management table will be explained later.

Push Notification from Server Side: The application management base server 801 transmits a push notification regarding a particular application, based on the above notification registration. As means for the application management base server 801 to transmit the push notification, there are a case where communication via the communication network 9 is used and a case where the broadcasting signal transmitted from the broadcast sending device 11 is used. In the case where communication via the communication network 9 is used, connection is previously established between the application management base server 801 and the receiver 4 or the communication terminal 808. By performing the push notification, it is possible to control, from the application management base server 801 side, the application running on the receiver 4 or the communication terminal 808. Here, controlling the application includes, for example, controlling a life cycle of the application (such as forcibly terminating the running application).

The detailed functions of each device shown in FIG. 1 and its operational procedure will be explained later with reference to FIG. 22 and subsequent drawings.

[Explanation of Cooperative Communication/Broadcasting System to which Present Invention is Applied]

Here, a cooperative communication/broadcasting system to which the present invention is applied is explained. The cooperative communication/broadcasting system (communication broadcasting integrated system, communication broadcasting system, transmission and reception system) to which the present invention is applied is, for example, a Hybridcast (trademark) system, which provides cooperative communication/broadcasting services (Hybridcast (trademark) services, communication broadcasting integrated services, communication broadcasting services). Regarding cooperative communication/broadcasting services implemented by the cooperative communication/broadcasting system to which the present invention is applied, digital broadcasting services are cooperated with communication services via the Internet or the like. Regarding cooperative communication/broadcasting services, for example, a receiver, such as a digital television, a personal computer, or a mobile terminal, simultaneously displays on a window for a broadcasting program (hereinafter, also described as "a program") transmitted by broadcasting (hereinafter, also described as "a broadcast window" of display windows for a program), a window for a service or content (hereinafter, also described as "an application window" or "a display window for an application") that an application installed in that receiver acquires by communication.

[1. System Model]

[1.1 Users of Cooperative Communication/Broadcasting System]

Figure 2:
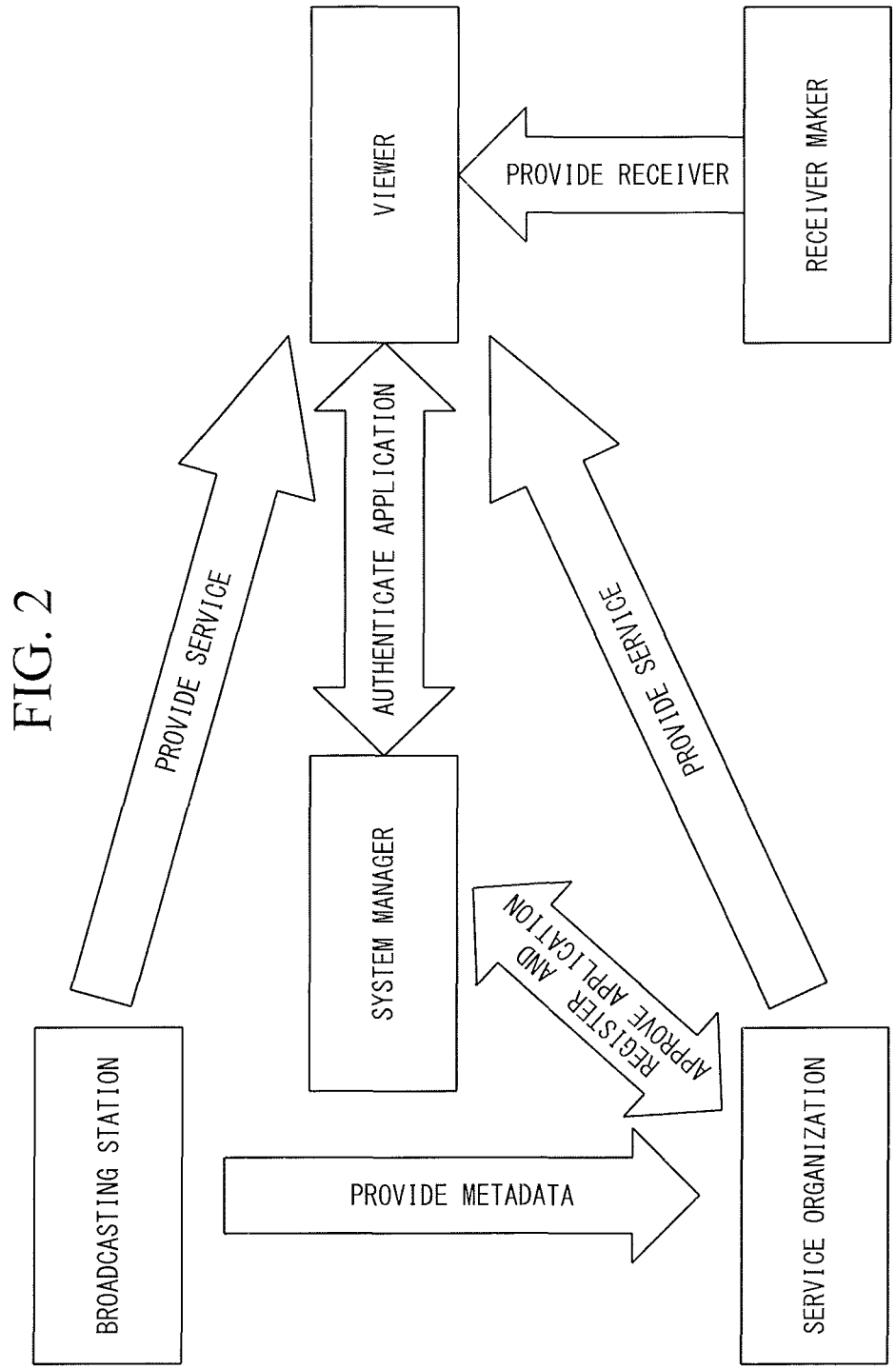
FIG. 2 is a diagram illustrating users of a cooperative communication/broadcasting system to which the present embodiment is applied and relationships thereamong.

FIG. 2 is a diagram illustrating users of a cooperative communication/broadcasting system and relationships thereamong.

A broadcasting station that sends programs with organization delivers the programs to viewers by means of broadcasting electric waves or via communication networks. In order to fulfill cooperative communication/broadcasting services, the broadcasting station provides metadata related to the programs to a service organization.

The service organization that provides cooperative communication/broadcasting services produces and delivers content and applications (hereinafter, also described as "appli") for providing communication/broadcasting services to viewers. Hereinafter, a simply described "application" means an application for providing a cooperative communication/broadcasting service (an application for a cooperative communication/broadcasting service). A producer and a deliverer of content or an application need not be the same service organization. The broadcasting station may serve as a service organization. The service organization can provide information concerning links to other service organizations. To show that an application to be provided is a formal application, the service organization can apply a registration of the application to a system manager and acquire an approval therefrom. The approved application is not subjected to any operational limitations on the receiver. On the other hand, a window for displaying an unauthorized application is not allowed to overlap a window for a program and the sound thereof, but is allowed to be displayed outside a window for a broadcast program by reducing the size of the window for the application. An approved application is referred to as a formal application. An unapproved application is referred to as an informal application. Here, the formal application is also referred to as a registered application, an already-authorized application, a certified application, an official application, an authorized application, an A (authorized)-type application, or an A-application. Additionally, the informal application is also referred to as a general application, an unauthorized application, an uncertified application, an unofficial application, a U (unauthorized)-type application, or a U-application.

The system manager is an agent that certifies that an application to be provided to a viewer (receiver application) is formal. The system manager determines whether or not to approve the applied application if the right of the determination is delegated from the broadcasting station.

A receiver manufacturer manufactures and sells receivers. The receiver manufacturer can make receivers operable by previously installing applications for performing various settings in the receivers. In this case, a window for the application on the receiver may overlap a window for a program (video image).

A viewer who views a program broadcast by the broadcasting station receives cooperative communication/broadcasting services. The viewer can download and activate applications with his/her own will. Additionally, the viewer can overlap a window for an application on a window for a program (video image).

[1.2 System Configuration of Cooperative Communication/Broadcasting System]

Figure 3:
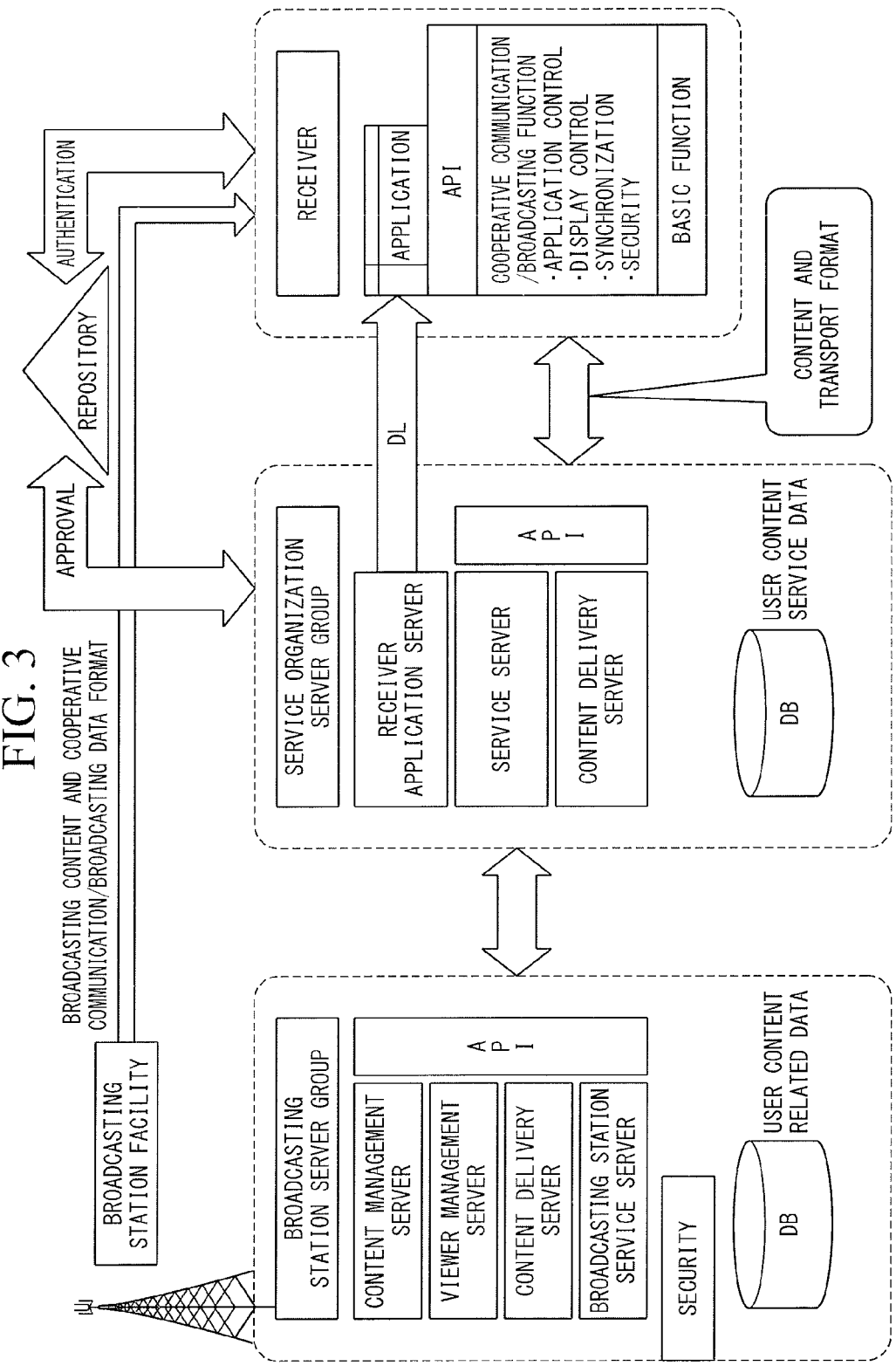
FIG. 3 is a diagram illustrating the entire configuration of the cooperative communication/broadcasting system.

FIG. 3 is a diagram illustrating the entire configuration of the cooperative communication/broadcasting system. The cooperative communication/broadcasting system is configured such that "a broadcasting station server group", "a service organization server group", and "a receiver" are functionally added to the existing broadcasting facility using electric waves.

The broadcasting station owns a broadcasting facility. Further, broadcasting stations constitute, manage, and operate the broadcasting station server group, or both the broadcasting station server group and the service organization server group. Additionally, service organizations constitute, manage, and operate the service organization server group. The system manager manages and operates a repository server. A receiver manufacturer manufactures and sells receivers. A viewer owns a receiver and receives cooperative communication/broadcasting services.

A receiver (Hybridcast (trademark) receiver, broadcast reception communication device) is mounted with a standardized common API (application program interface). Additionally, the receiver receives a broadcast in the existing format, such as a terrestrial digital broadcast and a BS (broadcasting satellite) digital broadcast.

The broadcasting facility multiplexes with broadcasting waves, signals for activating cooperative communication/broadcasting services. A multiplexing format will be explained later.

[1.3 Example of Configuration of Broadcasting Server Group]

The broadcasting server group manages and delivers content and metadata owned by the broadcasting station. For example, the broadcasting station server group includes various servers, a data storage unit (DB (database)), and an API. Servers constituting the broadcasting server group include a content management server, a viewer management server, a content delivery server, and a broadcasting station service server.

The content management server that manages content manages programs and metadata which are broadcasting content. The content management server includes a program management server that manages broadcast programs or programs to be broadcast, and a metadata management server that manages metadata related to programs. Metadata indicates, for example, a program title, a program ID, a program summary, casts, staffs, the broadcast date, a script, a caption, an explanation, and the like.

The viewer management server manages viewers (users). The content delivery server delivers content data by communication. The broadcasting station service server is a server for a broadcasting station to provide services to the service organization. Services to be provided by the broadcasting station service server include, for example, a social networking service operated by the broadcasting station, a weblog (blog) for each broadcast program, and the like.

The data storage unit of the broadcasting station server group includes content owned by the broadcasting station, a portion that stores metadata, and a database. There is an access limitation such that only the managing service organization may access those stored data, and others may not access those data.

The API for the broadcasting server group is an API that provides data in response to a request from the service organization server group. The API includes: a program that an application invokes to receive a service; and an execution unit that executes the invoked program.

[1.4 Example of Configuration of Service Organization Server Group]

The service server group managed and operated by the service organization manages and provides applications and content. The service server group includes a receiver application server, a service server, a content delivery server, a data storage unit (DB (database)), and an API.

The receiver application server is a server that manages applications of cooperative communication/broadcasting services. The service organization stores, manages, and delivers applications that run on the receiver. The service organization is constituted of a group or individuals. In response to a request from a receiver, the receiver application server informs the receiver of the storage place of an application file (application file will be explained later), and delivers the application file.

The service server is a server that provides services in response to a request from the application running on the receiver. The service server includes, for example, a multilingual caption server, a speech rate conversion sound server, a social TV server, a recommendation server, a program view server, a bookmark server, and the like.

The content delivery server is a server that provides content in response to a request from the application running on the receiver. The content delivery server includes, for example, a VOD (VideoOn Demand) delivery server, a caption delivery server, a multi-view delivery server, and the like.

The data storage unit of the service organization server group is a unit that stores content data, metadata, data generated by the service organization, viewer data, and application files. Only the managing service organization may access the data stored in the data storage unit, and others may not access those data.

The API of the service server group is an API that provides an application file, content, and a service in response to a request from the application running on the receiver.

[1.5 Receiver]

The receiver receives and displays a broadcast in the existing format, and executes a cooperative communication/broadcasting service. The broadcast in the existing format includes a satellite broadcast such as a terrestrial digital broadcast and a BS digital broadcast, and a data broadcast. Additionally, the receiver is connected to the Internet.

The receiver transmits a download request for an application to the service organization server based on the information multiplexed with the received broadcasting wave. The receiver executes an application program included in the downloaded application file, and thereby the application runs on the receiver. The application running on the receiver accesses the service organization server and thus acquires content.

Additionally, the receiver has a cooperative communication/broadcasting function that is a function necessary to execute a cooperative communication/broadcasting service, such as a synchronization function and an application control function. The API for the cooperative communication/broadcasting function is commonalized. For this reason, a production of an application is easy and an application is not dependent on the receiver.

Cooperative communication/broadcasting services have used a function for cooperating with a device, such as a personal computer and a mobile terminal.

The cooperative communication/broadcasting function includes a cooperative communication/broadcasting basic function and an option function to be mounted as appropriate. The receiver manufacturer mounts the cooperative communication/broadcasting basic function on every receiver. The application uses the cooperative communication/broadcasting function through the API. The cooperative communication/broadcasting function operates based on the API as will be explained later.

The API mounted on the receiver is defined so that the API is not dependent on the receiver and applications operate in the same manner. All applications execute processes of the receiver through the API. For this reason, the applications cannot access the functions unique to the receiver without going through the API.

[1.6 Terminal Cooperation Model]

Figure 4:
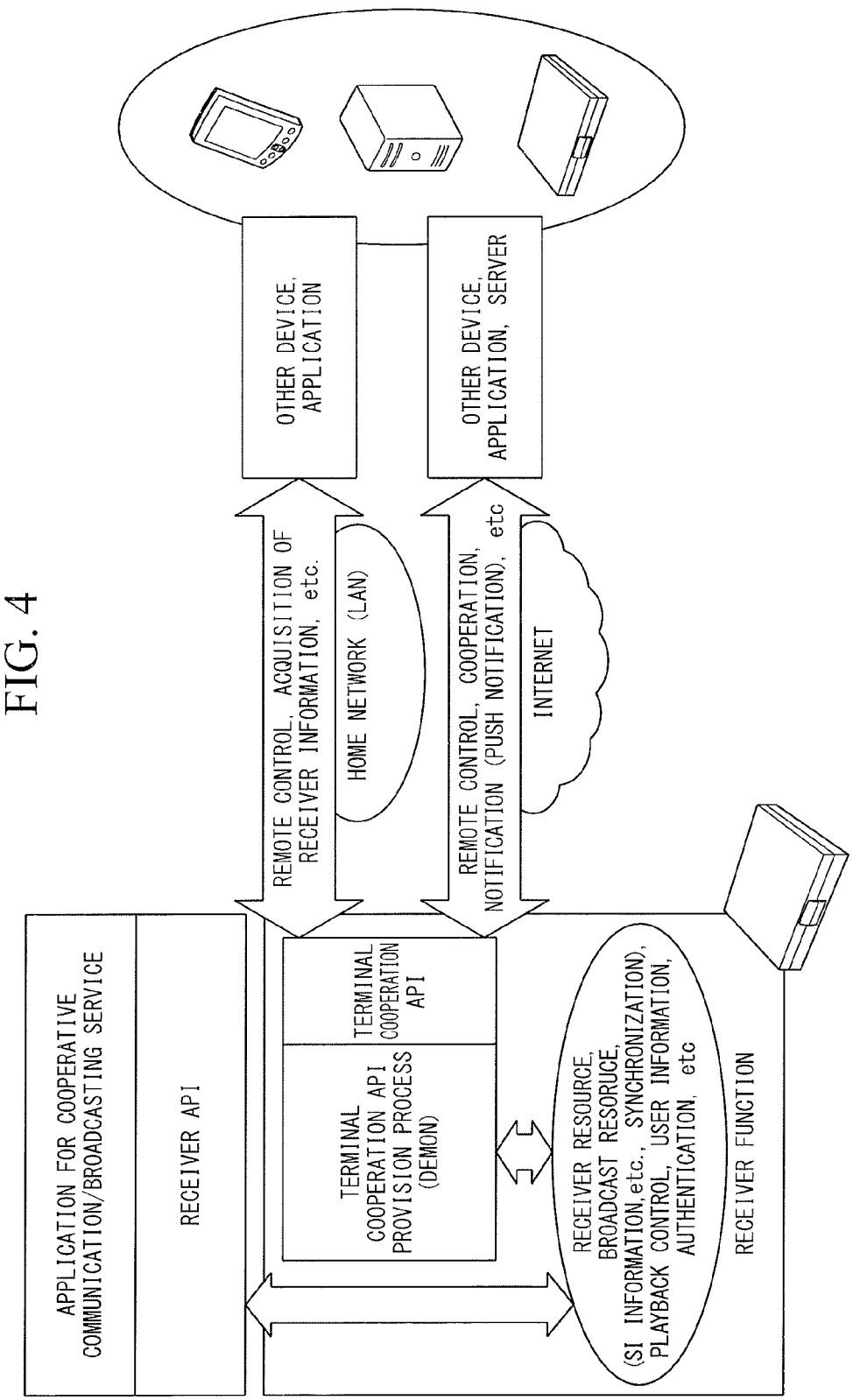
FIG. 4 is a diagram illustrating a terminal cooperation model of the cooperative communication/broadcasting system.

FIG. 4 is a diagram illustrating a terminal cooperation model of the cooperative communication/broadcasting system.

The receiver can provide services in cooperation with a terminal such as a mobile terminal. The cooperating terminal includes, for example, a personal computer, a cellular phone, a tablet, a smart phone, a PDA (personal digital assistant), and the like. The receiver provides, as an API, a function available to another terminal as a receiver function. The API that provides a function available to other terminals is referred to as a terminal cooperation API. For example, using the terminal cooperation API, an application that runs on a mobile terminal can access broadcasting resources such as an acquisition of program information, and invoke a receiver function such as a playback control.

[1.6.1 Terminal Cooperation API]

The terminal cooperation API is an API for another terminal or an application running on that terminal to use receiver functions. A cooperating terminal includes a terminal on a home network (LAN) and a terminal to be accessed via the Internet. The definition of an API that provides various operations will be explained later.

[1.6.2 Terminal Cooperation API Provision Process]

A terminal cooperation API provision process that operates on the receiver operates the terminal cooperation API. The terminal cooperation API provision process operates as a type of demon process that is resident and operates.

[1.6.3 Protocol to Invoke API]

For example, RESTful (REST: representation state transfer), UPnP (universal plug and play), XMPP (extensible messaging and presence protocol), or the like is used as the protocol that invokes a terminal cooperation API.

[1.6.4 Push Notification Function]

The receiver supports a notification function for a server or the like on the Internet to notify the receiver of information by pushing. The receiver receives the information notified from the server or the like by a push notification. There is a case in which operation of some receiver is controlled using the notification function. The notification function is defined as one of specifications of the terminal cooperation API.

[2. Cooperative Communication/Broadcasting Application]

[2.1 Service and Application Model]

The application model of the cooperative communication/broadcasting system is a model generated by making additions and changes to the concept of the application model of DVB-GEM1.2.

[2.1.1 Cooperative Communication/Broadcasting Application]

Operation of the application for cooperative communication/broadcasting services is grouped into two patterns which are operation executed in cooperation with AV (audio visual) content (cooperation) and operation executed only by an application (non-cooperation). The AV content is broadcasting content (program) or communication content (VoD, etc.).

In the case of cooperation, a life cycle control of application, such as activation, is executed in cooperation with a broadcast or communication content. An application is activated based on an AIT (application information table, application activation information) delivered with AV content. In this case, it is possible for a provider of AV content, such as broadcasting organization, to control the life cycle, such as an automatic activation and termination of an application, and the like, in addition to operations of activation and termination performed by a viewer.

On the other hand, in the case of non-cooperation, an application activates and terminates by itself, not in cooperation with a broadcast or communication content. In this case, the life cycle of the application, such as an initiation and termination of the application, can be controlled only by a viewer.

[2.1.2 Service]

Conventionally, a service is organized by a broadcasting organization, and a service means continuous programs that can be broadcast as part of a schedule. In the cooperative communication/broadcasting system, the above concept is expanded, and two types of service, which are a stream dependent service and an independent service, are defined.

Figure 5:
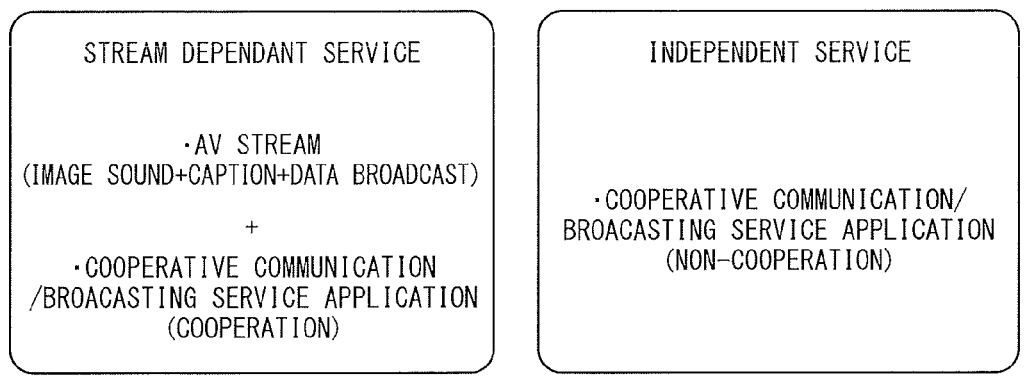
FIG. 5 is a conceptual diagram illustrating types of services in the cooperative communication/broadcasting system.

FIG. 5 is a conceptual diagram illustrating types of service.

In the receiver, a stream dependent service and an independent service are selected in a pseudo manner, thus activating a related application.

The stream dependent service is an expansion of the concept of the conventional service, and includes, in addition to an AV stream transmitted by broadcasting or communication, an application (multiple applications allowed) that operates in cooperation with the AV stream. The application can be activated cooperatively by selection and playback (selection of a station in the case of broadcasting) of an AV stream.

On the other hand, an independent service does not include image and sound streams, but includes only an application (multiple applications allowed). The application is activated by a viewer selecting an independent service.

[2.1.3 Activation of Application Acquired by on-the-Fly and Activation of Installed Application]

There are two methods of activating an application, which are a method of acquiring an application file on-the-fly and activating the application file, and a method of activating an application file previously installed in the receiver. "On-the-fly" is a method of acquiring an application file by communication at the time when the application is executed, which is also referred to as an "uninstalled" method or a "direct execution" method.

Here, based on a notification of an application by the AIT as will be explained later, the receiver activates an application program in an application file stored in a local file system. When the receiver acquires and installs an application file by communication, the receiver rewrites information in a location hierarchy set to a related AIT (see section 2.5.1) with the location on the local file system. Operation of the receiver generating a value for identifying an independent service is necessary as appropriate (necessary for each AIT for an independent service).

[2.2 Notification of Application (Signaling)]

[2.2.1 Application Activation Information (AIT)]

Notification of an application included in a service is performed using application activation information notified at the time when a service is selected. An AIT defined by ARIB STD-B23 (hereinafter described as "ARIB-J") is used as application activation information. For each of the stream dependent service and the independent service, the AIT dedicated for that service is notified. The details of transmission of an AIT for each service are shown hereinafter.

FIG. 6 is a diagram illustrating a text expression of the AIT used in the cooperative communication/broadcasting system.

The AIT used in the cooperative communication/broadcasting system is based on the AIT defined by the ARIB-J. For the AIT, there are a binary expression to be transmitted by an SI (service information) table, and a text expression (AIT file) in XML (extensible markup language) format. In FIG. 6, an example of the text expression is shown. In the AIT, an application ID (applicationIdentifier) that identifies an application, a control code (controlCode) that controls a state of the application, location information (location) that indicates the stored position (repository) of an application file.

[2.2.2 Notification of Application that Cooperates with AV Content]

For a notification of an application that cooperates with AV content, there are cases where the AIT is multiplexed with AV content to be transmitted by MPEG (moving image experts group)-2 TS (transport stream) and where information concerning the AIT is separately transmitted. The AIT is transmitted in cooperation with the AV content, thereby making it possible for the receiver to perform a life cycle control, such as an activation of the application in cooperation with a broadcasting program, and a dynamic activation of the application in cooperation with the progress of the program.

The notification method includes, for example: (1) addition of an ES (elementary stream) for the AIT; (2) addition of a descriptor to an EIT (event information table); (3) carousel transmission; (4) acquisition of an AIT file by communication; (5) dynamic transmission of an AIT file by communication; and the like.

(1) In the case of addition of an ES for the AIT, the ES for the AIT is multiplexed with a broadcasting TS, similarly to the definition by the ARIB-J.

(2) In the case of addition of a descriptor to an EIT, a descriptor is added to the EIT (p/f), and the same information as the information to be transmitted by the AIT is transmitted.

(3) In the case of carousel transmission, the AIT is transmitted by DSM-CC (digital storage media command and control) data carousel. For example, an AIT file is transmitted by a particular module. It is expected that the carousel transmission will cause overhead due to an acquisition time, but there is no need to change the existing broadcasting signals.

As an application example of the carousel transmission, a component tag and a module of a carousel for transmitting a cooperative communication/broadcasting activation file are fixed. For example, "AA" is set to the component tag, "0000" is set to the module ID, a type indicating the AIT is set to the module Type descriptor. The receiver monitors an update of the module. Upon detecting an update, the receiver reads the AIT and executes a control specified by the AIT (the life cycle control on an application).

(4) In the case of acquisition of the AIT file by communication, a separately prepared AIT file is acquired simultaneously with a selection of AV content. For example, both the AIT file and the AV file are acquired based on information describing information concerning AV content to be played back (content ID) and application activation information (AIT). The concept of use unit content for server broadcasting (ARIB TR-B27) and entry components may be used.

(5) In the case of dynamic transmission of the AIT by communication, while AV content is played back, a control, such as an activation of a new application and a termination of the running application, is performed by the AIT transmitted by communication. Here, in a case where a control is performed at an unexpected timing, a push notification via communication is performed.

[2.2.3 Notification of Application that Operates Independently]

The receiver acquires, by communication, an AIT including information concerning activation of an application that operates independently. The independent application is acquired from a known application repository. A procedure for acquiring information concerning an activation of each independent application is shown hereinafter.

(1) A location of the application repository is set to the receiver. The location may be previously set at the time of shipping, or multiple repositories may be added later by some method.

(2) When an application menu is opened, the receiver acquires an application list (including a location description of the AIT for each application) from the application repository, and applications are displayed on the menu.

(3) The AIT for the application selected by a viewer is acquired by communication.

The above procedure is executed using a WEB API provided by the repository. Additionally, the application that operates independently does not operate in cooperation with AV content, and therefore does not execute a dynamic life cycle control at the timing previously specified. The control (such as a termination) at the timing not previously specified is executed by a push notification via communication.

[2.3 Activation and Termination of Application]

[2.3.1 Life Cycle of Application]

[2.3.1.1 Life Cycle]

Figure 7:
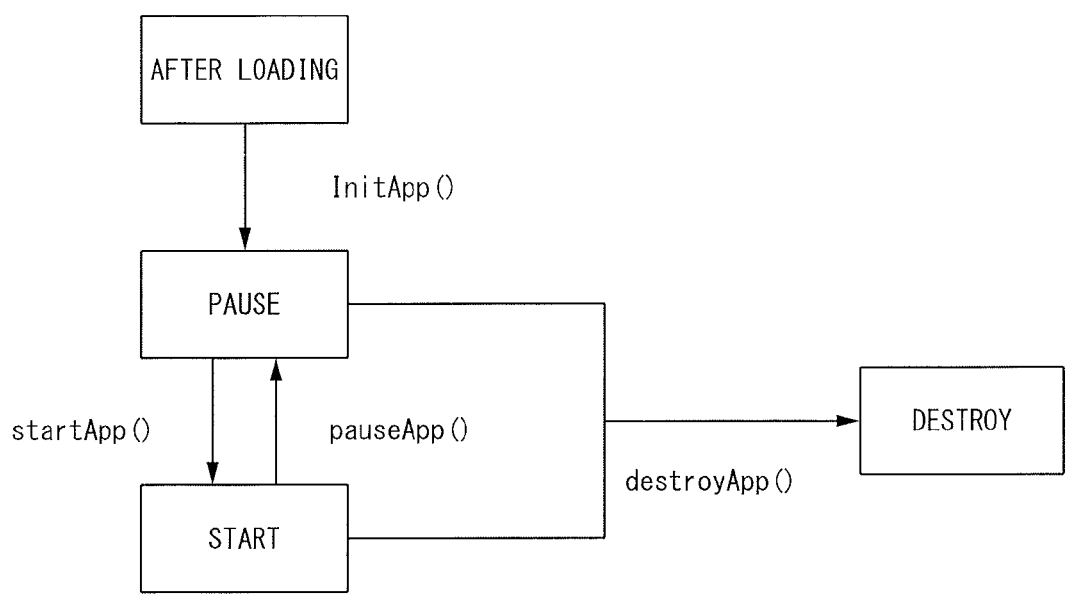
FIG. 7 is a diagram illustrating a life cycle of an application used in the cooperative communication/broadcasting system.

FIG. 7 is a diagram illustrating the life cycle of an application.

The states of the application are based on the states of an application defined by the ARIB-J, and include five states: "Not Loaded (pre-loading)", "Loaded (post-loading)", "Paused (pausing)", "Started (initiation)", and "Destroyed (destruction)". In those five states, a series of steps from the time when the application is loaded to the time when the application is executed and terminated is called the life cycle. Additionally, a control of transition between each states is called a life cycle control.

[2.3.1.2 Basic Life Cycle Control of Application that Cooperates with AV Content]

A life cycle control of an application that cooperates with AV content is executed basically through a selection of a stream dependent service.

The selection of a stream dependent service is performed by a viewer. A service is a set of content items including AV content and an application. The life cycle of the service, such as activation and termination, is controlled based on a control code included in the AIT transmitted with the application. In some cases, one service includes multiple applications which operate simultaneously.

Selection of a service that triggers an activation of an application is controlled by an application through the receiver API, by a navigator as a resident application of the receiver, by a control of buttons of a remote controller in the case of broadcasting services, or the like. At the time of changing the service, presentation of content (AV content and an application) included in the services before and after the change is switched. In a case where different applications are included in the services before and after the change, the application running before the change is terminated by the change of service, and the different application becomes able to be activated after the change. The details of those operations are explained later in section 2.4.

[2.3.2 Activation of Application]

[2.3.2.1 Activation by AIT]

In a case where a service (stream dependent service, independent service) is selected in the receiver, the application for which "auto-start" is specified by the control code included in the AIT provided with the service is automatically activated with the selection of the service without any express action from a viewer. While the service is selected, the life cycle thereof is controlled by an application signaling with respect to that service. For example, in the case of a broadcasting service, the receiver always monitors the MT transmitted with a broadcast, and reacts to a change thereof. Thus, the receiver can control a new application to be automatically activated (auto-start) in the interim by an application signaling, such as transmission of the AIT.

The application for which "auto-start" is not specified by the application activation information included in the AIT is not automatically activated, and requires an express activation by the viewer. The express activation is performed by an application launcher of the receiver for a resident application. For example, a cooperative communication/broadcasting service button of a remote controller is pressed at the time of selection of a broadcasting service. Thus, a menu for activating an application is opened on the receiver, and a list of applications that cooperate with the current broadcasting (communication) service is displayed. Then, the viewer performs an operation to select an application to be activated and activate the application.

[2.3.2.2 Activation from Cooperative Communication/Broadcasting Application]

Since multiple applications can be activated in a service, there are some cases where another application included in the same service is activated from the already-activated application. An API for activating another application by specifying the application ID is defined in the ARIB-J application execution platform. In other execution platforms, an API with a similar function is defined.

[2.3.2.3 Activation from BML (Broadcast Markup Language)]

The receiver is provided with an execution platform for the existing BML data broadcasting, in addition to the execution platform for cooperative communication/broadcasting applications. For this reason, an API for controlling activation of cooperative communication/broadcasting applications is added as the API for the BML. Here, the BML is a multimedia encoding format defined by the ARIB STD B24, which has been used as a data broadcasting format for the existing Japanese terrestrial BS/CS digital broadcasting.

[2.3.2.4 Activation of Application that Operates Independently]

An independent service is a virtual service including only an application. By selection of an independent application, an AIT is acquired by the same mechanism as activation from AIT in section 2.3.2.1, and thus an application is activated. However, in the independent service, at least one auto-start application is activated. Selection of an independent service is performed from, for example, an application launcher.

[2.3.3 Termination of Application]

[2.3.3.1 Termination by AIT]

The life cycle of the activated application is controlled by an application signaling with respect to that service. For example, in the case of broadcasting, the receiver always monitors an AIT transmitted with a broadcast, specifies a control code "destroy" with respect to the running application, and thus terminates the application. Also in a case where an AIT is multiplexed with a stream dependent service to be transmitted by communication, it is possible to control a termination of a cooperating application.

[2.3.3.2 Termination by Application Itself]

An application itself terminates the application by itself using an API for termination.

[2.3.3.3 Termination by Another Application]

Using an application terminating API to be executed by an application, another running application is terminated. In this case, an adequate security policy for terminating the other application is necessary.

[2.3.3.4 Termination at Time of Change to Another Service]

At the time when the receiver changes the service to another service, the application included in the service before the change, which is among the applications included in stream dependent services, is terminated, and an application transmitted by signaling in a new service is activated. In a case where the same application is included in the services before and after the change, operation may be continued. This is controlled by a flag included in the AIT. The details of a service bound application included in a stream dependent service will be explained in section 4.2.

[2.3.3.5 Termination by Receiver]

The receiver terminates the specified application by a receiver function. For example, the receiver displays a list of running applications, and terminates the application selected by a viewer.

[2.3.3.6 Dynamic Termination of Application]

To dynamically control a termination of an application, an AIT file for ordering a termination of an application is transmitted to the receiver. In this case, the AIT is notified by a push notification.

[2.3.4 Activation of Multiple Applications]

[2.3.4.1 Application Transmitted by Signaling in Same Service]

The receiver can simultaneously execute applications listed by the AIT in the same service.

[2.3.4.2 Simultaneous Activation of Applications that Operate Independently of Application that Cooperates with AV Content]

An application that cooperates with AV content is activated only in stream dependent services. On the other hand, an application that operates independently may be simultaneously activated at any timing with an application that cooperates with AV content or with another application that operates independently.

[2.3.4.3 Management of Resources at Time of Activation of Multiple Applications]

In a case where multiple applications are activated, there are some cases where those applications require the same resource of the receiver (such as a display). The receiver has a mechanism, such as a resource manager, and thereby performs operations of adequately allocating resources, of stopping execution of the application if no resources are available, and the like.

[2.4 Boundary of Application]

[2.4.1 Basic Treatment of Bound/Unbound]

Applications include two types of applications, which are a bound application associated with an organized service and an unbound application not associated with the organized service. Which organized service a bound application is associated with is determined by which organized service the AIT including information concerning activation of that application is acquired from.

A bound application enters a state of being executable while the associated organized service is received. In other words, the bound application is activated by the AIT from the organized service and terminated when the reception of the organized service ends (when the organized channel being received is changed). Another application activated from the bound application is also treated as a bound application. When the original application activated first from a series of related bound applications ends, the other applications activated from the first application also end.

An unbound application is not associated with an organized service. For this reason, execution of the application is continued even if the organized service being received is changed. An AIT for activating an application cannot be acquired from the organized service. For this reason, activation information is given to the receiver by another means (for example, by acquiring an AIT file associated with the application using an application launcher or the like), and thus the unbound application is activated. Another application activated from the unbound application is also treated as an unbound application. Basically, an application is expressly terminated by an operation of a viewer. However, the application is terminated also in a case where an instruction (KILLALL) to terminate all applications is given by the AIT from the organized service being received.

[2.4.2 Unique Treatment of Unbound Application]

An unbound application is not associated with an organized service. As shown in section 2.3.2.4, however, the unbound application is associated with a virtual organized service (generated in the receiver at the time of start-up of the receiver), and thereby the same activation process mechanism as that for the bound application can be applied.

A method of generating a virtual organized service is implementation dependent on a receiver. What identification value is to be given to that organized service differs depending on the implementation of the receiver. In a case where an application file is stored in the receiver so as to be activated by an application launcher at any timing, however, it is necessary for the receiver to update the contents of the AIT so that an ID identifying a virtual organized service, an acquisition source of the application file, and the like (the AIT acquired from a service organization server or a repository includes a description of that server as the acquisition source, and therefore a change has to be made to acquire the application file from a storage area in the receiver), are suited to the implementation of the receiver.

[2.5 Application Acquisition Method]

[2.5.1 Acquisition Based on AIT]

As described above, activation information of all applications is given by the AIT. Acquisition of the application file is instructed by location information of the application included in the AIT. For example, in the case of FIG. 3, the location information is described in the hierarchy of "/ApplicationList/Application/applicationSpecificDescriptor/dvbjDescriptor/location" (which is described in XML as the contents of the location element). The description of the location information is, for example, "http://192.168.11.37/demo.jar".

The above case is an example where "demo.jar" (application archive of Java (trademark)) is acquired using HTTP (hypertext transfer protocol) protocol. Transport protocol to be used and a package format of applications will be explained later.

[2.5.2 Package Format for Application]

A package format for applications depends on an application format (Java (trademark) or HTML5), and the like. The receiver acquires some bundle of files or an entry file, thereby acquiring a series of files required for activation of applications (programs themselves, image files, and the like). That series of files are the application files. Formats of application files include, for example, a compressed type of a series of files (zip file or the like), a Jar file (Java (trademark) execution platform), an entry HTML file (in the case of HTML5 execution platform), a uniquely defined entry file, and the like.

[2.5.3 Application Transmission Method]

Transmission methods for acquiring application files via a network include acquisition using HTTP protocol and acquisition using FILE protocol.

In the case of acquisition using the HTTP protocol, a GET method is used to acquire application files. "http://~" is set to specify the AIT location.

On the other hand, in the case of acquisition using the FILE protocol, when an application file (application program) stored (installed) in the local of the receiver, "http:///~" is set to specify the AIT location.

[3. Conditions of Interface]

[3.1 Cooperative Communication/Broadcasting Service Control Signal of Broadcasting Wave]

Broadcasting waves require a mechanism for sending the application activation information explained in section 2.2.2. Further, assuming the time that an emergency warning is broadcast, "KILLALL" is added to an application control code (application_ control_ of the AIT defined in ARIB STD-B23, Part 2, Section 10.1.6.3.2, in order to forcibly terminate all applications. Table 1 indicates the meaning of the control code "KILLALL" to be added.

TABLE 1

| Code | Identification Name | Meaning |
|---|---|---|
| 0x08 | KILLALL | All applications are terminated regardless of whether it is cooperation or non-cooperation. For ARIB-J, the unconditional parameter is set to be true, and thus destroy method in Xlet is invoked. For the HTML5 browser or the like, the browser is forcibly terminated without displaying a dialog or the like for inquiring a user about allowance or forbiddance of termination. |

Additionally, descriptors are added to the EIT and the AIT in order to control presentation of applications based on the relationship between applications and AV content. The details are explained in section 4.3.

[3.2 Broadcasting Server Group API]

Figure 8:
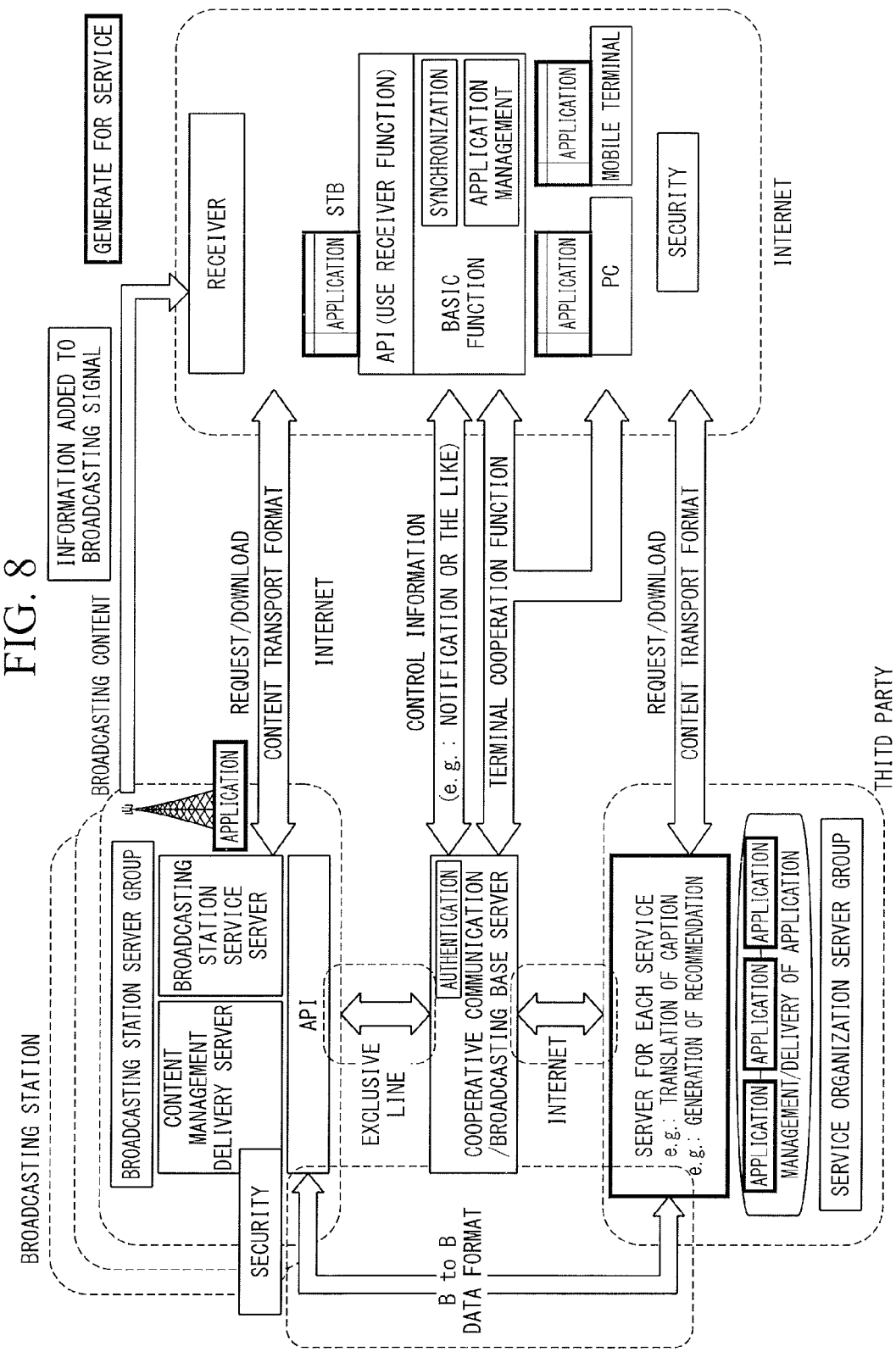
FIG. 8 is a diagram illustrating flow of data between organizations in the cooperative communication/broadcasting system.
Figure 9:
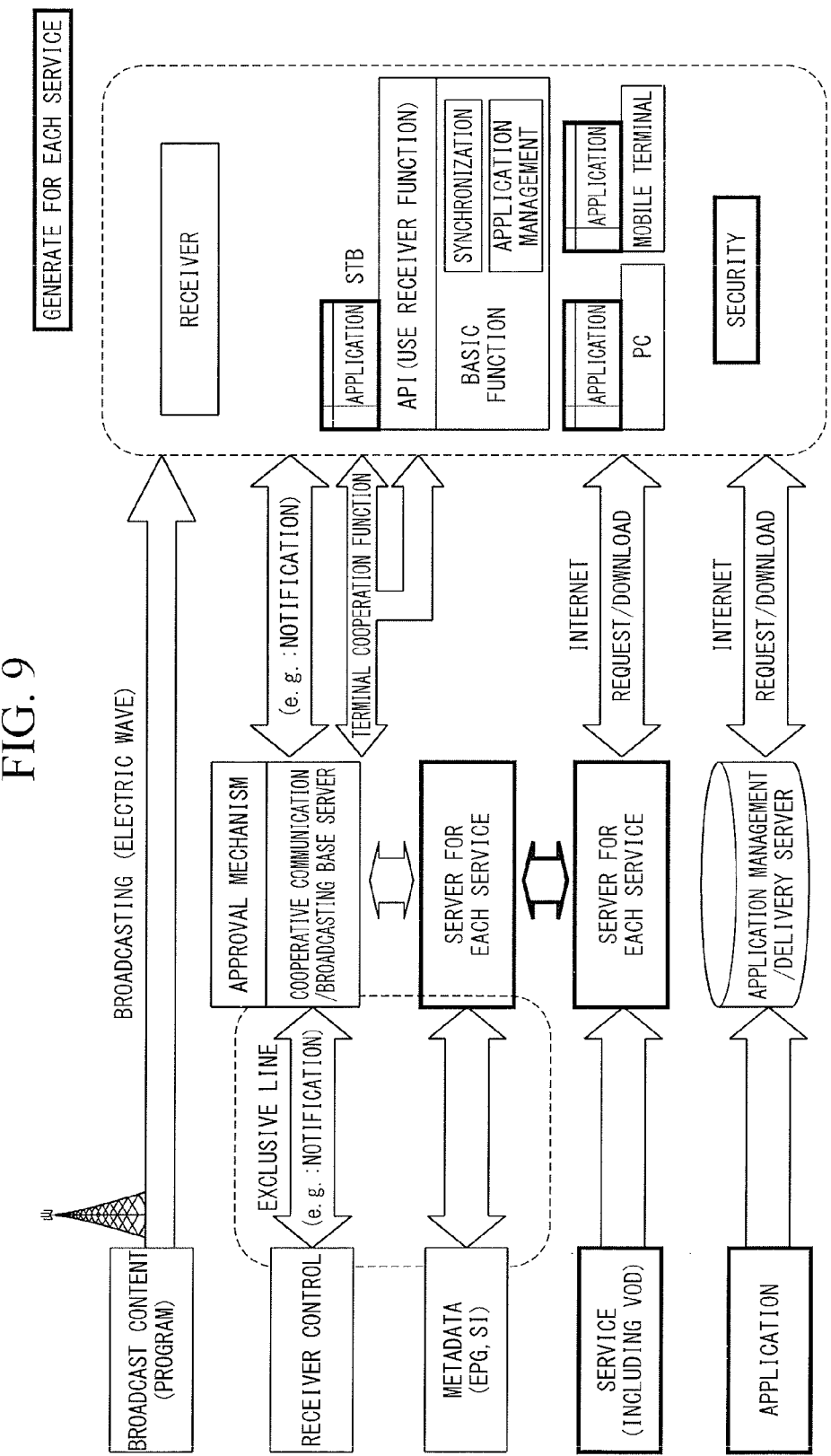
FIG. 9 is a diagram illustrating flow of data in the entire cooperative communication/broadcasting system.

FIG. 8 is a diagram illustrating flow of data between organizations in the cooperative communication/broadcasting system. FIG. 9 is a diagram illustrating flow of data in the entire cooperative communication/broadcasting system.

Here, an explanation is given with respect to definitions of the API between a server for each service belonging to the broadcasting station server group and a server for each service belonging to the service organization server group, between the broadcasting server group and the cooperative communication/broadcasting base server, and between the cooperative communication/broadcasting base server and a server for each service belonging to the service organization server group, which are shown in FIG. 8, and definitions of the API between the receiver control and the cooperative communication/broadcasting base server, and between metadata and a server for service, which are shown in FIG. 9.

[3.2.1 API]

Communication between the broadcasting server that is one of servers constituting the broadcasting station server group and a service organization server that is one of servers constituting the service organization server group is performed in a REST format. Additionally, it is expected that the directory structures of servers differ between a broadcasting station server and a service organization server in accordance with a provided service, and therefore API is determined by an agreement therebetween. An example of a URL of the broadcasting station server and the service organization server is shown below.

http://hybridcast.org/{broadcasting station name}/{server name}/{content ID}/{data to be managed}/{sorting method}/{head item},{number of pieces}/?{parameter}={value}/

[3.2.2 Recommendation Service]

Figure 10:
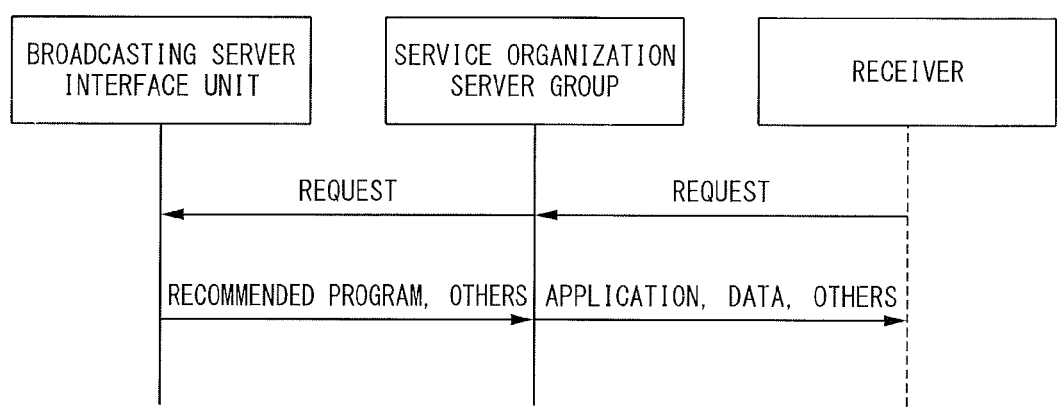
FIG. 10 is a diagram illustrating a sequence of a recommendation service in the cooperative communication/broadcasting system.

FIG. 10 is a diagram illustrating a sequence of a recommendation service. Methods used between the service organization server group and the broadcasting station server are "GET", "POST", "PUT", and "DELETE". An example of command formats is shown below.

(1) http://hybridcast.or.jp/{broadcasting station name}/{server name}/{content ID}/{data to be managed}/{sorting method}/{head item},{number of pieces}/

(2) http://hybridcast.or.jp/{broadcasting station name}/{server name}/{viewer ID}/{data to be managed}/{sorting method}/{head item},{number of pieces}/

(3) http://hybridcast.org/{broadcasting station name}/{server name}/{review ID}/{data to be managed}/{sorting method}/{head item},{number of pieces}/

Additionally, parameters include {broadcasting station name}, {server name}, {content ID}, {viewer ID}, {review ID}, {data to be managed}, {sorting method}, {head item}, {number of pieces}, and the like.

[3.2.3 Data to be Managed]

Data to be managed includes content information, user information, user•generated•content information, devise information, and authentication information.

The content information includes data indicating a title, a summary, a genre, the broadcasting date, a broadcasting time (time length), an image mode, a sound mode, caption data, a script, casts, music, a producer, a production company, a book, a recommended program, a picture URI, the playback number of times, a CM, time stamp information, and the like. The user information includes data indicating the name of a user (viewer), the age, the gender, an area, the review written number of times, the comment written number of times, favorites, a friend list, a playback place (time), a playback end place (time), a program viewed history, and the like. The user•generated•content information includes data indicating a content ID, a user ID, the contents of a review, the review written time, evaluation of review, and the like. The device information includes a device ID. The authentication information includes an authentication ID.

[3.3. Transport Format]

[3.3.1 about Image/Sound Used for Communication]

Images and sounds to be used for communication comply with Digital Television Network Function Specification, Streaming Function Specification, Protocol V1.1 (Networked Digital Television).

[3.3.1.1 Relationship with Mono Media Format for Image and Sound]

A TTS (timestamped transport stream) format is used for multiplexing an image encoded by MPEG-2 Video or H.264/MPEG-4 AVC (advanced video coding) with the sound encoded by MPEG-1 Audio Layer II or MPEG-2 Audio AAC, captions, and the like. However, MPEG2-S, MMT (MPEG media transport), MP4, and the like may be used.

[3.3.1.2 Related Transfer Protocol]

Figure 11:
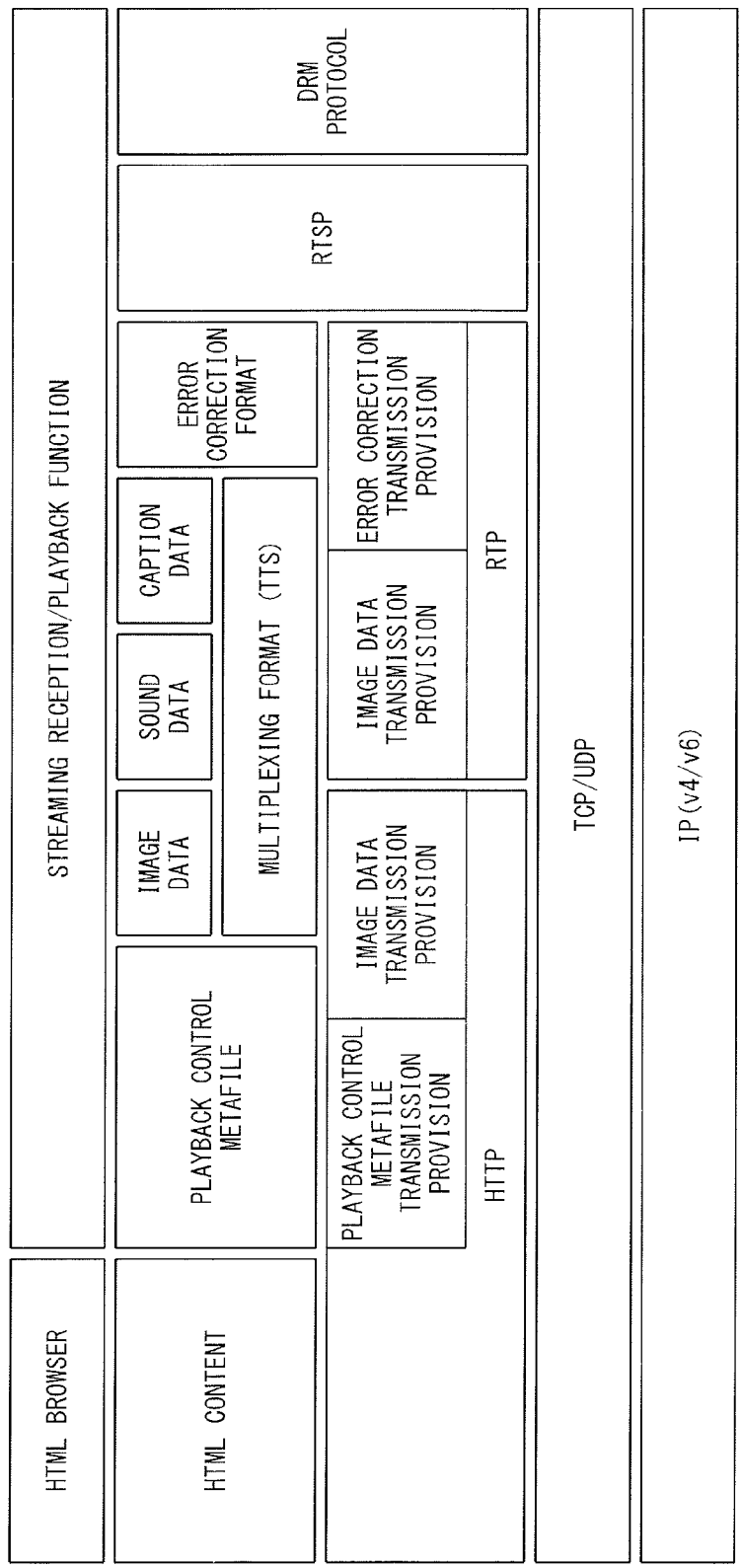
FIG. 11 is a diagram illustrating a transfer protocol stack in the cooperative communication/broadcasting system.

FIG. 11 is a diagram illustrating a transfer protocol stack.

For a stream transmission, RTP (real-time transport protocol)/UDP (user datagram protocol) and HTTP/TCP (transmission control protocol) are used. Here, in a case where RTP/UDP is used, information for error correction may be transmitted as an option. Additionally, in a case where HTTP/TCP is used, the connection, the method, and the header of the HTTP are used to perform a stream control. In a case where transmission is performed using RTP (real-time transport protocol), RTS (real time streaming protocol) is used for stream control information.

[3.3.2 Related Caption]

Multilingual captions comply with Timed Text Markup Language (W3C (world wide web consortium)). Here, synchronization is separately performed at the application level. Additionally, each associated font is downloaded as appropriate. For example, a font file is set to the payload of the HTTP. In this case, Dynamic Fonts and PFR (portable font resource) of the Web are used.

Preferably, the capacity of fonts is approximately 5-35 MB.

[3.4 Mono Media Format]

The following defined mono media encoding is used for cooperative communication/broadcasting services.

[3.4.1 Moving Image]

For moving images, MPEG-2 Video defined by the ARIB STD-B32 V2.4, Part 1, Section 3.1 and MPEG4-AVC defined by the same standard, Section 3.2 are used. The constraint conditions of encoded parameters for television services defined by the same standard, Section 5.1 are applied.

[3.4.2 Sound]

For sound, MPEG-2 Audio and PCM (pulse code modulation) (AIFF-C (audio interchange file format compression)) are used.

In the case of the MPEG-2 Audio, MPEG-2 AAC defined by the ARIB STD-B32 V2.4, Part 2, Section 3.1 is used. The constraint conditions of encoded parameters defined by the same standard, Chapter 5 are applied.

In the case of the PCM, formats defined by the ARIB STD-B24 V5.4, Part 1, Sub-Part 2, Section 6.2 are used.

For additional sound, formats defined by the ARM STD-B24 V5.4, Part 1, Sub-Part 2, Section 6.4 are used.

[3.4.3 Still Image]

In the case of JPEG (joint photographic experts group), the encoding formats defined by the ARIB STD-B24 V5.4, Part 1, Sub-Part 2, Section 5.2 are used.

In the case of PNG (portable network graphics), formats defined by ISO/IEC 15948:2003 are used. These are the same contents of W3C Recommendation Portable Network Graphics (PNG) Specification (Second Edition).

[3.4.4 Character]

For encoding of characters, the international encoding character set defined by the ARIB STD-B24 V5.4, Part 1, Sub-Part 2, Section 7.2 is used.

For an encoding character set, the BMP (basic multilingual plane) set defined by the same standard, section 7.2.1.1.3 is used, and chart 7-20 is applied. Additionally, ISO/IEC10646: 2003, Supplement 5 and Supplement 6 are applied.

For external characters, formats defined by the ARIB STD-B24 V5.4, Part 1, Sub-Part 2, Section 7.2.1.2 or formats defined by the ARIB STD-B23 Part 1, Section 5.2.1.2 are used.

For control codes, only APR(CR) and APD (LF) among C0 control codes defined by the ARIB STD-B24 V5.4, Part 1, Sub-Part 2, Section 7.2.2.1 are used. Other C0 control codes and C1 control codes are not used.

Conversion of character codes comply with the ARIB STD-B24 V5.4, Part 1, Sub-Part 2, Appendix, Provision E.

In a case where information is encoded by a format other than the above-defined character encoding formats, the information is converted into the above character encoding format in a sending process or an appropriate process to be performed in the receiver, and thereafter processes are performed. In other words, character codes in other encoding formats are not directly used by applications.

[3.5 Application Format]

A method of describing applications executable on the receiver is shown. A connection of an execution platform for executing the applications generated by this description method and a secure manager is shown in Chapter 4.

[3.5.1 Application Format Executable on Receiver]

As a description format of applications executable on the receiver, BML (ARIB STD-B24), ARIB-J (ARIB STD-B23), and HTML5 (W3C HTML5 Working draft-2011 Jan. 13) are defined.

[3.5.2 BML]

The receiver has a function of presenting BML documents based on the operational guidelines for terrestrial digital broadcasting (ARIB TR-B14) or the operational guidelines for BS digital broadcasting (ARIB TR-B15). The receiver must be able to present data broadcasting services provided by terrestrial digital broadcasting or BS digital broadcasting as defined by the existing standard. However, the receiver requires as an essential function, the function of presenting BML content to be delivered by broadcasting in the data carousel format. However, the receiver does not require as an essential function, the function of presenting BML content to be provided by communication using HTTP protocol (TR-B14 Part 3, Sub-Part 2, Section 5.14, and TR-B15, Part 1, Sub-Part 3, Section 8.14).

Additionally, browser.startHybridcastApp( ), and getAITInfo( ) are defined as broadcasting expansion APIs for activating a communication application defined as below.

Table 2 shows the definitions of browser.startHybridcastApp( ). browser.startHybridcastApp( ) is an API that activates a cooperative communication/broadcasting application.

TABLE 2

| | |
|---|---|
| Grammar | Number startHybridcastApp (input String applicationURL, input Number applicationType, [input String returnURL]) |
| Argument | applicationURL: URL of application<br>applicationType: constant value indicating type of application<br>return URL: return at time of termination of application |
| Return Value | Value indicating result of execution |
| Explanation | Presentation of BML document is terminated by execution of present function, and presentation of specified application is initiated. |

Table 3 indicates the definition of getAITInfo( ). getAITInfo( ) is an API that acquires the newest AIT information included in the service being received.

TABLE 3

| | |
|---|---|
| Grammar | Array getAITInfo (out Array) |
| Return Value | Array[0]: Value indicating result of acquisition<br>Array[1]: Array storing information of application 1 (*1)<br>Array[2]: Array storing information of application 2<br>Array[n]: repeated hereinafter<br>*1) Formats for Array storing application information are as follows.<br>Array[0]: Application ID<br>Array[1]: URL of Application |
| Explanation | Acquire newest AIT information included in service being received. |

[3.5.3 HTML5]
[3.5.3.1 Description Format]

The receiver supports HTML5 as a description format for presentation engine applications provided by communication. As a JavaScript (trademark) API, the following is supported. Here, among the following APIs, APIs which have been considered by the W3C include Working Draft (WD) or Editor's Draft (ED). However, an API related to data carousel transmitted by broadcasting waves is not essential.

(1) System Information API (W3C Working Draft 2 Feb. 2010) (2) WebSocket API (W3C Editor's Draft 28 Feb. 2011) (3) File API (W3C Working Draft 26 Oct. 2010) (4) Permission for File API, System Information API (Permissions for Device API Access, W3C Working Draft 5 Oct. 2010) (5) Device Description Repository Simple API (W3C Recommendation 5 Dec. 2008) (6) API for Media Resource 1.0 (W3C Working Draft 8 Jun. 2010) (7) Web Storage (W3C Working Draft 8 Feb. 2011) (8) Server-Sent Events (W3C Editor's Draft 28 Feb. 2011) (9) Indexed Database API (W3C Working Draft 19 Aug. 2010) (10) SI access API (11) Tuning API (12) Printing (13) Reservation

[3.5.3.2 Browser]

An HTML5 browser of the receiver is implemented with functions of a JavaScript (trademark) process system, Web Workers (W3C Working Draft 8 Feb. 2011), Widget Interface (W3C Working Draft 3 Feb. 2011), HTML Canvas2D Context (W3C Editor's Draft 28 Feb. 2011). Web Workers is necessary to support multitask. Widget Interface is necessary to support independent applications. HTML Canvas2D Context is necessary to support two-dimensional vector graphics.

[3.5.4 ARIB-J]

The receiver supports ARIB-J as a description format for application execution engine applications provided by communication. Additionally, DVB Bluebook A153 (GEM Media Synchronization API) is used as a synchronization API among multiple streams.

[3.6 Receiver API]

Hereinafter, a receiver API that can be used for the HTML5 and the ARIB-J is explained.

[3.6.1 Namespace]

Namespace is a description rule of character strings for specifying the positions of various resources used in the cooperative communication/broadcasting system, such as image sound content, applications, mono media files, and the like, which are present on a server or in the receiver. A method of describing namespace for referring to various resources, which is used in section 3.5.2 and more, is defined for each group. Resources include resources on an Internet server, resources on application cache, and resources for broadcasting. The resources on the Internet server include file resources like stream resources, such as VOD content, applications, and other resources referred to by applications. The resources for broadcasting include stream resources such as programs on the air and past and future programs, and carousel resources such as modules and event messages.

[3.6.2 Cooperative Communication/Broadcasting Interface]

Cooperative communication/broadcasting interfaces include the following interfaces.

(1) getRunningApplications( ): acquires information concerning a running application. A return value of getRunningApplications( ) includes apps[ ], and application_id and running_level for each application. apps[ ] is set with a list of running applications. application_id is set with an application ID, which is null in a case where the application is an informal application. running_level is set with the execution level (a result of authentication and a state of viewer setting).

Here, in view of security, information that can be acquired with respect to other applications should be limited.

(2) queryApplicationInfo( ): acquires information concerning the specified application.

(3) getProgramInfo( ): acquires information concerning a broadcast being received. A return value includes tuner_state, network_id, ts_id, orig_ts_id, service_id, event_id, and content_id. tuner_state is set with a value indicating the reception state.

(4) getEPGInfo( ): acquires various information in the FIT (+SDT) of a broadcast being received.

(5) saveApplicationToCache( ): stores in a cache, an application file on a server.

(6) queryApplicationInCache( ): searches an application file (application program) in the cache. An argument of queryApplicationInCache( ) includes application_id, getDSMCCModule( ), addBroadcastSignalListener( ), and getListFromHybridcastMenu( ). The application_id is set with an application ID issued from a certification authority. The getDSMCCModule( ) acquires a module specified by a broadcasting wave. The addBroadcastSignalListener( ) registers a listener that monitors updates of an SI, emergency information, a carousel, and an event message. The getListFromHybridcastMenu( ) acquires a list of applications on the top menu. A return value of the queryApplicationInCache( ) includes user_apps[ ], broadcaster_apps[ ], and vendor_apps[ ].

(7) addApplicationToHybridcastMenu( ): adds an application to the top menu.

(8) getKeyFromBroadcast( ): acquires from a broadcast, key information to access a limited server.

(9) querySupportedFunction( ): inquiries about a function of an application browser. This is used to confirm whether or not a function/API is available.

[3.6.3 BroadcastSignalListener Interface]

A BroadcastSignalListener interface is a listener interface that monitors an SI, emergency information, a carousel, and an event message, which are acquired from a broadcast. Also, when an associated organized service is changed during execution of a bound application, an event of this interface occurs.

[3.6.4 LocalDatabase Interface]

A LocalDatabase interface is an interface for storing and managing viewer information in the receiver. The viewer information is information which should not be disclosed to the server side, such as private information, that is, the minimal information, such as a viewer ID or a receiver ID.

[3.6.5 Synchronization Related API]

As a SynchronizationManager interface, an API similar to DVB Bluebook A153 (GEM Stream Synchronization API) is introduced. Further, the following interfaces are added as APIs.

(1) getCurrentSTC( ): acquires the current STC (system time clock) value. Here, according to the MPEG2 streams standard, it is defined that a system clock (STC) on the transmission side is multiplexed and delivered as a PCR (program clock reference) signal in an MPEG2 transport stream, and thus a system clock (STC) in the receiver is synchronized with the STC on the transmission side.

(2) getCurrentPositionInProgram( ): acquires a time elapsing from the start of a program.

(3) delayStreamPresentation( ): initiates presentation of a delay of a broadcasting stream being presented.

(4) getCurrentDelay( ): acquires a delayed time of the broadcasting stream being presented (from the scheduled presentation time).

[3.6.6 SecurityException Interface]

This is an exceptional interface that occurs when an application executes function calling or property operation which is prohibited at the current execution level. The SecurityException interface occurs by calling of each of the above APIs, or various operations with respect to an object for referring to a broadcast (<video> in the case of HTML5, XY Controller in the case of ARIB-J).

[3.7 Receiver Function]

The receiver in the cooperative communication/broadcasting system includes an application launcher, as a receiver function. The application launcher is used for activation of the application stored in the receiver, selection of an independent application from the known repository, and selection of the application for which the control code is "PRESENT", among the applications for which activation instructions are described by the AIT.

[4. Security]
[4.1 Management of Cooperative Communication/Broadcasting Application]

To disseminate and activate cooperative communication/broadcasting services while meeting the requirements of the broadcasting organization, a framework that enables not only a broadcasting organization and its related parties, but also a great number of service organizations and individuals to join is necessary. In the present cooperative communication/broadcasting system, in view of security, applications are grouped into "formal applications" and "informal applications", and both applications are executable by the receiver.

Figure 12:
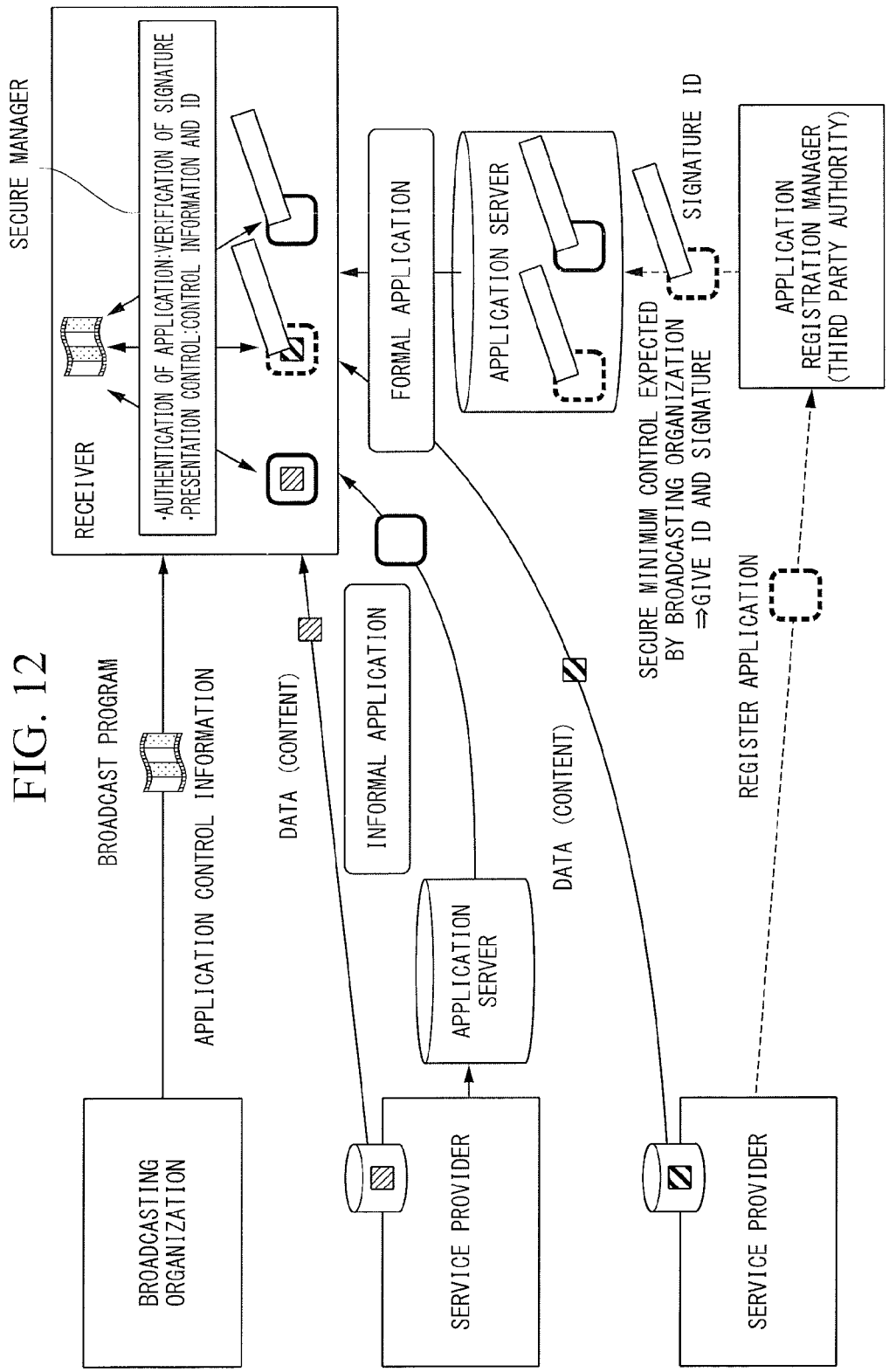
FIG. 12 illustrates an application management model in the cooperative communication/broadcasting system.

FIG. 12 illustrates an application management model in the cooperative communication/broadcasting system. "Formal applications" are previously registered to a registration manager (third party authority), thereby ensuring the operation expected in the specification of the cooperative communication/broadcasting system. "Formal application" is given an ID and a signature at the time of registration. In the receiver, the signature is verified by a secure manager defined in section 2.2. Thereafter, access to all APIs is enabled, and thus program cooperative services using broadcasting resources become available. Additionally, a detailed presentation control meeting the requirements of the broadcasting organization is enabled by the AIT sent from the broadcasting organization.

On the other hand, "informal applications" are not necessary to be registered previously. However, operation expected in the specification of the cooperative communication/broadcasting system is not ensured, and applications cannot use broadcast-related APIs. An "informal application" is not given an ID and a signature. For this reason, it is difficult to specify an individual application, but it is possible to execute the application after adding a presentation restriction based on the requirements of the broadcasting organization.

[4.2 Functional Model of Secure Manager]

Figure 13:
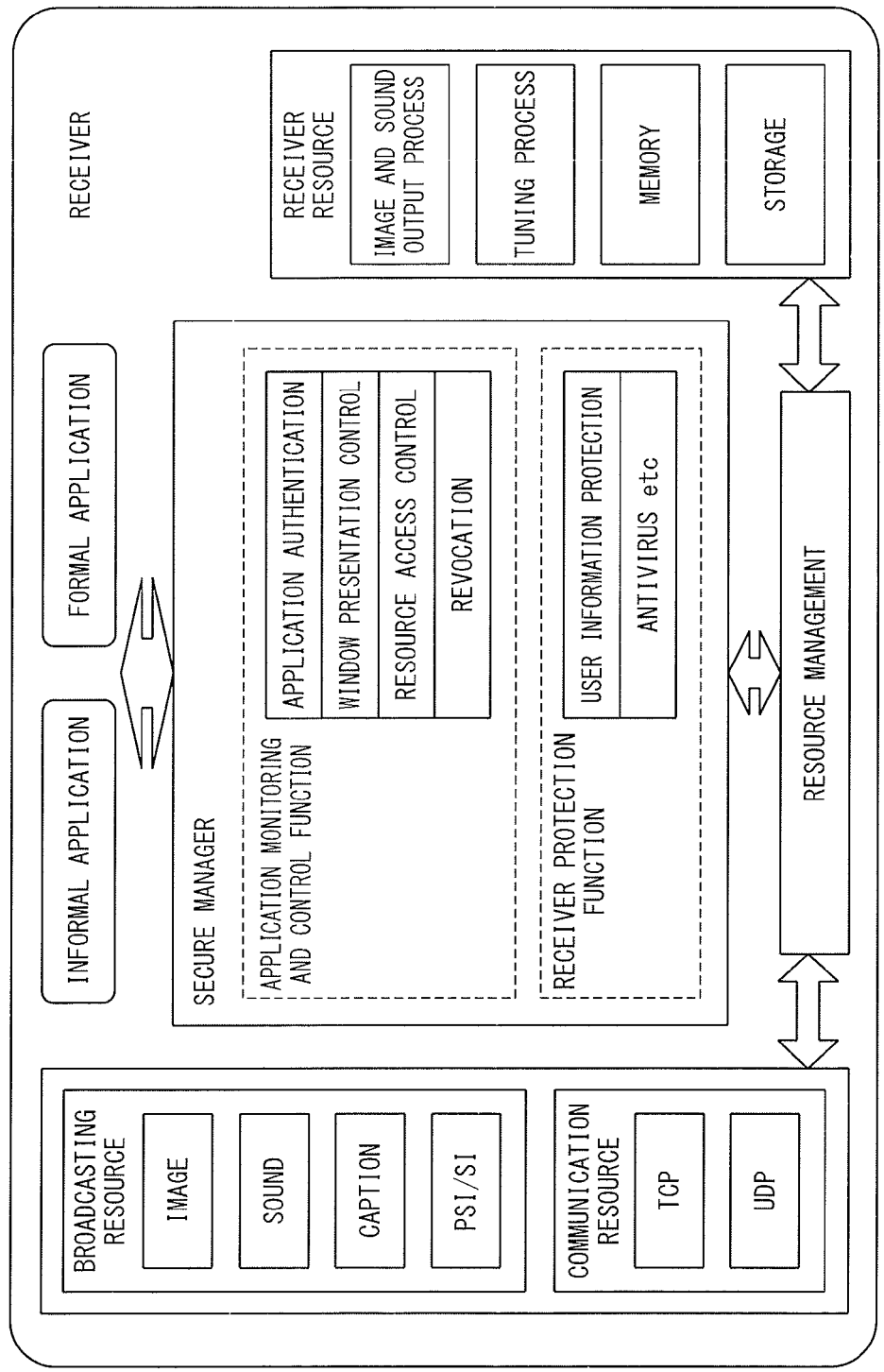
FIG. 13 illustrates a functional model of a secure manager in the cooperative communication/broadcasting system.

FIG. 13 illustrates a functional model of a secure manager. The secure manager is a function of managing the entire security in the receiver.

[4.2.1 Application Monitoring and Controlling Function]

As explained above, according to embodiments of delivery of application files, applications that run on the receiver are grouped into two types, which are "formal applications" and "informal applications". A "formal application" and an "informal application" are distinguished from each other based on the presence or absence of an ID and a signature as shown in section 4.1. Operations of those applications at the time of execution of the applications differ. For example, the access regions for the API in the receiver and regions of control by the broadcasting organization differ. An application monitoring and controlling function has an object to identify the difference in type between the formal application and the informal application, and reliably control the operation at the time of execution of the application.

(1) Verification of Application: with respect to all applications to be executed, the receiver determines whether each application is a formal application or an informal application, and if the application is a formal application, identifies an ID of the application. The receiver confirms and verifies the presence or absence of a signature given to an application file (application program), thereby distinguishing between a formal application and an informal application. If the application is a formal application, the receiver further acquires an application ID described in the signature. Identification of an application is performed at the time of a receipt of the application or at the time of activation thereof.

(2) Window presentation control: will be explained later in section 4.3.

(3) Resource access control: the receiver controls an access of the running application to the API, such as broadcasting resources. When an application attempts to access an API, if that application is an informal application, an access thereto is limited based on the type of the API.

Additionally, when an application accesses an API for displaying a window on a display, a window presentation control is performed based on the type of formal application or informal application, and the presentation policy of the broadcasting organization being selected. The details will be explained later in section 4.3.

(4) Revocation: has a function of revoking an application.

[4.2.2 Protection of Receiver]

The receiver is provided with a function of protecting viewer information and a protection function such as antivirus.

[4.3 Window Presentation Control by Application]
[4.3.1 Summary of Window Presentation Control]

In the cooperative communication/broadcasting services, a broadcasting program and related communication applications are simultaneously presented, thereby expanding convenience of broadcasting services. On the other hand, it is expected that with use of communication services, a broadcasting program and a communication application are mixed and presented on the display of the receiver. In some presentation method, a window for the communication application is overlay-displayed on the broadcasting program, thereby making it likely to cause loss of uniqueness and productivity of the broadcasting program, and further prevent emergent information, such as emergency earthquake report, from being accurately delivered to viewers. In the cooperative communication/broadcasting services, a window presentation control is performed to control presentation of applications based on the intent of the broadcasting organization.

Figure 14:
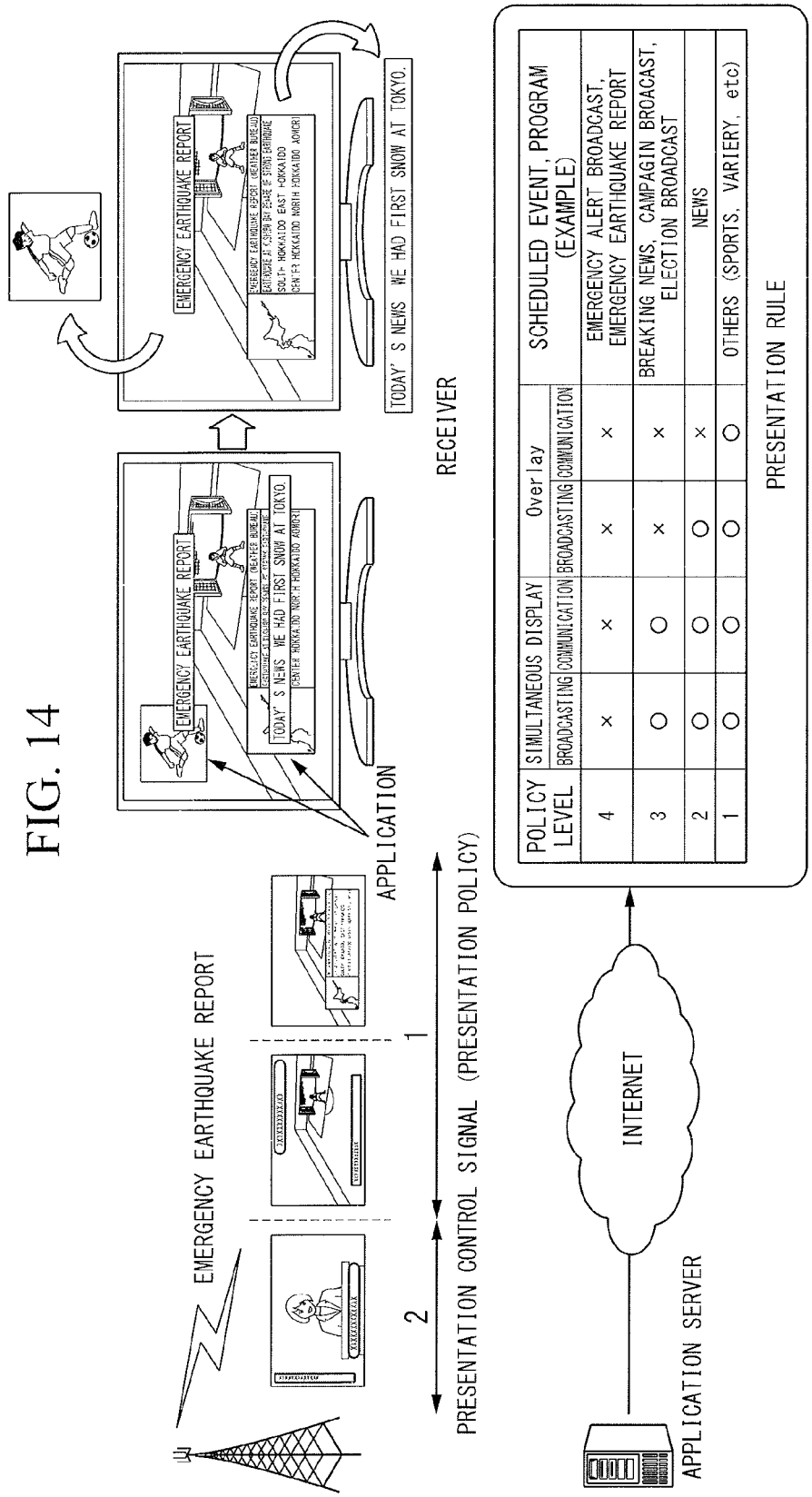
FIG. 14 is a diagram illustrating concept of a window presentation control method in the cooperative communication/broadcasting system.

FIG. 14 is a diagram illustrating the concept of a window presentation control method. The window presentation control method is a method intended to reflect on the receiver, the presentation policy of the broadcasting organization regarding how to present communication applications on the display with respect to each broadcasting program, which is referred to as a content presentation control. The content presentation control implements a presentation control for each program according to the organization of the program, a presentation control with respect to an event that occurs during a program such as emergency earthquake report, and a presentation control for each application.

[4.3.2 Basic Operation of Window Presentation Control]

Figure 15:
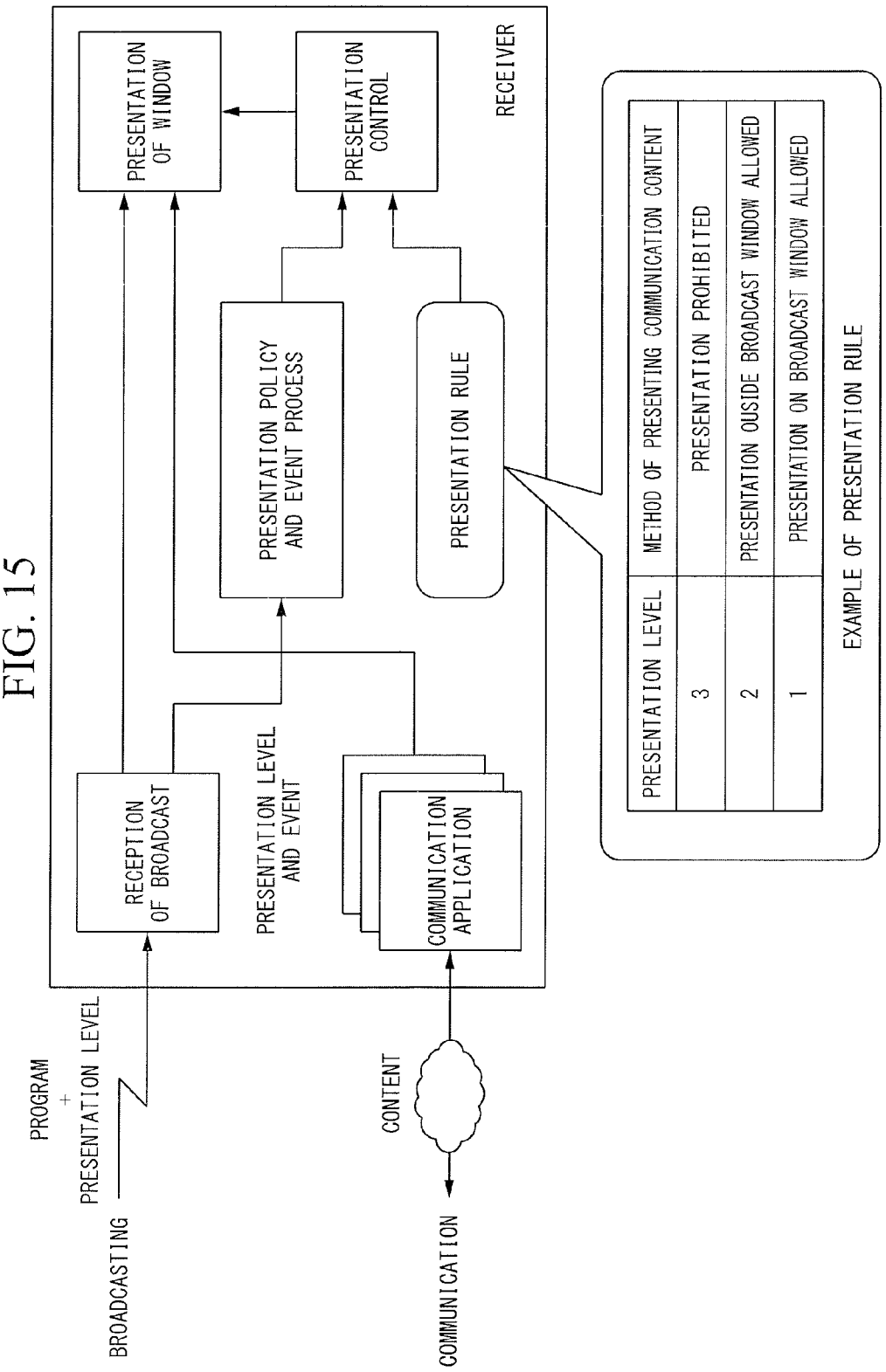
FIG. 15 is a diagram illustrating a basic operational model of a window presentation control in the cooperative communication/broadcasting system.

FIG. 15 is a diagram illustrating a basic operational model of the window presentation control. To reflect the presentation policy of the broadcasting organization on the receiver, the receiver manages, as a presentation rule, methods of presenting communication content with respect to broadcasting programs, which are previously assumed by the broadcasting organization. Specifically, as a method of presenting communication content, a level sorting is made in accordance with the differences in the overlay-display order and the arrangement order. Then, a table storing presentation levels (policy levels) and presentation methods is stored in the receiver as a presentation rule. The broadcasting organization multiplexes the presentation level to be specified with a broadcasting wave and transmits the multiplexed wave. Then, the receiver checks the presentation level against the presentation rule, thereby determining a presentation method. Thus, it is possible to implement a presentation control based on the presentation policy of the broadcasting organization.

[4.3.3 Method of Transmitting and Multiplexing Control Information]

Regarding a format of control information that carries the presentation policy of the broadcasting organization, three specific examples of methods using program arrangement information used for digital broadcasting are shown here. As a window presentation control for each program, there are a method using the existing EIT (event information table) and a method using the expanded FIT (EIT+). Additionally, as a window presentation control for each service (channel), there is a method using the expanded AIT for broadcasting signals. Further, as a window presentation control for each event that occurs in real time during a program, there is a method using information sent from a broadcasting station, which is other than the program arrangement information. Hereinafter, the details of the four methods are described.

(1) Program genre of EIT (EIT): The policy level is determined based on the program genre described in the content descriptor of the existing EIT. For this reason, the receiver manages a table indicating the relationship between the program genre and the policy level. The relationship with the ARIB standard is described in the ARIB STD-B10 Part 2, 6.2.4, Appendix H.

Table 4 is a table showing a specific example of the relationship between the program policy and the policy level. The program genre (program_genre) has a 2-level structure including "content_nibble_level1" (0x0 to 0xF) indicating a major classification and "content_nibble_level2" (0x0 to 0xF) indicating an intermediate classification. Up to the intermediate classification are entries of the table managed by the receiver, and values of the policy levels are defined.

TABLE 4

| program_genre (content_nibble_level1-content_nibble_level2) | policy_level (1 to 4) |
|---|---|
| 0x0-0xF | 3 |
| 0x0-0x1 | 1 |
| ... | |
| 0x0-0xF | 1 |
| ... | |
| 0xF-0xF | 1 |

(2) Addition of new descriptor to EIT (EIT+): A new descriptor is added to event information section of the EIT, and policy information is described. The receiver interprets the descriptor and performs a desired process, thereby implementing a control in accordance with the policy level for each program. The relationship with the ARIB standard is described in the ARIB TR-B14 (Second Book) Part 3, 31.3 and the ARIB STD-B10, Part 2, 5.2.7.

Table 5 is a table showing a structure of an event security descriptor. In the case of EIT+, an event security descriptor shown in table 5 is newly defined. Then, the event security descriptor is stored in a descriptor region of the EIT and is transmitted. The event security descriptor includes the policy level (policy_level), an application ID (application_identifier), a control code (application_control_code), a priority (application_priority), a protocol identification (protocol_id), and a program related flag (associated_application_flag).

TABLE 5

| Data Structure | Number of Bits | Bit String Description |
|---|---|---|
| event_security_descriptor( ){ | | |
|   descriptor_tag | 8 | uimsbf |
|   descriptor_length | 8 | uimsbf |
|   policy_level | 8 | uimsbf |
|   for (i=0; i<n; i++){ | | |
|     application_identifier( ) | | bslbf |
|     application_control_code | 8 | uimsbf |
|     application_priority | 8 | uimsbf |
|     protocol_id | 16 | uimsbf |
|     associated_application_flag | 1 | bslbf |
|     reserved_future_use | 7 | bslbf |
|   } | | |
| } | | |

The policy_level indicates the policy level for each program. The policy level is a value in the range of 1 to 4.

The application_identifier( ) is an identifier for identifying an application. Table 6 shows a structure of the application_identifier( ).

TABLE 6

| Data Structure | Number of Bits | Bit String Description |
|---|---|---|
| application_identifier( ){ | | |
|   organization_id | 32 | bslbf |
|   application_id | 16 | bslbf |
| } | | |

The organization_id indicates an organization that has generated an application, and is a value following 0x00000063. The application_id indicates a number identifying an application. The application_id is uniquely given in the organization identification.

The application_control_code defines a control code that controls the state of an application. Table 7 shows the definitions of control codes.

TABLE 7

| Code | Identification Name | Meaning |
|---|---|---|
| 0x00 | reserved_future_use | |
| 0x01 | AUTOSTART | Auto-activation of application |
| 0x02 | PRESENT | Stand-by of application |
| 0x03 | DESTROY | Termination of application |
| 0x04 | KILL | Forcible termination of application |
| 0x05 | reserved_future_use | |
| 0x06 | REMOTE | Remote application |
| 0x07 | DISABLED | Non-use of application |
| 0x08 | KILL ALL | Forcible termination of all applications |
| 0x09 . . . 0xFF | Reserved_future_use | |

The application_priority indicates the policy level for each application. The policy level for each application indicates relative priorities among the applications notified in the service. The priority is a value in the range of 1 to 4.

The protocol_id indicates protocol for transmitting an application file. Table 8 shows the definition of the protocol_id.

TABLE 8

| Value | Meaning |
|---|---|
| 0x0000 | reserved_future_use |
| 0x0001 | Object carousel transmission protocol |
| 0x0002 | Reserved |
| 0x0003 | HTTP transmission protocol |
| 0x0004 | Data carousel transmission protocol |
| 0x0005 ... 0xFFFF | reserved_future_use |

The associated_application_flag indicates whether or not an application is an application cooperative with a program. Table 9 shows the definition of the protocol_id.

TABLE 9

| Value | Meaning |
|---|---|
| 0 | Include no contents cooperative with program |
| 1 | Include contents cooperative with program |

(3) Table definition of AIT and addition of new descriptor (AIT+): AIT is expanded and policy information is transmitted. The receiver interprets that table and performs a desired process, thereby implementing a control in accordance with the policy level with respect to an event that occasionally occurs. The relationship with the ARIB standard is described in the ARIB STD-B23 Part 2, 10.16.

Table 10 shows a data structure of the AIT. The AIT shown in table 10 is the expansion of the data structure of the AIT defined in the ARIB STD-B23. The policy level, an application ID, and a control code are described in the AIT. Here, the AIT is transmitted by section format, and is continuously transmitted while an event continues. An application ID is described in application_identifier( ). A control code is described in application_control_code. Here, these details are similar to those described in "(2) Expansion of BIT".

Further, in order to describe the policy level, a security policy descriptor is newly defined, is stored in a common descriptor loop of the AIT, and then is transmitted.

TABLE 10

| Data Structure | Number of Bits | Bit String Description |
|---|---|---|
| application_information_section( ){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   application_type | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 12 | uimsbf |
|   for (i=0, i<N; i++) { | | |
|     descriptor( ) | | |
|   } | | |
|   reserved_future_use | 4 | bslbf |
|   application_loop_length | 12 | uimsbf |
|   for (i=0, i<N; i++) { | | |
|     application_identifier( ) | | |
|     application_control_code | 8 | uimsbf |
|     reserved_future_use | 4 | bslbf |
|     application_descriptors_loop_length | 12 | uimsbf |
|     for (j=0; j<M; ;j++) { | | |
|       descriptor( ) | | |
|     } | | |
|   } | | |
|   CRC_32 | 32 | rpchof |
| } | | |

Table 11 shows a structure of a security policy descriptor to be newly defined.

TABLE 11

| Data Structure | Number of Bits | Bit String Description |
|---|---|---|
| security_policy_descriptor( ){ | | |
|   descriptor_tag | 8 | uimsbf |
|   descriptor_length | 8 | uimsbf |
|   policy_level | 3 | bslbf |
|   reserved_future_use | 5 | bslbf |
| } | | |

(4) Emergency alert broadcast and emergency earthquake report (EWS/EEW): the policy level is determined using emergency information sent from the broadcasting station. It is assumed that the receiver previously correlates emergency information with the policy level. The receiver monitors an activation flag for TMCC emergency alert broadcasting in the case of emergency alert broadcasting, and monitors a character super management packet in the case of emergency earthquake report, thereby detecting the occurrence and termination of the emergency information, thus enabling determination of the policy level at that time. The relationship with the ARIB standard is described in the ARIB STD-B31 3.15 and the ARIB STD-1324 Part 1, Sub-Part 3, Chapter 9.

Here, each of the above formats (1) to (4) may be simultaneously sent in parallel. Accordingly, it is necessary to previously determine which format used for transmission is prioritized to determine the policy level. The priority order is as follows.

EWS/EEW>AIT+>EIT+>EIT

Based on that priority order, the receiver determines the policy level, thereby enabling a window presentation control that prioritizes an emergent event based on the intent of the broadcasting organization.

[4.3.4 Example of Window Presentation Control]

Figure 16:
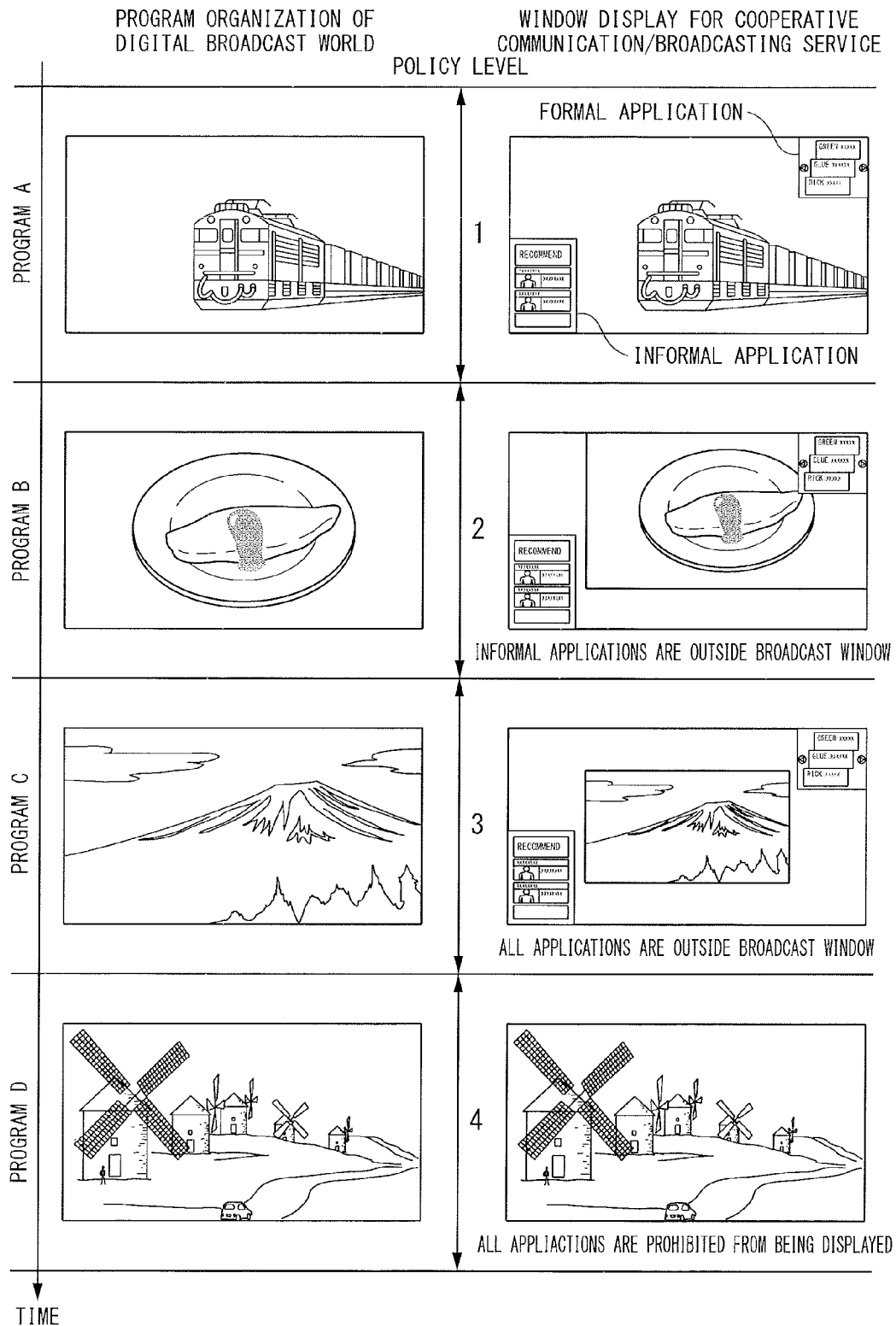
FIG. 16 illustrates an example of a window presentation control in accordance with the policy level in the cooperative communication/broadcasting system.

FIG. 16 illustrates an example of a window presentation control in accordance with the policy level.

In a case where the policy level of a program is "1", both an application window for a formal application and an application window for an informal application are allowed to be overlay-displayed on a broadcast window.

In a case where the policy level of the program is "2", only the application window for the formal application is allowed to be overlay-displayed on the broadcast window. The application window for the informal application is prohibited from being overlay-displayed on the broadcast window, and is only allowed to be displayed outside the broadcast window.

In a case where the policy level of the program is "3", both the application window for the formal application and the application window for the informal application are allowed to be displayed. However, all the application windows are prohibited from being overlay-displayed on the broadcast window, and is only allowed to be displayed outside the broadcast window.

In a case where the policy level of the program is "4", only a full-display of the broadcast window is allowed.

Figure 17:
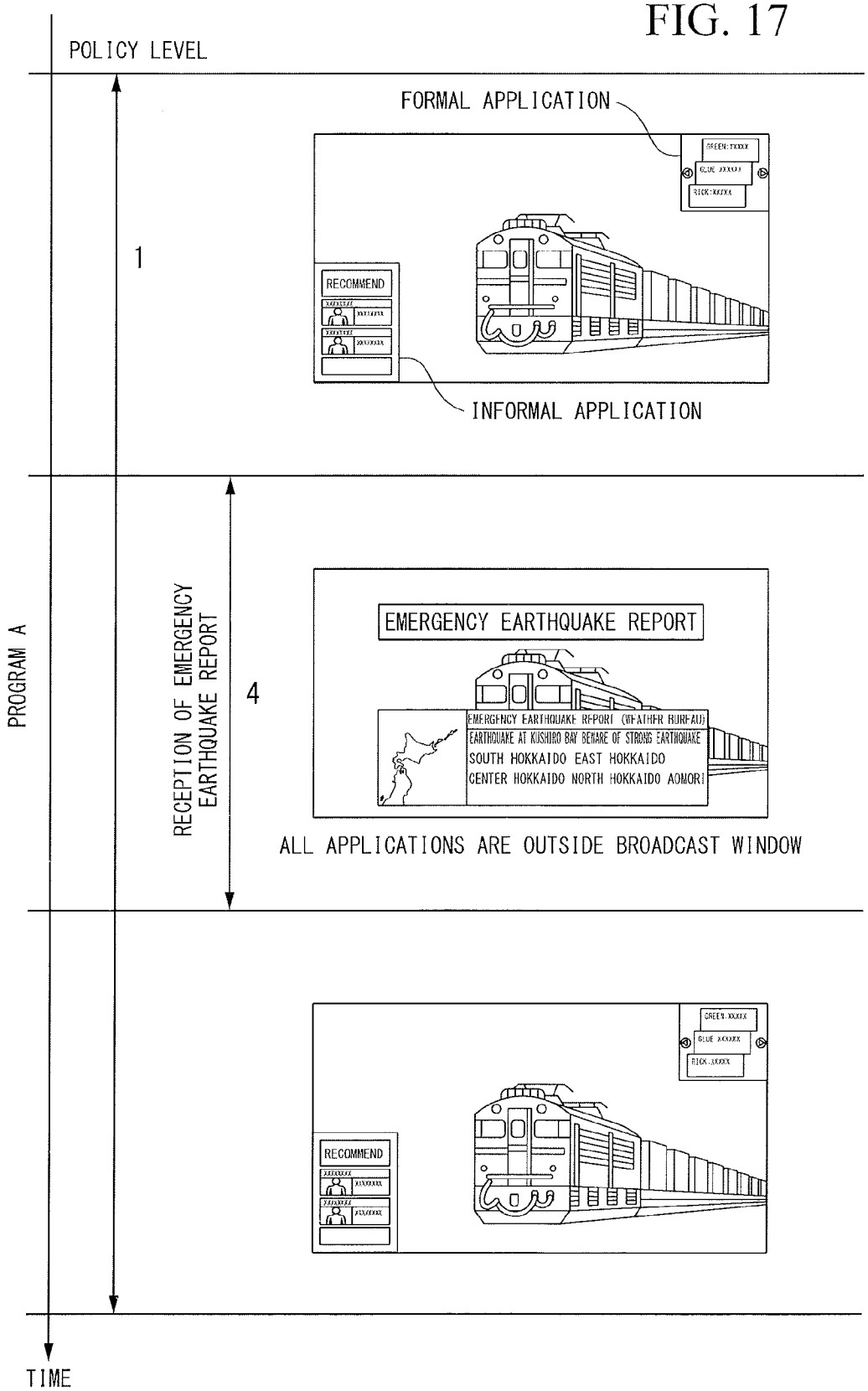
FIG. 17 illustrates an example of a presentation control at the time of a receipt of emergency earthquake report in the cooperative communication/broadcasting system.

FIG. 17 illustrates an example of a presentation control at the time of a receipt of emergency earthquake report. In a case where the policy level of program A is "1", in the broadcasting time zone of program A, both an application window for a formal application and an application window for an informal application are overlay-displayed on a broadcast window. Even in the broadcasting time zone of program A, however, the receiver determines that the policy level in the time zone where an emergency earthquake report is occurring is the policy level "4" of the emergency earthquake report. For this reason, even in the broadcasting time zone of program A, during in the time zone where an emergency earthquake report is occurring, the receiver prohibits both the application window for the formal application and the application window for the informal application from being overlay-displayed on the broadcast window.

[Explanation of Embodiments of Present Invention to which Aforementioned Cooperative Communication/Broadcasting System is Applied]

Hereinafter, an embodiment of the present invention shown in FIG. 1 is explained.

Figure 18:
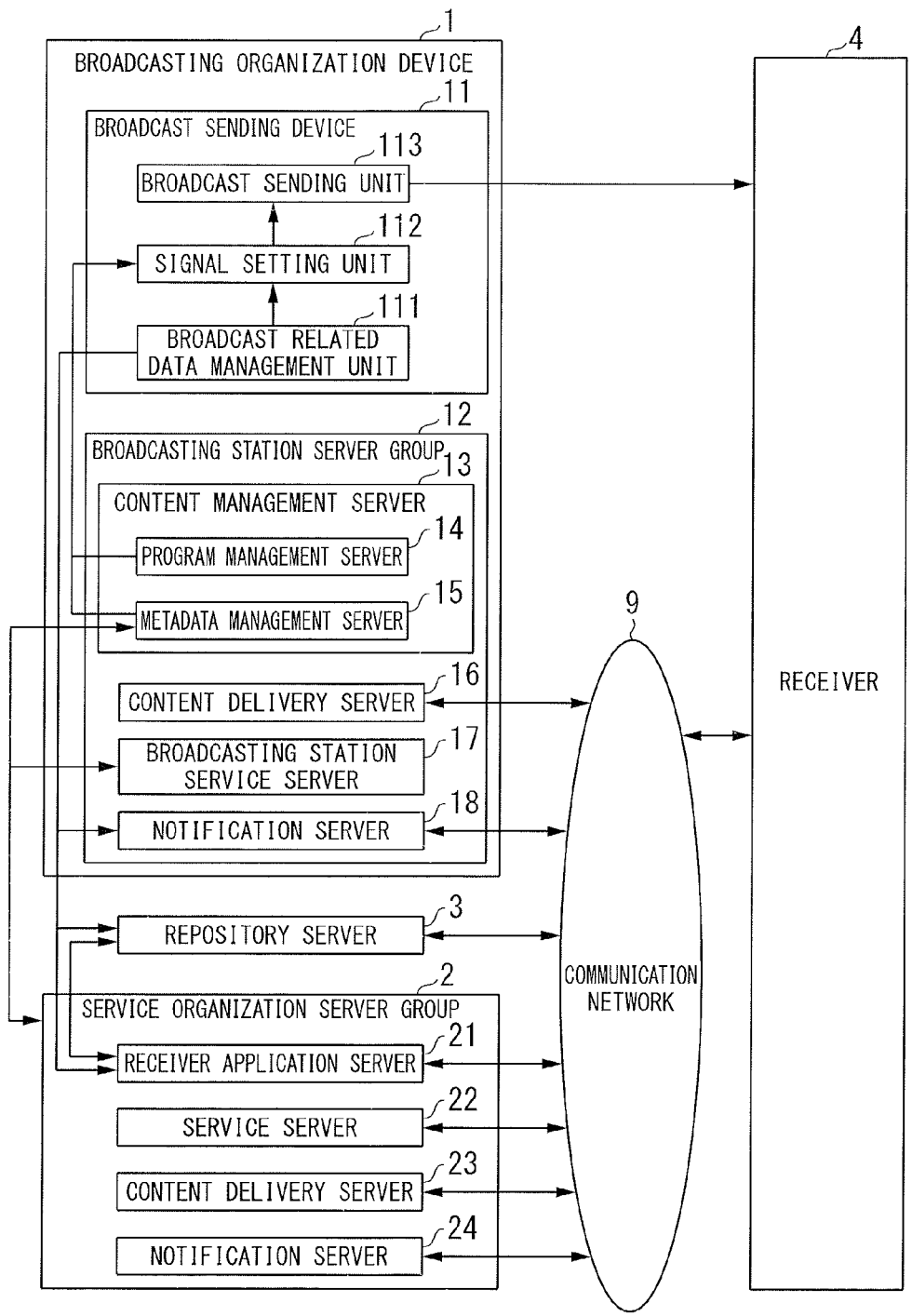
FIG. 18 is a diagram illustrating the entire configuration of a cooperative communication/broadcasting system according to an embodiment of the present invention.

FIG. 18 is a diagram illustrating the entire configuration of a cooperative communication/broadcasting system according to an embodiment of the present invention. As shown in FIG. 18, the cooperative communication/broadcasting system of the present embodiment includes: a broadcasting organization device 1 owned by a broadcasting station; a service organization server group 2 owned by a service organization; a repository server 3 owned by a system manager; and a receiver 4 owned by a viewer. In FIG. 18, only one receiver 4 is shown, but multiple receivers 4 are provided actually.

The broadcasting organization device 1 includes a broadcast sending device 11 and a broadcasting station server group 12.

The broadcast sending device 11 corresponds to the broadcasting station facility shown in FIG. 3. The broadcast sending device 11 is a broadcasting facility for digital broadcasting, which includes a program organization facility, a program sending facility, a transmission facility, and the like.

The broadcast sending device 11 includes a broadcast related data management unit 111, a signal setting unit 112, and a broadcast sending unit 113.

The broadcast related data management unit 111 manages program security policy data of each program, application security policy data of a formal application, other policy data, and the like.

The program security policy data includes policy level data indicating the policy level of a program, an application ID of an application bounded to a program, a control code for the application bound to the program, and the like.

The application security policy data includes information specifying the program to which the application is bound, protocol identification of the application, location information, and the like. The location information indicates the stored position (repository) of the application, such as a URL of the receiver application server 21 or the repository server 3, which can download an application. The protocol identification indicates whether the application is transmitted by broadcasting or communication.

Here, only a formal application is bound to a program.

The policy data includes presentation rule data and a policy level table.

The presentation rule data is data that describes a presentation method for each policy level. The presentation method includes a window displaying method and a sound outputting method. The window displaying method includes, for example, a method of displaying only a broadcast window (an image of a program), a method of overlay-displaying application windows for a formal application and an informal application (images of applications) on the broadcast window or displaying the application windows outside the broadcast window, a method of overlay-displaying only the application window for the formal application on the broadcast window and displaying the application window for the informal application outside the broadcast window, and the like. The sound outputting method includes, for example, a method of outputting only the sound of a broadcast program, a method of outputting the sound of the broadcast program independently or mixed with the sound of a formal application or an informal application, and the like.

The policy level table is data that describes the policy level associated with the genre of a program, and the policy level of each event. An event means, for example, the contents of broadcast that does not necessarily occur in cooperation with a program, such as an emergency alert signal or an emergency earthquake report.

The signal setting unit 112 sets various data to a broadcasting signal to be transmitted by a broadcast sending unit 113. The signal setting unit 112 sets an AIT and policy level data of a program to a broadcasting signal based on the program security policy data and the application security policy data which are managed by the broadcast related data management unit 111. The signal setting unit 112 multiplexes the AIT of the application bound to the program with the broadcasting signal (broadcasting TS) as an independent ES, or sets the AIT to a data carousel. Alternatively, the signal setting unit 112 sets to an EIT, information similar to the AIT of the application bound to the program. Additionally, the signal setting unit 112 sets the policy data of the program to the EIT (table 5) or the AIT (table 11). Here, in a case where the policy level associated with the genre of the program is used, the policy level data need not be set to the broadcasting signal. Further, the signal setting unit 112 sets the policy level data managed by the broadcast related data management unit 111 to the broadcasting signal in section format, to an engineering service, or to a data carousel.

The broadcast sending unit 113 transmits a broadcasting signal of a digital broadcast. The broadcasting signal includes information set by the signal setting unit 112.

The broadcasting station server group 12 corresponds to the broadcasting station server group shown in FIG. 3. The broadcasting station server group 12 includes a content management server 13, a content delivery server 16, a broadcasting station service server 17, and a notification server 18.

The content management server 13 includes a program management server 14 and a metadata management server 15. The program management server 14 manages a program already broadcast or a program to be broadcast. The metadata management server 15 manages metadata related to each program. Metadata includes, for example, data concerning a program title, a program ID, a program summary, casts, the broadcasting date, a script, a caption, and an explanation.

The content delivery server 16 is connected to the receiver 4 via a communication network 9, such as the Internet. The content delivery server 16 delivers content data of content requested by the receiver 4.

The broadcasting station service server 17 transmits to the service organization server group 2, content data of a service provided by a broadcasting station. The service provided by the broadcasting station includes, for example, a social networking service, a blog service, and the like.

The notification server 18 is connected to the receiver 4 via the communication network 9. Based on the program security policy data and the application security policy data which are acquired from the broadcast related data management unit 111 of the broadcast sending device 11, the notification server 18 delivers to the receiver 4, the AIT of the application bound to the program (FIG. 6) and the policy level data of the program. Additionally, the notification server 18 delivers to the receiver 4, the policy data acquired from the broadcast related data management unit 111 of the broadcast sending device 11. Here, in some cases, part or all of those information are not delivered from the notification server 18, instead, are transmitted by the broadcast sending unit 13 of the broadcast sending device 11 by means of only a broadcasting signal.

The service organization server group 2 corresponds to the service organization server group shown in FIG. 3. The service organization server group 2 includes a receiver application server 21, a service server 22, a content delivery server 23, and a notification server 24. The receiver application server 21, the service server 22, the content delivery server 23, and the notification server 24 are connected to the receiver 4 via the communication network 9.

The receiver application server 21 manages each application and delivers an application file to the receiver 4.

The service server 22 includes, for example, a multilingual caption server, a speech rate conversion sound server, a social TV server, a recommendation server, a bookmark server, and the like. The service server 22 delivers content data of the service requested by the receiver 4.

The content delivery server 23 includes, for example, a VOD delivery server, a caption delivery server, or a multi-view delivery server. The content delivery server 23 delivers content data of the content requested by the receiver 4.

The notification server 24 transmits the AIT of applications (FIG. 6) to the receiver 4. Here, in the case of a formal application, the notification server 24 may transmit the AIT (FIG. 6) based on the program security policy data and the application security policy data which are acquired from the broadcast related data management unit 111 of the broadcast sending device 11.

The repository server 3 corresponds to the repository shown in FIG. 3 and is connected to the receiver 4 via the communication network 9. The repository server 3 electrically signs an application file (application program) generated by the service organization, and transmits to the receiver 4, data required for authentication of the electric signature of the application file (application program). Additionally, the repository server 3 transmits to the receiver 4, data indicating a list of formal applications and location information of those formal applications. Here, the repository server 3 may transmit to the receiver 4, the application file of the electrically signed formal application, and the receiver application server 21 may receive from the repository server 3, and transmit to the receiver 4, the application file of the electrically signed formal application.

Additionally, the repository server 3 may transmit to the receiver 4, the AIT of the formal applications bound to the program (FIG. 6), based on the program security policy data and the application security policy data which are received from the broadcast related data management unit 111 of the broadcast sending device 11.

The receiver 4 corresponds to the receiver shown in FIG. 3 and is a device, such as a television receiver, a set-top box, a personal computer, or a mobile terminal.

Figure 19:
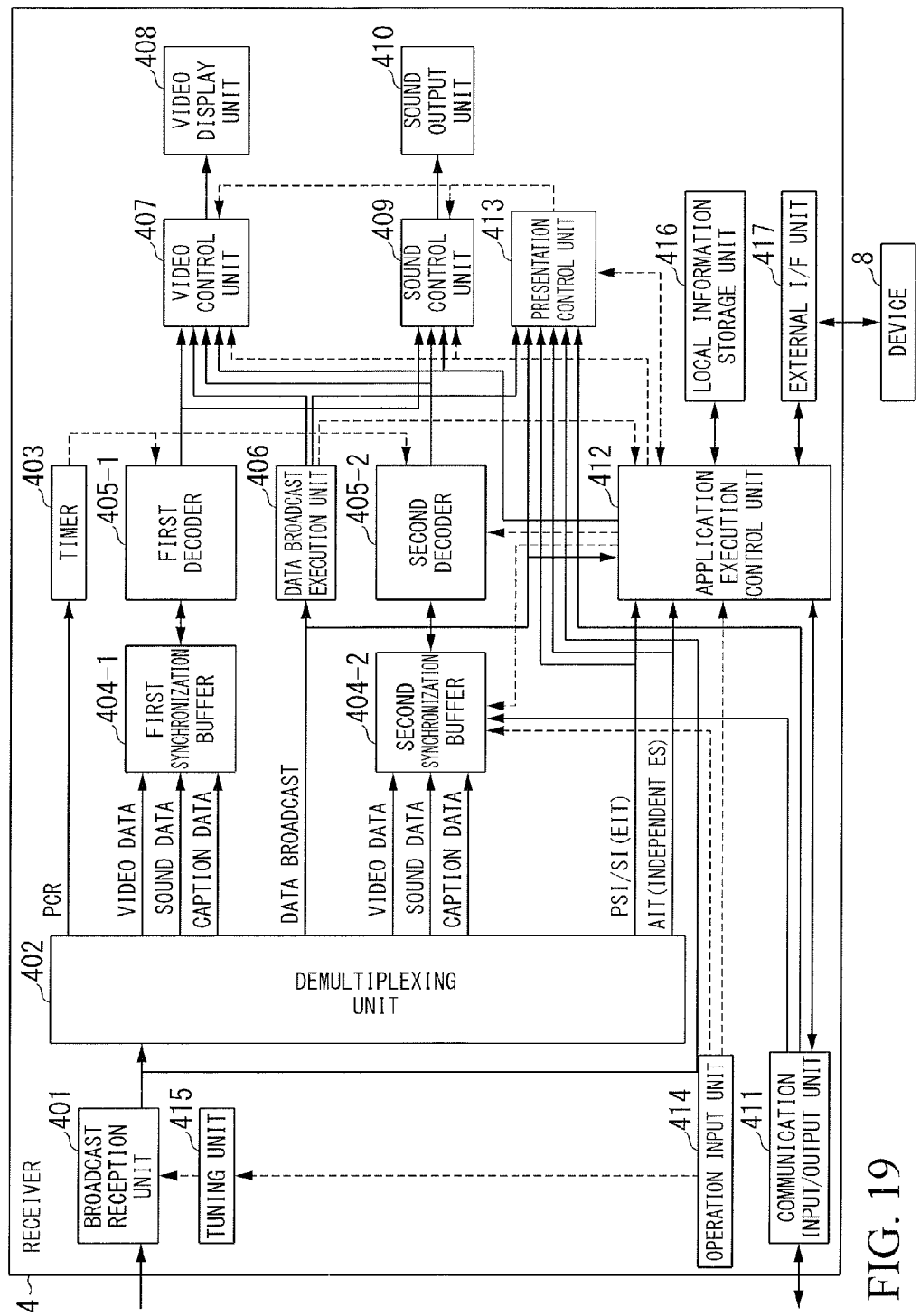
FIG. 19 is a functional block diagram illustrating an internal configuration of a receiver according to the embodiment.

FIG. 19 is a functional block diagram illustrating an internal configuration of the receiver 4. As shown in FIG. 19, the receiver 4 includes: a broadcast reception unit 401; a demultiplexing unit 402; a timer 403; a first synchronization buffer 404-1; a second synchronization buffer 404-2; a first decoder 405-1; a second decoder 405-2; a data broadcast execution unit 406; a video control unit 407; a video display unit 408; a sound control unit 409; a sound output unit 410; a communication input/output unit 411; an application execution control unit 412; a presentation control unit 413; an operation input unit 414; a tuning unit 415; a local information storage unit 416; and an external I/F unit 417.

The broadcast reception unit 401 is a tuner that receives a broadcasting signal. The broadcasting signal is any one or both of a wireless broadcasting signal and a wired broadcasting signal. The wireless broadcasting signal is a signal acquired by receiving, using a reception antenna, a broadcasting wave (ground wave) transmitted from a transmission antenna on the broadcasting station side, or a satellite wave relayed by a satellite. The wired broadcasting signal is a signal transmitted from the broadcasting station side via an optical cable or a coaxial cable. The broadcasting reception unit 401 receives and demodulates the broadcasting signal and outputs a broadcasting stream (TS).

The demultiplexing unit 402 is a demultiplexer and demultiplexes the broadcasting stream supplied from the broadcasting reception unit 401 into various data, such as a PCR (program clock reference), image data, sound data, caption data, a data broadcast, PSI (program specific information)/SI (service information), and an AIT transmitted by an independent elementary stream (ES). Here, there are cases where the AIT is included in a data broadcast, and where the contents similar to the AIT are set to an EIT constituting the SI. Additionally, there is a case where the demultiplexing unit 402 demultiplexes an application file from a broadcasting signal and outputs the application file.

The communication input/output unit 411 inputs/outputs data by communication via the communication network 9. The communication input/output unit 411 outputs to the application execution control unit 412, the AIT and the application file which are transmitted via the communication network 9. Additionally, the communication input/output unit 411 outputs to the presentation control unit 413, the policy level data and the policy data of the program transmitted via the communication network 9. Further, in accordance with an instruction from the application executed by the application execution control unit 412, the communication input/output unit 411 receives via the communication network 9, content data delivered from the content delivery server 16 or the content delivery server 23, and content data delivered from the service server 22, and outputs the received data to the second synchronization buffer 404-2.

The operation input unit 414 is an interface that receives an operation of a viewer. The operation input unit 414 includes, for example; a reception device that receives information input by a viewer from a remote controller, a cellular phone, a tablet terminal, or the like; a keyboard; a mouse; and the like. The operation input unit 414 outputs to the tuning unit 415, an instruction to select a medium (terrestrial/BS) or a channel input by the viewer. Additionally, the operation input unit 414 outputs to the application execution control unit 412, an instruction to initiate or terminate a cooperative communication/broadcasting service, and an instruction with respect to an application.

The tuning unit 415 controls the medium or the channel to be received by the broadcasting reception unit 401, in accordance with the operation input to the operation input unit 414.

The data broadcast execution unit 406 executes a data broadcast application transmitted by means of a digital broadcasting signal, and outputs image (graphic) data of a data broadcast to the video control unit 407. The data broadcast execution unit 406 includes an API for activating an application of a cooperative communication/broadcasting service. In a case where the data broadcast execution unit 406 executes the data broadcast application, and the API for activating the application of the cooperative communication/broadcasting service is invoked, the data broadcast execution unit 406 instructs the application execution control unit 412 to activate the application. Additionally, the data broadcast execution unit 406 acquires from the data broadcast, an AIT or an application file transmitted by data carousel, and outputs the acquired items to the application execution control unit 412. Further, the data broadcast execution unit 406 acquires from the data broadcast, policy data transmitted by data carousel, and outputs the acquired data to the presentation control unit 413.

The application execution control unit 412 executes the application of the cooperative communication/broadcasting service. In accordance with the application being executed, the application execution control unit 412 instructs the second decoder 405-2 to decode the content data received from the content delivery server 16, the content delivery server 23, or the service server 22. The content data includes any one or both of image data and sound data. The image data includes, for example, a moving image, a still image, text data, and the like. Additionally, in accordance with the application being executed, the application execution control unit 412 outputs graphic (image) data and video control instructions to the video control unit 407, and outputs sound data and sound control instructions to the sound control unit 409.

The timer 403 outputs a value of a timer counter. The timer 403 adjusts a frequency of an oscillator using the value of the timer counter indicated by a PCR, and thus synchronizes the time with that on the broadcast transmission side.

The first synchronization buffer 404-1 stores the image data, the sound data, and the caption data, which are output from the demultiplexing unit 402. A PES (packetized elementary stream) generated from the elementary stream (ES) including the image data, the sound data, and the caption data is segmented into transport packets constituting a broadcasting stream (TS) and is set thereto. A header of the PES includes a PTS (presentation time stamp). In accordance with an instruction from the first decoder 405-1, the first synchronization buffer 404-1 outputs, in units of PES packets, the image data, the sound data, and the caption data which are output from the demultiplexing unit 402.

The second synchronization buffer 404-2 stores content data of the content or service received by the communication input/output unit 411. Alternatively, in accordance with an instruction of the viewer input through the operation input unit 414, the second synchronization buffer 404-2 stores the image data, the sound data, and the caption data which are output from the demultiplexing unit 402. In accordance with an instruction from the second decoder 405-2, the demultiplexing unit 402-2 outputs, in units of PES packets, the stored content data, or the image data, the sound data, and the caption data of the program.

The first decoder 405-1 specifies a PES packet stored in the first synchronization buffer 404-1 set with the PTS associated with the time output from the timer 403. Then, the first decoder 405-1 reads from the specified PES packet, the image data, the sound data, and the caption data, which are encoded. Then, the first decoder 405-1 decodes and outputs the read data.

The second synchronization buffer 405-2 specifies the content data or the PES packet of the program, which is stored in the second synchronization buffer 404-2 set with the PTS associated with the time output from the timer 403. Then, the second decoder 405-2 reads from the specified PES packet, the image data, the sound data, and the caption data, which are encoded. Then, the second decoder 405-2 decodes and outputs the read data.

The presentation control unit 413 determines a presentation method (a window displaying method and a sound outputting method) in accordance with the policy level of the selected program or the policy level of the occurring event, and the presentation rule data. The presentation control unit 413 instructs the video control unit 407 to display, by the determined window displaying method, a broadcast window, an application window for a formal application, and an application window for an informal application. Further, the presentation control unit 413 instructs the sound control unit 409 to output, by the determined sound outputting method, the sound based on the sound data of the broadcast, the sound based on the sound data of the formal application, and the sound based on the sound data of the informal application.

The video control unit 407 controls the image display unit 408 to display, in accordance with the window displaying method instructed from the presentation control unit 413 or the application execution control unit 412, the broadcast window based on image data and the caption data of the program output from the first decoder 405-1, and the application windows for the formal application and the informal application based on the image data of the content data output from the second decoder 405-2. Additionally, in a case where graphic (image) data is output from the application execution control unit 412 by execution of an application, the video control unit 407 controls the image display unit 408 to simultaneously display a window based on that image data in accordance with the window displaying method instructed from the presentation control unit 413 or the application execution control unit 412. Here, there is a case where image data and caption data of another program are output from the second decoder 405-2.

The image display unit 408 is a general display and displays windows for broadcasts and applications. For example, the image display unit 408 displays, on the broadcast window for a program, a moving image, a still image, and a text of the content data received from the communication network 9, an application window such as a graphic or the like output from the application execution control unit 412 by execution of an application, or an image with which a broadcast window of another program is combined.

The sound control unit 409 controls the sound output unit 410 to output, in accordance with the sound outputting method instructed from the presentation control unit 413 or the application execution control unit 412, the sound based on the sound data of the program output from the first decoder 405-1, the sound of the formal application or the informal application based on the sound data of the content data output from the second decoder 405-2, and the sound data output from the application execution control unit 412 by execution of the application. Here, there is a case where sound data of another program is output from the second decoder 405-2. The sound output unit 410 is a general speaker and outputs the sound of broadcasts and applications.

The local information storage unit 416 stores various data, such as user information.

The external interface unit (hereinafter described as "external I/F unit") 417 transmits/receives data to/from a device 8 connected to a home network, such as a LAN (local area network). The device 8 is a terminal that cooperates with the receiver 4, such as a personal computer, a cellular phone, a tablet, a smart phone, or a PDA.

Here, in a case where the receiver 4 is a set-top box, or the like, the image display unit 408 and the sound output unit 410 are external devices to be connected to the receiver 4.

Figure 20:
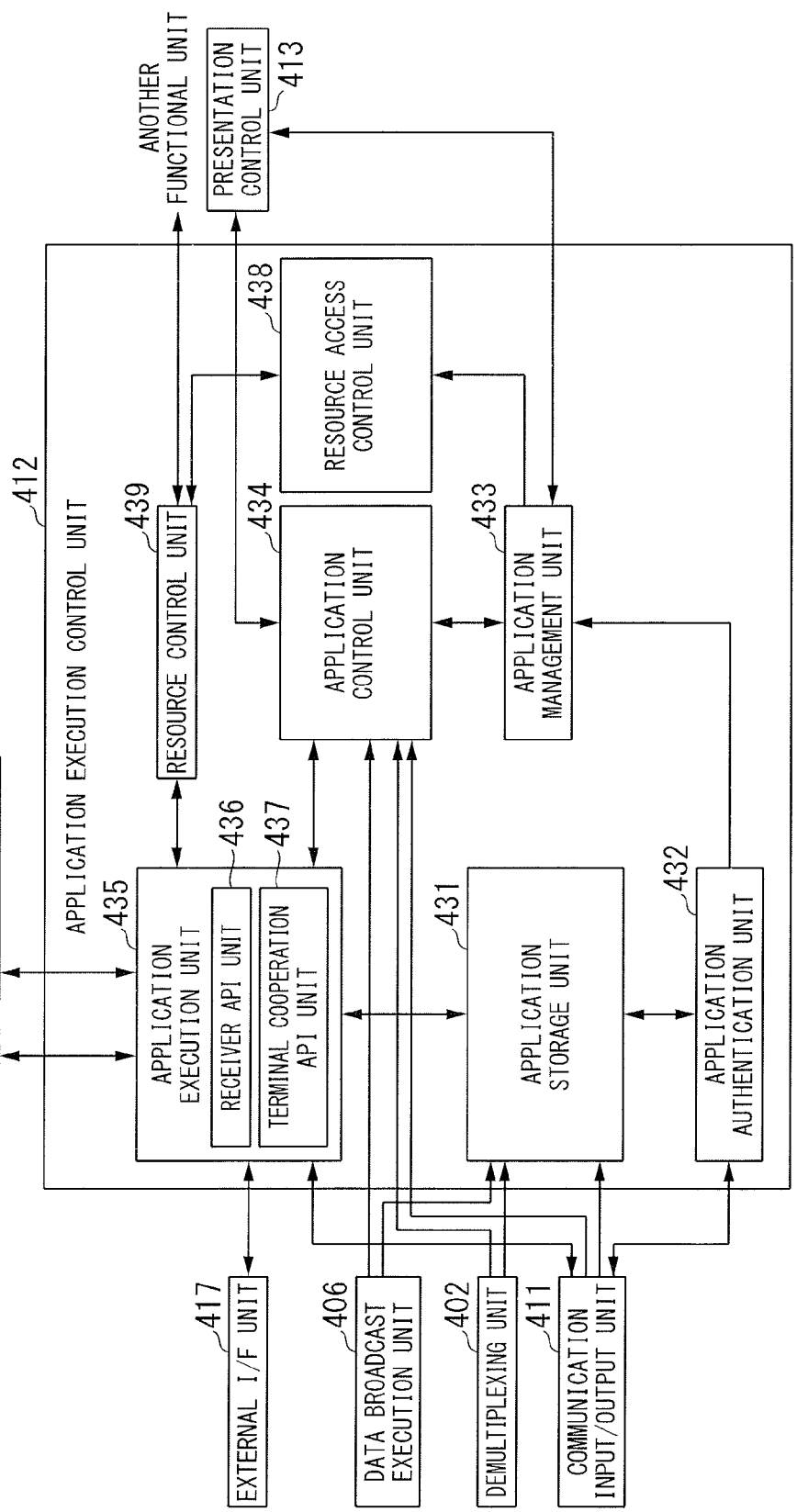
FIG. 20 is a block diagram illustrating a detailed configuration of an application execution control unit according to the embodiment.

FIG. 20 is a block diagram illustrating a detailed configuration of the application execution control unit 412. As shown in FIG. 20, the application execution control unit 412 includes: an application storage unit 431; an application authentication unit 432; an application management unit 433; an application control unit 434; an application execution unit 435; a resource access control unit 438; and a resource control unit 439.

The application storage unit 431 stores the application file that the communication input/output unit 411 receives via the communication network 9, or the application file that the data broadcast execution unit 406 acquires from the data broadcast, or the application rile that the demultiplexing unit 402 demultiplexes from the broadcasting signal. The application file may be previously stored in the application storage unit 431 at the time of shipping. The application storage unit 431 includes a supplemental storage unit, such as a main storage device and a disk. For example, an application file is stored in a disk and read by a main storage device at the time of execution. In this case, an application file of the application to be executed on-the-fly is not stored in a disk, but is stored only in the main storage device, and is deleted from the main storage device when execution ends.

The application authentication unit 432 receives from the repository server 3, data required for authentication of an electric signature. Then, the application authentication unit 432 verifies the electric signature added to the application file (application program) using the received data. For example, the application authentication unit 432 uses the public key received from the repository server 3, and thus decodes the electrically-signed application file. In a case where a predetermined data string is acquired as a result of that decoding, the application authentication unit 432 determines that the verification of the electric signature succeeds. In a case where the verification of the electric signature succeeds, the application authentication unit 432 determines the application to be a formal application. In a case where the verification of the electric signature fails or in a case where no electric signature is added, the application authentication unit 432 determines the application to be an informal application.

The application management unit 433 manages an activated or terminated state of the application executed by the application execution unit 435, and an output state of the activated application. The output state is information indicating whether or not an image or sound is being output from the running application. The application management unit 433 receives an inquiry from the presentation control unit 413, and returns a response indicating whether the activated application is a formal application or an informal application.

The application control unit 434 controls the application execution unit 435 to activate or terminate an application, in accordance with a control code with respect to the application hound to a program, or an instruction with respect to the application which is input by the operation input unit 414. Additionally, the application control unit 434 instructs the application execution unit 435 to activate the application, the activation of which is instructed by the data broadcast execution unit 406. In a case where a channel is changed in accordance with an input from the operation input unit 414, the application control unit 434 instructs the application execution unit 435 to terminate the application bound to the program on the pre-change channel and activate the application bound to the program on the post-change channel. Here, the application control unit 434 acquires the application bound to the program and a control code with respect to the bound application from the AIT included in the independent ES of the broadcasting signal or the data broadcast, the information similar to the AIT which is acquired from the EIT of the broadcasting signal, or the AIT received from the notification sever 18 or the notification server 24 via the communication input/output unit 411. Additionally, the application control unit 434 transmits a download request for an application file to a transmission destination indicated by the location information set to the AIT. The repository server 3 receiving the download request from the receiver 4, or the receiver application server 21 delivers the application file to the receiver 4.

The application execution unit 435 includes a receiver API unit 436 and a terminal cooperation API unit 437. In accordance with an instruction from the application control unit 434, the application execution unit 435 reads an application program of the application, the activation of which is instructed, and executes the read application program. By the application execution unit 435 executing the application program, the application runs on the receiver 4, and the application execution unit 435 requests content from the content delivery server 16 or the content delivery server 23 via the communication network 9, or requests service from the service server 22. Additionally, by the application program being executed, the application execution unit 435 outputs the graphic data or the video control instruction to the video control unit 407, or outputs sound data or a sound control instruction to the sound control unit 409.

The receiver API unit 436 executes a receiver API that is an API for utilizing each resource in the receiver 4 when the application execution unit 435 executes an application. By the receiver API unit 436 executing the receiver API, the resources in the receiver 4 become available from the application program executed by the application execution unit 435.

The terminal cooperation API unit 437 executes a terminal cooperation API that is an API for the device 8 on a home network accessible via the external I/F unit 417 or a device to be connected via the communication network 9 to utilize the functions of the receiver 4. By the terminal cooperation API unit 437 executing the terminal cooperation API, the resources in the receiver 4 become available from the device 8 to be connected via the home network or the device to be connected via the communication network 9.

The resource control unit 439 controls accesses by the receiver API unit 436 and the terminal cooperation API unit 437 to each functional unit that is a resource in the receiver 4.

The resource access control unit 438 controls whether or not to allow the receiver API unit 436 and the terminal cooperation API unit 437 to access each functional unit in the receiver 4. The resource access control unit 438 performs this control in accordance with whether the application that is the calling source of each API to be executed by the receiver API unit 436 and the terminal cooperation API unit 437 is a formal application or an informal application.

Figure 21:
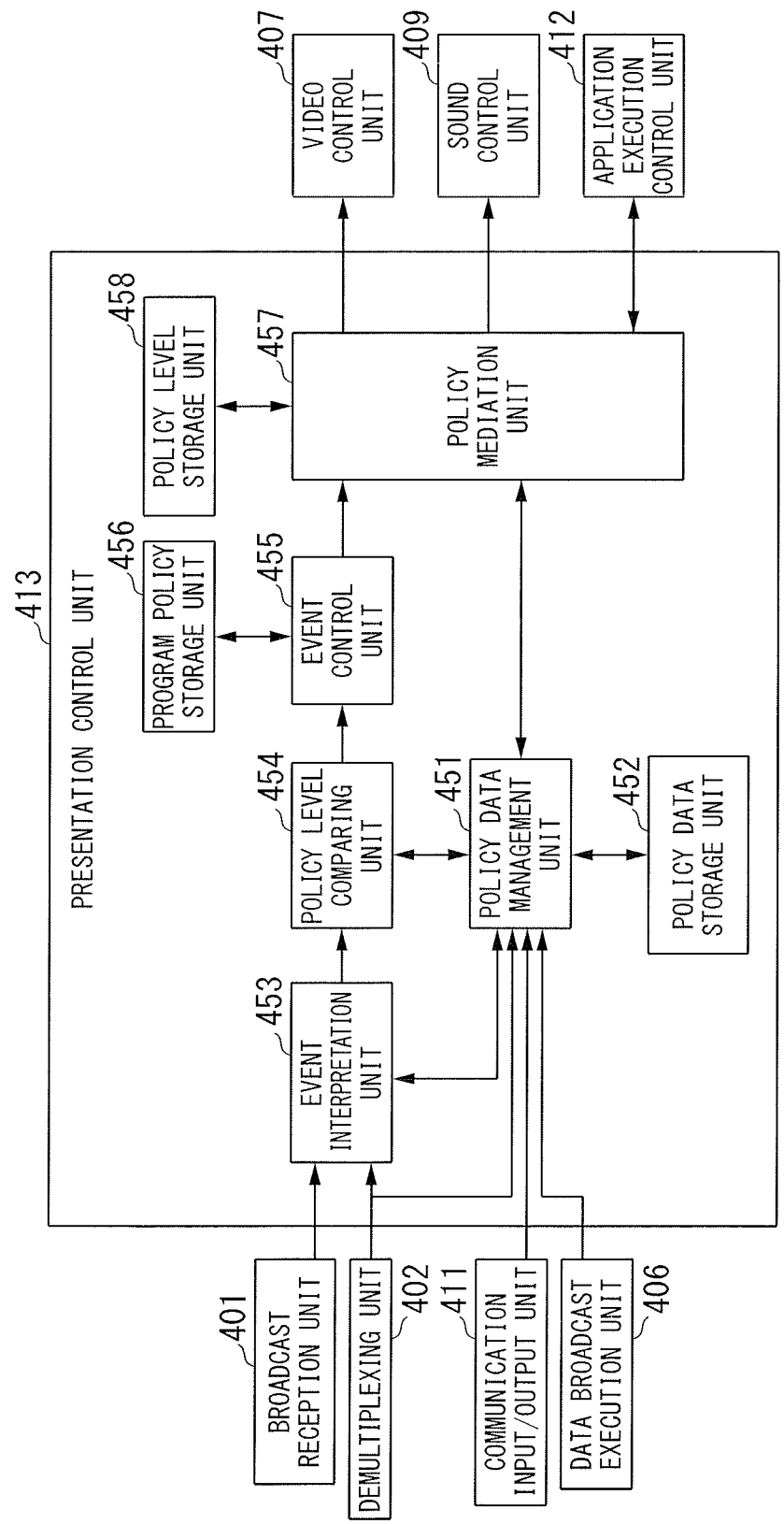
FIG. 21 is a block diagram illustrating a detailed configuration of a presentation control unit according to the embodiment.

FIG. 21 is a block diagram illustrating a detailed configuration of the presentation control unit 413. As shown in FIG. 21, the presentation control unit 413 includes: a policy data management unit 451; a policy data storage unit 452; an event interpretation unit 453; a policy level comparing unit 454; an event control unit 455; a program policy storage unit 456; a policy mediation unit 457; and a policy level storage unit 458.

The policy data storage unit 452 stores policy data including the presentation rule data and the policy level table. The policy data management unit 451 manages the policy data stored in the policy data storage unit 452. The policy data management unit 451 outputs to the policy level comparing unit 454, the policy level table read from the policy data storage unit 452. Additionally, the policy data management unit 451 outputs to the policy mediation unit 457, the presentation rule data read from the policy data storage unit 452. Further, the policy data management unit 451 receives from the demultiplexing unit 402 or the data broadcast execution unit 406, the policy data transmitted by broadcasting. Moreover, the policy data management unit 451 receives from the communication input/output unit 411, the policy data transmitted by communication. The policy data management unit 451 updates the policy data stored in the policy data storage unit 452 with the policy data transmitted by broadcasting or communication.

The event interpretation unit 453 analyzes the broadcasting signal received by the broadcast reception unit 401, and the data broadcast and the caption data demultiplexed by the demultiplexing unit 402, thus detecting occurrence or termination of an event. Upon detecting (interpreting) occurrence or termination of an event, the event interpretation unit 453 outputs to the policy level comparing unit 454, the event number of the detected event and status data indicating the occurrence or termination.

The policy level comparing unit 454 refers to the policy level table and determines (compares) the policy level associated with a genre of each program indicated by the FIT and the policy level associated with the event specified by the event number. The policy level comparing unit 454 outputs to the event control unit 455, data indicating the broadcast start time and the broadcast end time of the program, and the policy level of that program (hereinafter described as the "program policy level"), which are acquired from the SI received from the demultiplexing unit 402. Here, in a case where the program policy level is set to the EIT, the policy level comparing unit 454 outputs to the event control unit 455, the data indicating the broadcast start time and the broadcast end time, and the policy level of that program acquired from the EIT.

Additionally, in a case where the policy level comparing unit 454 acquires the program policy level from the AIT, the policy level comparing unit 454 outputs the acquired program policy level to the policy mediation unit 457. Further, the policy level comparing unit 454 outputs to the policy mediation unit 457, the policy level determined in accordance with the event number (hereinafter described as the "trigger policy level").

The program policy storage unit 456 stores the program start time and the program end time, and the program policy level, in association with one another. The event control unit 455 associates the data indicating the program start time and the program end time, and the program policy level, which are received from the policy level comparing unit 454, and writes those information in the program policy storage unit 456. Based on those information stored in the program policy storage unit 456, the event control unit 455 manages the time at which a display control is to be performed. In a case where the event control unit 455 refers to the data indicating the program start time stored in the program policy storage unit 456, and detects that it becomes the time at which to communicate the execution time, the event control unit 455 outputs to the policy mediation unit 457, the execution time and the program policy level associated with that execution time.

The policy level storage unit 458 stores the execution time and the program policy level which are input to the policy mediation unit 457, and the trigger policy level and the status data. The policy mediation unit 457 determines the policy level based on the execution time and the program policy level which are received from the event control unit 455, and the trigger policy level received from the policy level comparing unit 454. For example, the trigger policy level may be determined as the policy level. The greater one of the program policy level and the trigger policy level may be determined as the policy level.

Here, in a case where the program policy level acquired by the AIT from the policy level comparing unit 454, the policy mediation unit 457 prioritizes the program policy level received from the policy level comparing unit 454 over the program policy level received from the event control unit 455. In other words, the policy mediation unit 457 determines the policy level based on the program policy level acquired by the AIT and the trigger policy level. The policy mediation unit 457 refers to the presentation rule data, and determines a window displaying method and a sound outputting method (presentation method) based on the determined policy level, information indicating whether or not the running application acquired from the application management unit 433 is formal, and the output state. The policy mediation unit 457 outputs the determined window displaying method to the video control unit 407, and outputs the determined sound outputting method to the sound control unit 409.

Next, the detailed configuration of the primary devices in the cooperative communication/broadcasting system which are also shown in FIG. 1 are explained here.

Figure 22:
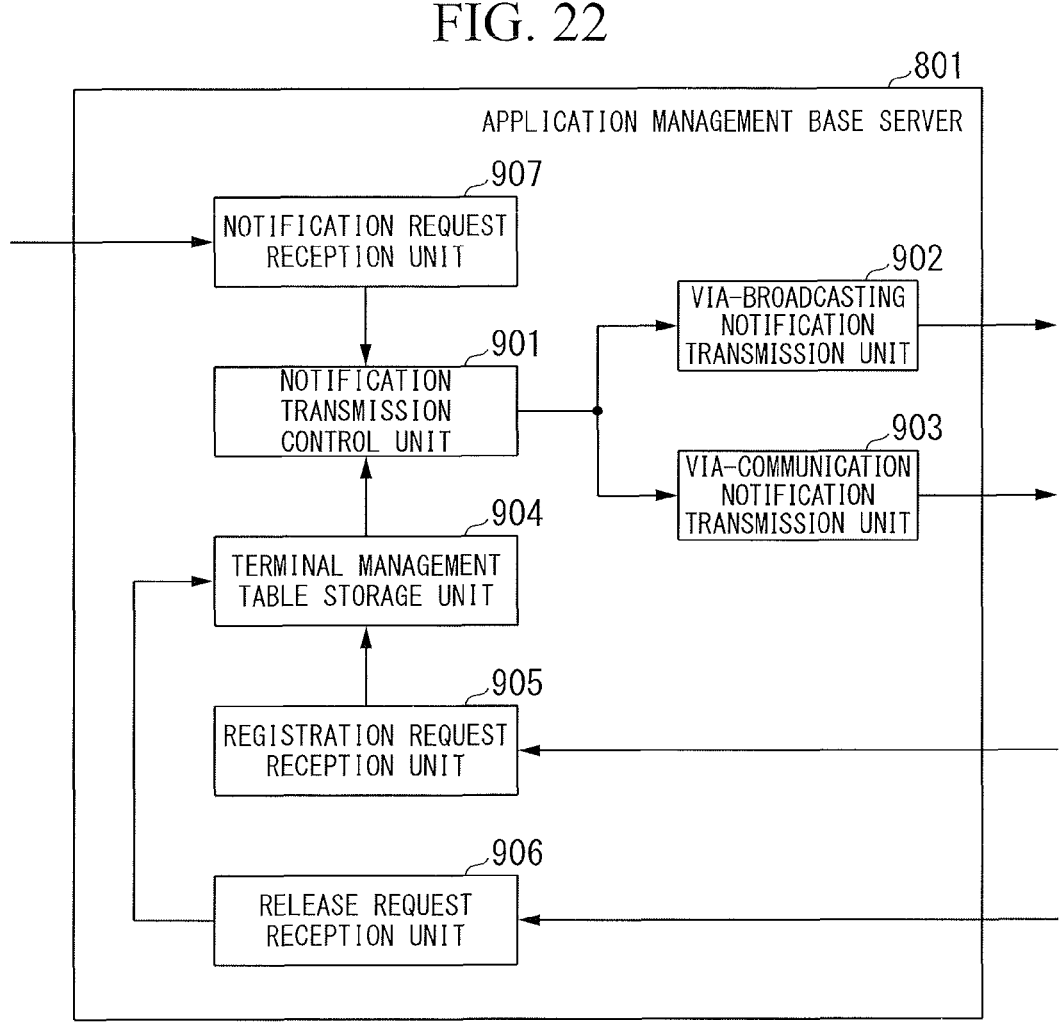
FIG. 22 is a block diagram illustrating a functional configuration of an application management base server according to an embodiment of the present invention.

FIG. 22 is a block diagram illustrating a functional configuration of the application management base server. As shown in FIG. 22, the application management base server 801 includes: a communication transmission control unit 901; a via-broadcasting notification transmission unit 902; a via-communication notification transmission unit 903; a terminal management table storage unit 904; a registration request reception unit 905; a release request reception unit 906; and a notification reception unit 907.

The communication transmission control unit 901 specifies terminal devices (the receiver 4 and the terminal device 808) to which a notification is to be transmitted, based on a notification request that the notification request reception unit 907 receives from the outside and data read from the terminal management table storage unit 904. At this time, in a case where a particular application ID is specified, the communication transmission control unit 901 reads from the terminal management table storage unit 904, only the data associated with that application. Then, the communication transmission control unit 901 determines, in accordance with the number of associated communication terminals, whether to transmit the notification via broadcasting from the via-broadcasting notification transmission unit 902 or to transmit the notification from the via-communication notification transmission unit 903. Then, in accordance with that determination, the communication transmission control unit 901 controls the via-broadcasting notification transmission unit 902 and/or the via-communication notification transmission unit 903.

The via-broadcasting notification transmission unit 902 performs, in accordance with the instruction from the communication transmission control unit 901, a process of including the notification in a broadcasting signal and transmitting the notification. Here, via broadcasting means a method of superimposing notification data on a broadcasting signal (electric wave, cable, or the like). Specifically, the via-broadcasting notification transmission unit 902 requests the content management server 13 to include predetermined notification data in a broadcasting signal. The content management server 13 is a server that manages content itself (image and sound of a program or the like) and related control information. Then, the content management server 13 includes in control information, the notification data based on the request from the via-broadcasting notification transmission unit 902, and then gives the control information to the broadcast sending device 11. The broadcast sending device 11 sends a signal modulated using the content itself and the control information.

The via-communication notification transmission unit 903 performs, based on the instruction from the communication transmission control unit 901, a process of transmitting notification to the terminal devices (the receiver 4 and the terminal device 808) via communication. Here, via communication means a method of transmitting notification data via a communication network, such as the Internet. At this time, the via-communication notification transmission unit 903 transmits the notification using XMP or the like.

The terminal management table storage unit 904 correlates a terminal ID for identifying a terminal device (terminal device identification data) with a notification transmission flag (information indicating whether or not transmission of notification data is necessary), and stores the terminal ID and the notification transmission flag. Additionally, the terminal management table storage unit 904 stores user attribute data in association with the terminal device ID.

The registration request reception unit 905 receives from an external device (the receiver 4 or the terminal device 808), a registration request for registering transmission of the notification data. Based on the registration request, the registration request reception unit 905 updates the terminal management table storage unit 904.

The release request reception unit 906 receives from an external device (the receiver 4 or the terminal device 808), a release request for releasing the transmission of the notification data. Based on the release request, the registration request reception unit 905 updates the terminal management table storage unit 904.

The notification request reception unit 907 receives from an external computer, a request for transmission of a notification to the terminal, and gives to the communication transmission control unit 901, that notification request along with the application ID for specifying the application. Here, the external computer means, for example, a computer operated by an organization that develops and provides applications or a broadcasting organization.

FIG. 23 is a schematic diagram illustrating a configuration of data stored by the terminal management table storage unit 904. As shown in FIG. 23, the terminal management table is data in table format and includes items of: an application ID; a terminal device ID (terminal device identification data); an address; a notification transmission flag; and a user attribute. A main key of this table is a combination of the application ID and the terminal device ID. The application ID is identification information previously allocated to each application. The terminal device ID is identification information for uniquely identifying the receiver 4 and the terminal device 808. In the case of a television receiver, for example, the manufacturer's serial number or the CAS number is used as the terminal device ID. In the case of a personal computer, for example, an MAC (media access control) address is used as the terminal device ID. In the case of a cellular phone terminal, for example, the cellular phone number is used as the terminal device ID. The address is an address (such as an IP address) to be used when the application management base server 801 sends a notification via communication to the receiver 4 or the terminal device 808. The transmission notification flag is information indicating whether or not transmission of notification data is necessary. In other words, the transmission notification flag is a flag indicating whether or not a notification regarding the application is to be sent to the terminal device, and has a value that is any one of TRUE (to be sent) or FALSE (not to be sent). The user attribute is an attribute of a user of the terminal device and includes items, such as age and gender.

Figure 24:
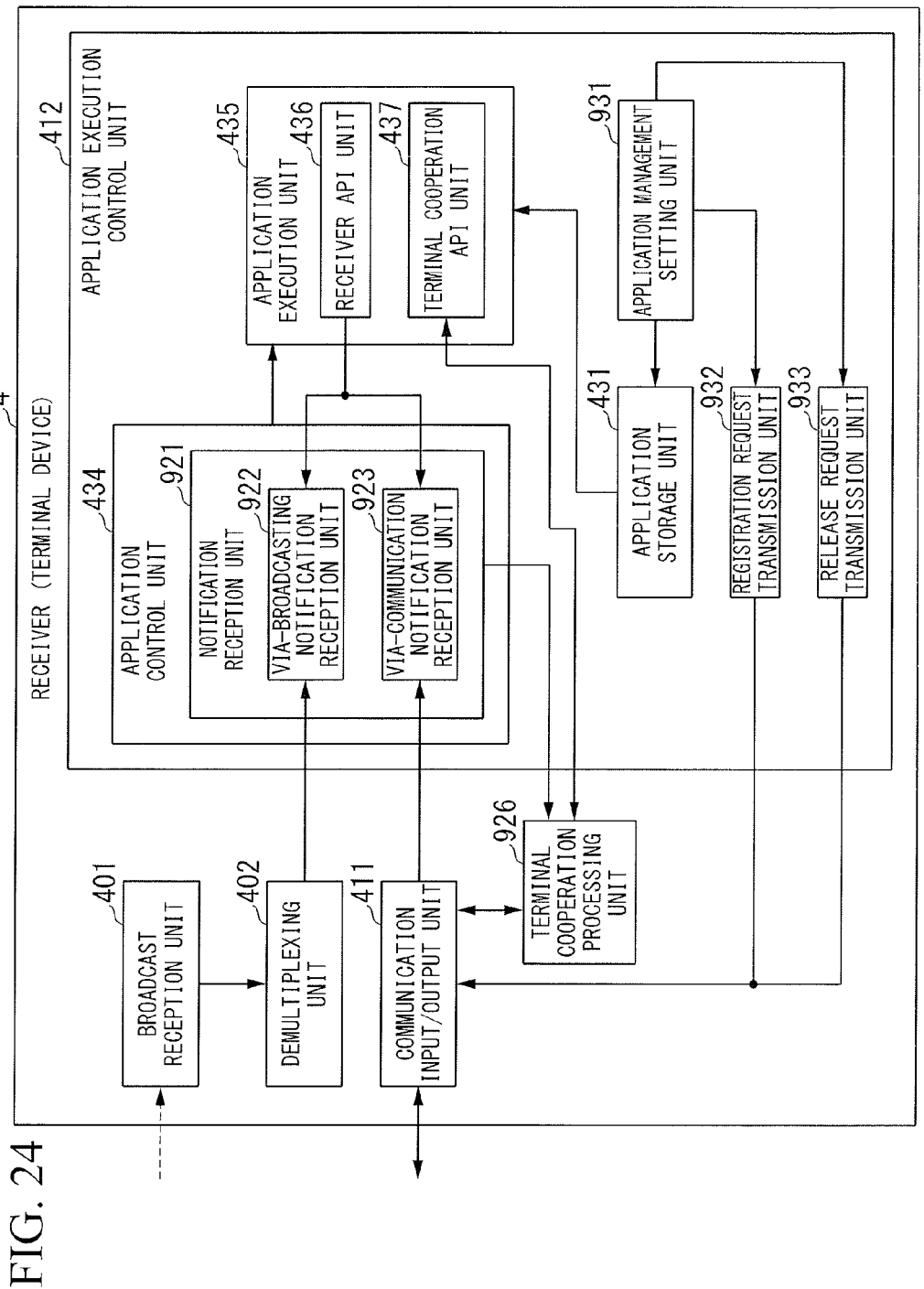
FIG. 24 is a block diagram illustrating a functional configuration of a receiver according to the embodiment.

FIG. 24 is a block diagram illustrating a functional configuration of the receiver. As shown in FIG. 24, the receiver 4 includes: a broadcast reception unit 401; a demultiplexing unit 402; a communication input/output unit 411; an application execution control unit 412; and a terminal cooperation processing unit 926. Additionally, the application execution control unit 412 includes: an application storage unit 431; an application control unit 434; an application execution unit 435; an application management setting unit 931; a registration request transmission unit 932; and a release request transmission unit 933. Further, the application control unit 434 includes a notification reception unit 921. The notification reception unit 921 includes a via-broadcasting notification reception unit 922 and a via-communication notification reception unit 923. Moreover, the application execution unit 435 includes a receiver API unit 436 and a terminal cooperation API unit 437. Here, "API" means an application program interface.

The broadcast reception unit 401 receives a broadcasting signal.

The demultiplexing unit 402 demodulates the received broadcasting signal, retrieves a transport stream, and acquires data from the transport stream with reference to various tables. In a later-explained embodiment, the broadcasting signal includes data for a push notification. The demultiplexing unit 402 acquires that notification data. The demultiplexing unit 402 gives the received notification data to the via-broadcasting notification reception unit 922.

The communication input/output unit 411 performs IP communication with various external devices via the communication network 9 or 809, and thus performs input and output of data via communication. The communication input/output unit 411 gives to the via-communication notification reception unit 923, the data for the push notification included in the received data. Additionally, the communication input/output unit 411 performs transmission and reception of data based on a request from the terminal cooperation processing unit 926, the registration request transmission unit 932, the release request transmission unit 933, or the like.

The application execution control unit 412 is an execution platform of an application program on the receiver 4. The application execution control unit 412 stores an application code, executes an application, controls execution of the application, and performs various processes accompanying those operations.

The terminal cooperation processing unit 926 performs various controls for the receiver 4 and its application to cooperate with the terminal device 808. In a case where the function of the terminal cooperation processing unit 926 is executed from an application, the application executes a predetermined method, thereby invoking the function of the terminal cooperation processing unit 926 via the terminal cooperation API unit 437. In a case where the receiver 4 receives a request for the cooperation process from the terminal device 808, the terminal cooperation processing unit 926 notifies the application of that request. The terminal cooperation processing unit 926 manages a state of the cooperation process with the external terminal device 808, which is performed by the application executed by the application execution unit 435. Additionally, when any one of the via-broadcasting notification reception unit 922 and the via-communication notification reception unit 923 receives a notification, the terminal cooperation processing unit 926 transmits (transfers) the acquired notification data to the terminal device 808 performing a cooperation process in connection with that notification.

The application storage unit 431 stores an application code. The application execution unit 435 reads an execution code from the application storage unit 431 when executing an application.

The application control unit 434 mainly controls a life cycle of an application (preparation, activation, execution, termination, and the like). When the via-broadcasting notification reception unit 922 or the via-communication notification reception unit 923 acquires a notification regarding an application from the outside, the application control unit 434 performs control of the associated application (for example, terminates the associated application) based on information included in the notification (including the application ID, the control code, and the like).

The application execution unit 435, based on the control and the like performed by the application control unit 434, reads an application program (code) from the application storage unit 431 and executes the application program.

The application management setting unit 931 installs and uninstalls an application. Additionally, along with the installment/uninstallment, or based on user operation or the like, the application management setting unit 931 performs setting of whether or not to receive a notification regarding an application from the outside. Along with this setting, the application management setting unit 931 instructs the registration request transmission unit 932 to transmit a notification request or instructs the release request transmission unit 933 to transmit a release request.

The registration request transmission unit 932 transmits to the application management base server 801, based on the instruction from the application management setting unit 931, a registration request for registering reception of a notification.

The release request transmission unit 933 transmits a release request for releasing reception of a notification, to the application management base server 801, based on the instruction from the application management setting unit 931.

The notification reception unit 921 acquires the notification from the application management base server 801. The notification reception unit 921 includes the via-broadcasting notification reception unit 922 and the via-communication notification reception unit 923.

The via-broadcasting notification reception unit 922 receives the notification from the application management base server 801 via broadcasting. Specifically, the via-broadcasting notification reception unit 922 ignores predetermined data included in the broadcasting signal, based on an instruction from the receiver API unit 436. In other words, the via-broadcasting notification reception unit 922 has previously been waiting for a notification, and acquires the notification included in the broadcasting signal received by the broadcast reception unit 401. Notification data is included in the broadcasting signal by a later-explained method, and the demultiplexing unit 402 demultiplexes various data included in the broadcasting signal.

The via-communication notification reception unit 923 receives a notification from the application management base server 801 via communication. Specifically, the via-communication notification reception unit 923 has been previously waiting for a notification to be received via the communication input/output unit 411, based on an instruction from the receiver API unit 436, and thus acquires the notification received by the communication input/output unit 411.

The receiver API unit 436 is a processing unit that is an interface to an application with respect to the functions of the receiver 4.

The terminal cooperation API unit 437 is a processing unit that is an interface to an application with respect to a cooperation process between the receiver 4 and the communication terminal 808.

FIG. 25 is a schematic diagram illustrating a data structure of the cooperation terminal management table stored by the terminal cooperation processing unit 926. As shown in FIG. 25, the cooperation terminal management table is data in table format and includes items of: a terminal device ID; an address; an application ID; and a cooperation status. The main key of this table is a combination of the terminal device ID and the application ID. The terminal device ID is identification information for uniquely identifying the terminal device 808. As the terminal device ID, the same value as the terminal device ID included in the terminal management table which has already been explained. The address is an address to be used when the receiver 4 sends a notification to the terminal device 808 via communication. The application ID is identification information allocated to each application. The cooperation status is data indicating the state of cooperation (for example, whether or not cooperation is being made).

Here, a method for the application management base server 801 to transmit a push notification to the terminal device is explained. As an example, a notification is transmitted as data in an AIT format. The AIT is data in the XML format and may include an application descriptor for each application. A tag representing the application descriptor is "applicationDescriptor". The application Descriptor may include signals, such as a control code (the tag is "controlCode"), visible control information (the tag is "visibility"), and a priority (the tag is "priority"). For example, in a case where a value of the control code is "DESTROY", the ATI thereof indicates a notification that a control of terminating the associated application should be performed.

In a case where a notification is performed via communication, the application management base server 801 transmits the above AIT by IP.

In a case where a notification is performed via broadcasting, the application management base server 801 requests the broadcast sending device 11 to transmit a broadcasting signal including the above AIT via the content management server 13. In a case where the AIT is transmitted by a broadcasting signal, for example, any one of the following three means is used.

Firstly, an elementary stream (ES) for the AIT is multiplexed with a broadcasting transport stream (TS).

Secondly, a descriptor that is the same as the information of the AIT is added to p/f (present/following) of an event information table (EIT), and is transmitted.

Thirdly, the AIT is transmitted by a DSM-CC data carousel. At this time, a component tag and a module ID of the carousel are fixed, and a type indicating the AIT is specified by a type descriptor (Type) of the module. Then, the receiver monitors update of the module, and acquires the AIT if it is updated.

Next, a process flow regarding a cooperation process between the receiver 4 and the terminal device 808, and a notification from the application management base server 801 are explained here.

Figure 26A:
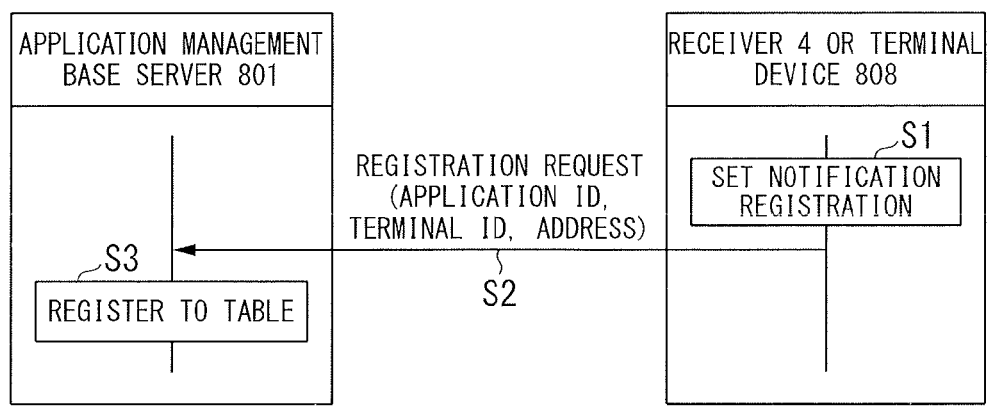
FIG. 26A is a ladder chart illustrating a procedure for registration and release of a push notification from the terminal device.
Figure 26B:
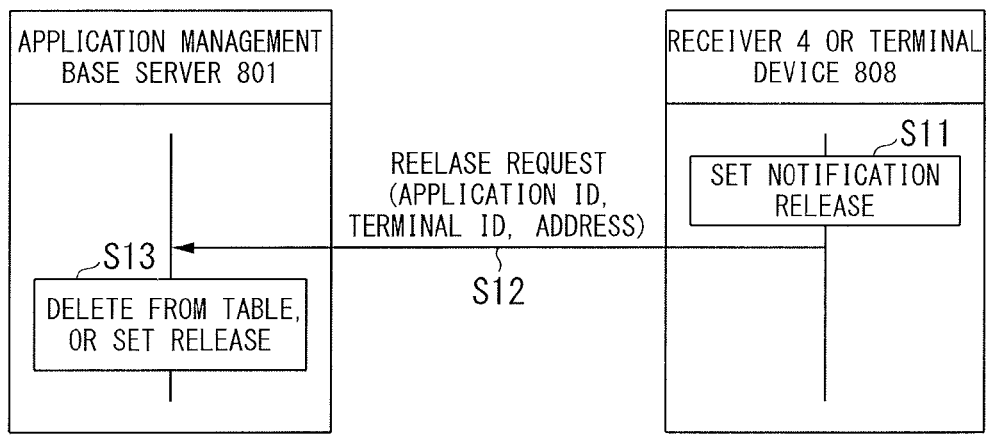
FIG. 26B is a ladder chart illustrating procedures for processes of registration and release of a push notification from the terminal device.

FIGS. 26A and 26B are ladder charts illustrating procedures for processes of registration and release processes performed by the terminal device. FIG. 26A illustrates a procedure regarding registration of a notification. As shown in FIG. 26A, the receiver 4 or the terminal device 808 performs a process of setting a notification registration in its device (step S1), and then transmits a registration request to the application management base server 801. At this time, the receiver 4 or the terminal device 808 transmits the application ID, the terminal ID, and the address (IP address), as parameters (step S2). The application management base server 801 receives the registration request and registers the information therein to the terminal management table. At this time, the notification transmission flag in the associated row of the terminal management table is set to be TRUE (notify) (step S3). Additionally, the same FIG. 26 illustrates a procedure regarding release of the notification. As shown in FIG. 26B, the receiver 4 or the terminal device 808 performs a process of setting release of the notification in its device (step S11), and then transmits a release request to the application management base server 801. At this time, the receiver 4 or the terminal device 808 transmits the application ID and the terminal ID, as parameters (step S12). Upon receiving that release request, the application management base server 801 deletes the associated row from the terminal management table or updates a value of the notification transmission flag in the associated row to FALSE (not notify) (step S13).

FIG. 27 is a ladder chart illustrating a procedure for a process of transmitting a push notification to the receiver 4 and the terminal device 808 via communication. As shown in FIG. 27, the application management base server 801 receives a notification request from an external computer (step S21). For example, it is a computer of an organization developing and operating an application that transmits the notification request. The notification request includes the application ID and information to be notified. Then, the application management base server 801 searches the terminal management table using the application ID included in the notification request as a key (step S22). Then, the application management base server 801 determines whether to transmit a notification to the terminal device via communication or via broadcasting. In a case where the number of terminal devices waiting for the notification regarding the application is equal to or less than a predetermined value (such as ten thousand), the application management base server 801 previously establishes communication connection with those terminal devices waiting for the notification. Then, the application management base server 801 transmits the notification to each terminal device extracted from the terminal management table, via the communication network 9, using protocol such as XMPP (steps S23 and S24). Here, a case where the number of terminal devices waiting for the notification regarding the application exceeds the predetermined value will be explained later with reference to a different drawing. Upon receiving the notification via communication, the receiver 4 performs a process of controlling an application in accordance with the information included in the notification (step S25). Similarly, upon receiving the notification via communication, the terminal device 808 performs a process of controlling the application in accordance with the information included in the notification (step S26).

FIG. 28 is a ladder chart illustrating a procedure for a process of transmitting a push notification from the application management base server 801 to the receiver 4 or the terminal device 808 via broadcasting. Similar to the above, the application management base server 801 receives a notification request from an external computer (step S31). Then, the application management base server 801 searches the terminal management table, using the application ID included in the notification request as a key (step S32). In a case where the number of terminal devices waiting for the notification regarding the application exceeds the predetermined value, communication connection has not previously been established with all of those terminal devices, and therefore the application management base server 801 transmits the notification via broadcasting (step S33). The receiver 4 receives a broadcasting signal via an electric wave or a cable, and retrieves the notification from the broadcasting signal. Then, the receiver 4 refers to the cooperation terminal management table, and thereby transfers, via a communication network, data of the received notification to the terminal devices 808 cooperating with regard to that application at that time (step S34). Thereafter, the receiver 4 performs a process of controlling the application in accordance with the information included in the received notification (step S35). Additionally, the terminal device 808 receiving the notification from the receiver 4 via communication also performs a process of controlling the application in accordance with the information included in the received notification (step S36). Thus, even in a case where connection has not been previously established with all the terminal devices, the application management base server 801 can send a necessary push notification to all the terminal devices managed by the terminal management table.

Additionally, an explanation is omitted with regard to FIG. 28, a configuration may be made such that the application management base server 801 transmits a push notification to the receiver 4 via the communication network 9, and the receiver 4 retransmits the notification to the terminal device 808 via the communication network 9 or 809.

If summarizing the above, as methods of transmitting a notification from the application management base server 801 to the receiver 4 and the terminal device 808, the following five methods are available. (1) A method of transmitting a notification from the application management base server 801 to the receiver 4 by a broadcasting signal. (2) A method of transmitting a notification from the application management base server 801 to the receiver 4 via the communication network 9. (3) A method of transmitting a notification from the application management base server 801 to the receiver 4 by a broadcasting signal and further transmitting that notification to the terminal device 808 via the communication network 9 or 809. (4) A method of transmitting a notification from the application management base server 801 to the receiver 4 via the communication network 9, and further transmitting that notification to the terminal device 808 via the communication network 9 or 809. (5) A method of transmitting a notification from the application management base server 801 directly to the terminal device 808 via the communication network 9 (i.e., without retransmission by the receiver 4).

Second Embodiment

Next, a second embodiment of the present invention is explained. Here, explanations common to those of the previous embodiment are omitted here, and only technical explanations unique to the present embodiment are given here. In the present embodiment, when the notification request reception unit 907 of the application management base server 801 receives a notification request from the outside, the notification request reception unit 907 also receives information identifying a user attribute. This information is information that limits a user, to which the notification is transmitted, only to a user with, for example, a particular gender or an age within a particular range (such as only an age less than 18 years old). When the notification request reception unit 907 receives such a notification request, the communication transmission control unit 901 reads from the terminal management table storage unit 904, only data for the terminal devices associated with that user attribute, and sets those terminal devices to be transmission destinations of the notification. Then, in a case where the notification is transmitted via communication, the via-communication notification transmission unit 903 transmits the notification only to the terminal device associated with the specified user attribute.

Here, each unit included in the receiver of the above embodiments, each unit included in the terminal device of the above embodiments, each unit included in the application management of the above embodiments, or each unit included in the content management server of the above embodiments, may be a unit that implements its function by executing a program for implementing the function of the unit.

Additionally, each process included in the reception method or the application management method of the above embodiments may be performed by executing a program for implementing each process.

Further, a program for implementing the function of each unit included in the receiver, the terminal device, the application management server, or the content management server of the above embodiments, or a program for implementing each process included in the reception method or the application management method of the above embodiments may be recorded on a computer-readable recording medium. Then, the process to be performed by each unit included in the receiver, the terminal device, the application management server, or the content management server, or each process included in the reception method or the application management method may be implemented by a computer system reading and executing the program recorded on the recording medium.

Here, a "computer system" includes an OS and hardware such as a peripheral equipment. Additionally, the "computer system" includes a function of providing information embodied in a so-called web page described in markup language and a function of displaying that information on a browser.

The "recording medium" means a storage device having a function of non-temporarily storing information. For example, the recording medium includes, but is not necessarily limited to, portable media like a flexible disk, a magneto-optical disk, a ROM, or a CD-ROM, and non-volatile media like unportable media such as a hard disk built in a computer system.

Additionally, the "recording medium" includes, but is not necessarily limited to, a volatile medium like a volatile memory, such as a DRAM or an SRAM, which is built in a computer system serving as a server or a client.

Further, the "recording medium" includes, but is not necessarily limited to, a medium that stores a program for a short time, such as a reception/transmission device or a transfer device which transmits a program via a network such as the Internet or via a communication line such as a telephone line.

Moreover, the aforementioned program may be a program which implements part of the aforementioned functions, or a program which can implement the aforementioned functions in combination of another program already recorded in the computer system.

Although multiple embodiments have been explained above, the present invention can be implemented in the following modified examples.

In the above embodiments, the application management base server 801 performs control of distinguishing between a notification via broadcasting and a notification via communication, in accordance with the number of terminal devices waiting for the notification. However, a notification via broadcasting and a notification via communication may be distinguished from each other based on another determination criterion.

Additionally, in the above embodiments, in the case where a notification is transmitted by communication, the application management server 801 transmits a notification to the IP addresses of both the receiver 4 and the terminal device 808. However, even in the case where a notification is transmitted by communication, a configuration may be made such that a notification is transmitted directly from the application management server 801 only to the receiver 4, and the receiver 4 receiving that notification transfers the notification to the terminal device 808 performing the cooperation process.

Although the embodiments of the present invention have been explained above with reference to the drawings, the specific configuration is not limited to those embodiments, and designs made without departing from the scope of the present invention are also included.

INDUSTRIAL APPLICABILITY

The present invention is applicable to cooperative communication/broadcasting services.

DESCRIPTION OF REFERENCE NUMERALS

4: receiver
9, 809: communication network
11: broadcast sending device
13: content management server
401: broadcast reception unit
402: demultiplexing unit
411: communication input/output unit
412: application execution control unit
431: application storage unit
434: application control unit
435: application execution unit
436: receiver API unit
437: terminal cooperation API unit
800: cooperative communication/broadcasting system
801: application management base server (application management server)
808: terminal device
901: communication transmission control unit
902: via-broadcasting notification transmission unit
903: via-communication notification transmission unit
904: terminal management table storage unit
905: registration request reception unit
906: release request reception unit
907: notification request reception unit
921: notification reception unit
922: via-broadcasting notification reception unit
923: via-communication notification reception unit
926: terminal cooperation processing unit
931: application management setting unit
932: registration request transmission unit
933: release request transmission unit

The invention claimed is:
1. A receiver comprising:
a broadcast reception unit configured to receive a broadcasting signal;
a via-broadcasting notification reception unit configured to acquire notification data included in the broadcasting signal received by the broadcast reception unit;
a communication input/output unit configured to perform input and output by communication;

a via-communication notification reception unit configured to acquire the notification data received by the communication input/output unit;

an application execution unit configured to execute an application program;

a terminal cooperation processing unit configured to manage a state of a cooperation process with an external terminal device which is performed by the application program executed by the application execution unit, and transmit, when any one of the via-broadcasting notification reception unit and the via-communication notification reception unit acquires the notification data, the notification data acquired to the terminal device performing the cooperation process in association with the notification data; and an application control unit configured to, when any one of the via-broadcasting notification reception unit and the via-communication notification reception unit acquires the notification data, control the application program executed by the application execution program, in association with the notification data.

2. The receiver according to claim 1, further comprising:

a registration request transmission unit configured to transmit to an application management server, a registration request for registering reception of the notification data; and a release request transmission unit configured to transmit to the application management server, a release request for releasing reception of the notification data.

3. An application management server comprising:

a terminal management table storage unit configured to store terminal device identification data for identifying a terminal device and information indicating whether or not transmission of notification data is necessary while correlating the terminal device identification data with the information;

a registration request reception unit configured to receive from the terminal device, a registration request for registering transmission of notification data, and update the terminal management table storage unit based on the registration request;

a release request reception unit configured to receive from the terminal device, a release request for releasing transmission of notification data, and update the terminal management table storage unit based on the release request;

a via-broadcasting notification transmission unit configured to perform a process of including notification data in a broadcasting signal and transmitting the notification data; and a via-communication notification transmission unit configured to perform a process of referring to the terminal management table storage unit and transmitting the notification data to the terminal device.

4. The application management server according to claim 3, further comprising:

a notification transmission control unit configured to control, in accordance with a number of communication terminals to which the notification data is to be transmitted, whether or not to transmit the notification data from the via-communication notification transmission unit or from the via-broadcasting notification transmission unit.

5. The application management server according to claim 3, wherein the terminal management table storage unit is configured to further store user attribute data in association with the terminal device identification data, and the via-communication notification transmission unit is configured to perform a process of transmitting the notification data only to the terminal device associated with a particular user attribute stored in the terminal management table storage unit.

6. A cooperative communication/broadcasting system comprising:

a receiver;

an application management server;

a broadcast sending device; and a terminal device, wherein the receiver comprises:

a broadcast reception unit configured to receive a broadcasting signal;

a via-broadcasting notification reception unit configured to acquire notification data included in the broadcasting signal received by the broadcast reception unit;

a communication input/output unit configured to perform input and output by communication;

a via-communication notification reception unit configured to acquire the notification data received by the communication input/output unit;

an application execution unit configured to execute an application program;

a terminal cooperation processing unit configured to manage a state of a cooperation process with an external terminal device which is performed by the application program executed by the application execution unit, and transmit, when any one of the via-broadcasting notification reception unit and the via-communication notification reception unit acquires the notification data, the notification data acquired to the terminal device performing the cooperation process in association with the notification data; and an application control unit configured to, when any one of the via-broadcasting notification reception unit and the via-communication notification reception unit acquires the notification data, control the application program executed by the application execution program, in association with the notification data, the application management server comprises:

a terminal management table storage unit configured to store terminal device identification data for identifying a terminal device and information indicating whether or not transmission of notification data is necessary while correlating the terminal device identification data with the information;

a registration request reception unit configured to receive from the terminal device, a registration request for registering transmission of notification data, and update the terminal management table storage unit based on the registration request;

a release request reception unit configured to receive from the terminal device, a release request for releasing transmission of notification data, and update the terminal management table storage unit based on the release request;

a via-broadcasting notification transmission unit configured to perform a process of including notification data in a broadcasting signal and transmitting the notification data; and a via-communication notification transmission unit configured to perform a process of referring to the terminal management table storage unit and transmitting the notification data to the terminal device, the broadcast sending device is configured to transmit, based on the process performed by the via-broadcasting notification transmission unit, a broadcasting signal including the notification data, and the terminal device is configured to perform a process cooperatively with the receiver, and in a case that the notification data is received from the terminal cooperation processing unit, control an application program to be executed by the terminal device, in association with the notification data.

7. A reception method for a receiver, comprising:

receiving a broadcasting signal;

acquiring notification data included in the broadcasting signal received;

executing an application program;

managing a state of a cooperation process with an external terminal device which is performed by the application program, and transmitting, when the notification data is acquired, the notification data acquired to the terminal device performing the cooperation process in association with the notification data; and controlling, when the notification data is acquired, the application program in association with the notification data.

8. An application management method for an application management server, comprising:

storing a terminal management table in which terminal device identification data for identifying a terminal device and is correlated with information indicating whether or not transmission of notification data is necessary;

receiving from the terminal device, a registration request for registering transmission of notification data, and updating the terminal management table storage unit based on the registration request;

receiving from the terminal device, a release request for releasing transmission of notification data, and updating the terminal management table storage unit based on the release request; and performing a process of including notification data in a broadcasting signal and transmitting the notification data, or a process of referring to the terminal management table storage unit and transmitting the notification data to the terminal device.

\* \* \* \* \*